(12) United States Patent
Lim et al.

(10) Patent No.: US 8,078,228 B2
(45) Date of Patent: Dec. 13, 2011

(54) METHOD AND APPARATUS FOR DISPLAYING MESSAGES IN AN IDLE STATE OF MOBILE TERMINAL, DRIVING AN APPLICATION FOR AN IDLE STATE IN A MOBILE TERMINAL AND PROVIDING IDLE STATE CONTENTS FOR A MOBILE TERMINAL

(75) Inventors: Sang-hyun Lim, Seoul (KR); Byoung-cheol Choi, Seoul (KR); Tae-beom Heo, Gyeonggi-do (KR); Won-gu Kim, Seoul (KR)

(73) Assignee: Ktfreetel Co., Ltd., Seoul (KR)

( * ) Notice: Subject to any disclaimer, the term of this patent is extended or adjusted under 35 U.S.C. 154(b) by 1308 days.

(21) Appl. No.: 11/568,613

(22) Filed: Feb. 5, 2007

(65) Prior Publication Data
US 2010/0029303 A1  Feb. 4, 2010

Related U.S. Application Data

(63) Continuation of application No. PCT/KR2005/001245, filed on Apr. 29, 2005.

(30) Foreign Application Priority Data

| | | |
|---|---|---|
| May 3, 2004 | (KR) | 10-2004-0031114 |
| Sep. 8, 2004 | (KR) | 10-2004-0071666 |
| Feb. 24, 2005 | (KR) | 10-2005-0015274 |

(51) Int. Cl.
  *H04M 1/00* (2006.01)

(52) U.S. Cl. .............. 455/566; 455/414.1; 709/223
(58) Field of Classification Search ............ 455/566, 455/414.1; 709/223
See application file for complete search history.

(56) References Cited

U.S. PATENT DOCUMENTS

| | | | |
|---|---|---|---|
| 6,850,781 B2 * | 2/2005 | Goto | 455/566 |
| 2002/0077121 A1 | 6/2002 | Ketola | |
| 2004/0077340 A1 * | 4/2004 | Forsyth | 455/414.1 |
| 2005/0153745 A1 * | 7/2005 | Smethers | 455/566 |
| 2005/0154796 A1 * | 7/2005 | Forsyth | 710/1 |

FOREIGN PATENT DOCUMENTS

| | | |
|---|---|---|
| JP | 9091358 | 4/1997 |
| JP | 2000049912 | 2/2000 |

(Continued)

OTHER PUBLICATIONS

Office Action for corresponding Japanese Application No. 2007-511274, mailing date Dec. 1, 2009.

(Continued)

*Primary Examiner* — Charles Shedrick
(74) *Attorney, Agent, or Firm* — Intellectual Property Law Group LLP; Juneko Jackson; Otto O. Lee

(57) ABSTRACT

The present invention relates to a method and apparatus of an idle state of a mobile terminal. One embodiment relates to a method and apparatus that display message in an idle state of a mobile terminal. Another embodiment relates to a method and apparatus for driving an application for an idle state in a mobile terminal. A further embodiment relates to a method and apparatus for providing idle state contents to a mobile terminal.

8 Claims, 49 Drawing Sheets

FOREIGN PATENT DOCUMENTS

| | | |
|---|---|---|
| JP | 2000156889 | 6/2000 |
| JP | 2002297486 | 10/2002 |
| JP | 2003032750 | 1/2003 |
| JP | 2003515834 | 5/2003 |
| JP | 2004078467 | 3/2004 |
| WO | WO03075547 | 9/2003 |

OTHER PUBLICATIONS

World Intellectual Property Organization, International Search Report for PCT/KR2005/001245.

* cited by examiner

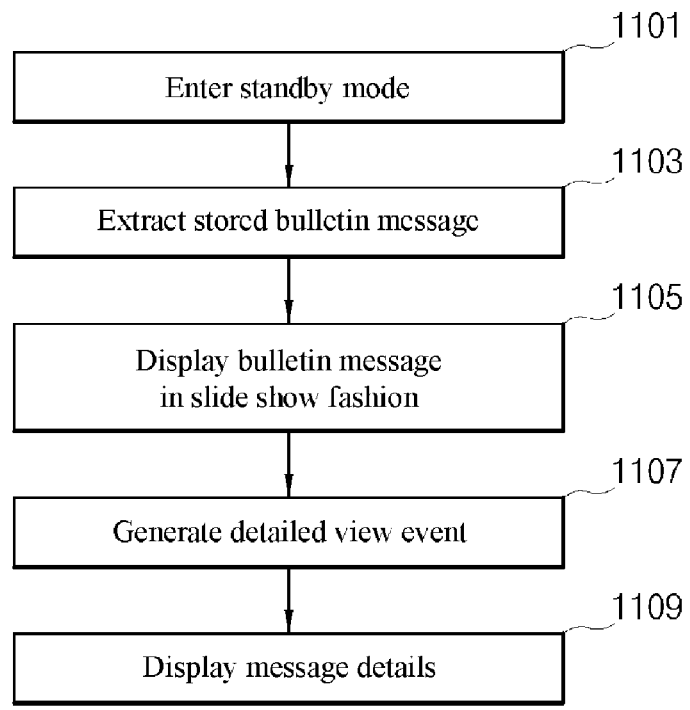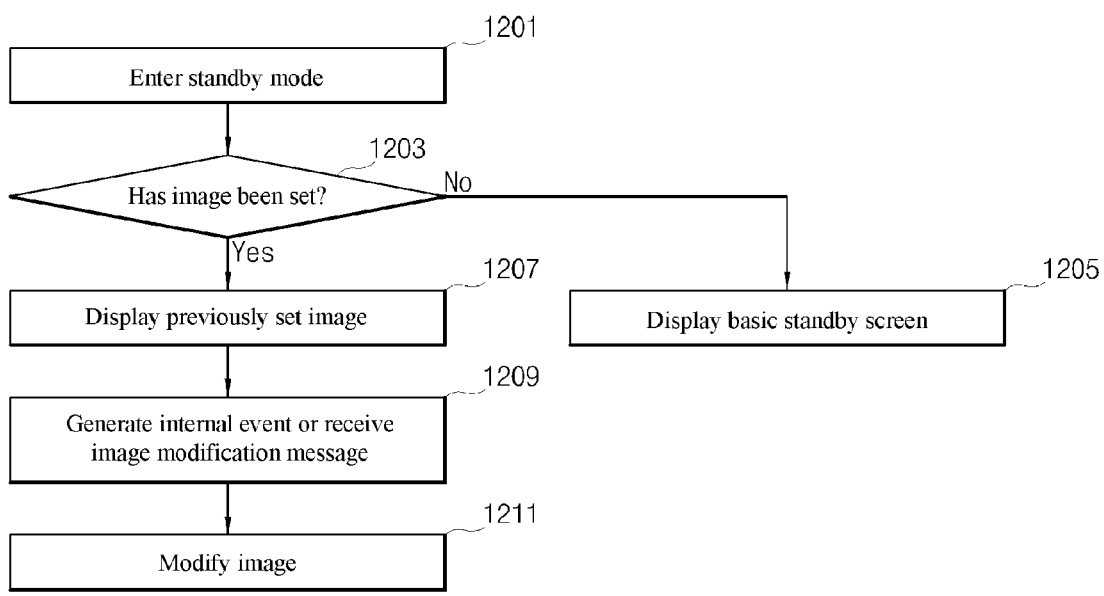

FIG. 38

| | | |
|---|---|---|
| Customer A | Terminal information | 3803 |
| | Application information | 3805 |
| | Last update time | 3807 |
| Customer B | Terminal information | |
| | Application information | |
| | Last update time | |

3801

METHOD AND APPARATUS FOR DISPLAYING MESSAGES IN AN IDLE STATE OF MOBILE TERMINAL, DRIVING AN APPLICATION FOR AN IDLE STATE IN A MOBILE TERMINAL AND PROVIDING IDLE STATE CONTENTS FOR A MOBILE TERMINAL

CROSS-REFERENCE TO RELATED APPLICATIONS

This is a continuation of International Application PCT/KR2005/001245, with an international filing date of Apr. 29, 2005 and claims priority to Korean application no. 10-2004-0031114, filed May 3, 2004, Korean application no. 10-2004-0071666, filed Sep. 8, 2004 and Korean application no. 10-2005-0015274, filed Feb. 24, 2005; all which are hereby incorporated by reference.

BACKGROUND OF THE INVENTION

1. Technical Field

The present invention relates to a method and apparatus for providing service in which a message received using Short Messaging Service and Cell Broadcasting Service by a mobile terminal in standby mode is output to a display unit in bulletin board form, and a standby screen image is changed. Furthermore, the present invention relates to a method and apparatus for driving an application for standby mode, and a method and apparatus for transmitting standby mode content to a mobile terminal.

2. Related Art

In the prior art, the entire standby screen of a mobile terminal is used for basic standby screens of the terminal, such as desktop content, a scheduler, and a clock. A conventional standby screen processing procedure is described with reference to FIG. 1 below.

FIG. 1 is a flowchart illustrating the prior art standby screen processing procedure in a mobile terminal.

Referring to FIG. 1, if a call end button of the mobile terminal is input or there has been no key input for a predetermined time, the mobile terminal enters standby mode (step 101). When the mobile terminal enters standby mode, it executes a standby screen processing program, which is the basic software of the mobile terminal, under the control of a control unit (step 103). Thereafter, the standby screen processing program loads and displays standby screen content that are previously set by the user of the mobile terminal or are basically set for the mobile terminal (step 105). The mobile terminal outputs the standby screen content to a display unit (step 107) and waits for the user's key input (step 109). At this time, the standby screen processing program may download only media content that can be processed by the mobile terminal, and may use the downloaded media content as standby screen content. However, the standby screen processing program cannot use new media content, which is not supported by the mobile terminal, as the standby screen content even if it downloads the new media content. Furthermore, there is a problem in that common content other than the standby screen content may not be suitable for being output to a screen or executed in standby mode. In order to solve these problems, Korean Pat. Appl. No. 10-2003-0014687 filed on Mar. 10, 2003 and entitled "Method of Reproducing Interactive Standby mode content in Mobile Communication Terminal and Mobile Communication Terminal Using the Same" (hereinafter referred to as the "prior art invention") was disclosed on Nov. 14, 2003. The prior art invention will be schematically described with reference to FIG. 2.

FIG. 2 is a flowchart schematically illustrating the prior art method of reproducing interactive standby mode content in a mobile terminal.

Referring to FIG. 2, if a system is initialized or a user does not operate the terminal for a predetermined time, the mobile terminal enters standby mode (step 201). Thereafter, the mobile terminal executes an interactive content player (step 203), and reproduces interactive content set as standby screen moving image content and displays it on a screen of the terminal (step 205). Thereafter, the mobile terminal continues to display the set screen until an external event occurs. Since the interactive standby mode content includes a plurality of frames, the mobile terminal determines whether an external event is a "next screen update" (step 209) if the external event occurs (step 207). If, as a result of the determination, the external event is a "next screen update", the mobile terminal updates the set screen with a next frame and continues to perform step 205.

Meanwhile, if the event is not a "next screen update", the mobile terminal determines whether the event is an interactive content manipulation key input, which is set for the interactive content being displayed on the terminal screen as a current standby screen moving image (step 211). If, as a result of the determination, the event is the interactive content manipulation key input, the mobile terminal performs a series of operations, which are defined as being performed to correspond to the input key, on the interactive content and then waits for the next event (step 213). Meanwhile, if the generated external event is not an interactive content manipulation key input, the mobile terminal performs a process corresponding to a standby screen key input (step 215). The standby screen key input includes number key inputs, and inputs for telephone reception and Short Messaging Service (SMS) reception.

The prior art invention is capable of reproducing the interactive content in standby mode. However, the prior art invention cannot display a message, which is received using SMS and Cell Broadcasting Service (CBS), on the display unit in standby mode in bulletin board form. Furthermore, the prior art invention has a disadvantage in that it cannot change a standby screen image based on an event generated in the mobile terminal. Furthermore, the prior art invention has another disadvantage in that it cannot freely set the type of content to be output to the standby screen.

Furthermore, a service called a ticker service (e.g., stock information, newsflash, etc.) refers to a service in which particular content is displayed on a screen viewed by a user in a periodic or ongoing manner. Such ticker service is provided in a wired manner in various ways, and is provided in a wireless manner by way of SMS or CBS. The ticker service provided in a wireless manner using SMS or CBS has disadvantages in that the message capacity thereof is limited, the type of media content is limited to text, and the ticker service cannot be provided at a time desired by a user. With the development of wireless communication and the advent of terminals supporting multimedia, the advent of various content provided through ticker service is expected. Thus, the need to support the unrestricted ticker service is increasing.

The prior art invention has an advantage in that the prior art invention can allow a user to easily view information through access to a particular website by pressing a specific key because the prior art invention can reproduce interactive content in standby mode. However, the prior art invention has a disadvantage in that the prior art invention can only reproduce content in standby mode but cannot use the content in ticker form. Furthermore, in the prior art invention, content continues to be reproduced even when the user is not using the terminal, notwithstanding that a user does not usually concentrate on a standby screen. Thus, it is wasteful and pointless to reproduce content in standby mode.

SUMMARY OF THE INVENTION

Accordingly, an object of the present invention is to provide a method and apparatus that output messages, which are received using SMS and CBS, to a display unit in standby mode in bulletin form.

Another object of the present invention is to provide a method and apparatus that change the image of a standby screen according to an event that occurs in a mobile terminal.

A further object of the present invention is to provide a standby screen occupation representation type application that can output a message and an image from a standby screen to a display unit while occupying the standby screen in a mobile terminal.

A still further object of the present invention is to provide a method and apparatus that allow the type of content, which will be output as a standby screen, to be freely set or changed through the standby screen occupation representation type application.

A still further object of the present invention is to provide a method and apparatus for providing content, which can output the content using the format, time and mode desired by a user by executing an application selected by the user in the standby mode of a mobile terminal that is usually carried by the user.

A still further object of the present invention is to provide a method and apparatus for providing a quick launch type list in the standby mode of a mobile terminal, which can easily and rapidly transfer selected application information desired by a user.

A still further object of the present invention is to provide a method and apparatus that can automatically execute an application, which is chosen by a user, in standby mode after displaying content by executing the application.

A still further object of the present invention is to provide a method and apparatus for providing content, which can output the content in the format, time and mode desired by a user in the standby state of a mobile terminal that is usually carried by the user.

A still further object of the present invention is to provide a method and apparatus for providing content capable of being reproduced in the standby mode of a mobile terminal, which can easily and rapidly transfer various pieces of information by providing the content in ticker form at the time desired by a user.

A still further object of the present invention is to provide a method and apparatus for providing content capable of being reproduced in the standby mode of a mobile terminal, which can be used for advertisement, education, and memorization by providing the content at the time desired by a user.

TECHNICAL SOLUTION

In order to accomplish the above objects, according to an aspect of the present invention, there is provided a method of outputting a message to the display unit of a mobile terminal, which is connected to a service management server and a content providing server via a wired/wireless communication network, which includes memory, a control unit, a display unit and a key input unit, in which a standby screen occupation representation type application is installed, in standby mode, the method including the steps of receiving at least one message from the service management server, wherein the message is generated by the service management server on the basis of information provided by the content providing server that provides desired information previously set by a user of the mobile terminal for reception; determining whether the message is a bulletin message; if, as a result of the determination, the message is the bulletin, storing the message in the memory; driving the standby screen occupation representation type application in standby mode under the control of the control unit; extracting the message using the standby screen occupation representation type application; and outputting the extracted message to the display unit.

In a preferred embodiment, the standby screen occupation representation type application is transmitted from the service management server to the mobile terminal in a download manner. The standby screen occupation representation type application is executed in a mobile platform of the mobile terminal. Furthermore, the mobile platform is any one of GVM, SK-VM, KVM, MAP, BREW and WIPI.

The method further includes the steps of activating the standby screen occupation application by pressing at least one key of the display unit; and driving an application corresponding to the message by pressing at least one key of the display unit.

The message is transmitted from the service management server to the mobile terminal using one of SMS and CBS. The message includes a message header, bulletin contents and message details. The message header includes a Telesvc-id, storage time, a content ID and a callback Uniform Resource Locator (URL). If the message has Telesvc-id in the message header, the message is determined to be a bulletin message and thus stored in the memory using the standby screen occupation representation type application. The bulletin contents of the message are output to the display unit in a slide show fashion. If at least one key input of the key input unit is input while the message bulletin contents are being output to the display unit in a slide show fashion, the message details are output to the display unit. If at least one key of the key input unit is input while the message bulletin contents are being output to the display unit in a slide show fashion, the mobile terminal gains access to the content providing server using the callback URL and outputs the message contents to the display unit of the mobile terminal. If the content ID has a highly important grade, the message details are output to the display unit.

In accordance with another aspect of the present invention, there is provided a method of outputting a message to the display unit of a mobile terminal, which is connected to a service management server and a content providing server via a wired/wireless communication network, which includes memory, a control unit, a display unit and a key input unit, in which a standby screen occupation representation type application is installed, in standby mode, the method including the steps of downloading at least one piece of image information from the service management server, wherein the image information is generated in the content providing server that provides an image previously set by a user of the mobile terminal; storing the image information in the memory; driving the standby screen occupation representation type application in standby mode under the control of the control unit; extracting the image information using the standby screen occupation representation type application; outputting the image to the display unit on the basis of the extracted image information; transmitting a first image modification request signal to the service management server, wherein the service management server transmits a second image modification request signal to the content providing server in response to the first image modification request signal and receives image modification information in response to the second image modification request signal; receiving an image modification message from the service management server in accordance with the image modification information; and modifying the image on the basis of the image modification message and outputting the modified image to the display unit.

The method further includes the step of modifying the image according to a predetermined method in response to any one of a lid open event of the mobile terminal, a key input event of the key input unit, a timer event and an alarm event, and outputting the modified image to the display unit.

In a preferred embodiment, the first image modification request signal is transmitted to the service management server according to a predetermined method in response to any one of a lid open event of the mobile terminal and a key input event of the key input unit.

In accordance with another aspect of the present invention, there is provided a method of outputting a message to the display unit of a mobile terminal, which is connected to a service management server and a content providing server via a wired/wireless communication network, which includes memory, a control unit, a display unit and a key input unit, in which a standby screen occupation representation type application is installed, in standby mode, the method including the steps of downloading at least one piece of image information from the service management server, wherein the image information is generated in the content providing server that provides an image previously set by a user of the mobile terminal; storing the image information in the memory; driving the standby screen occupation representation type application in standby mode under the control of the control unit; extracting the image information using the standby screen occupation representation type application; outputting the image to the display unit on the basis of the extracted image information; transmitting an image modification request signal to the content providing server; receiving an image modification message from the content providing server in response to the image modification request signal; and modifying the image on the basis of the image modification message and outputting the modified image to the display unit.

In accordance with another aspect of the present invention, there is provided a method of outputting a message from a service management server to a display unit of a mobile terminal in standby mode of the mobile terminal, the service management server being connected to at least one mobile terminal and at least one content providing server via a wired/wireless communication network, the method including the steps of receiving service setting information from the mobile terminal, wherein the service setting information includes a content type related to at least one of a bulletin message and an image that will be output from the mobile terminal to the display unit; transmitting a content request signal to the content providing server on the basis of the service setting information; receiving content in response to the content request signal; processing the content into message form; and transmitting the processed message to the mobile terminal; wherein the mobile terminal stores the received message in memory, executes a standby screen occupation representation type application in standby mode, extracts the message using the standby screen occupation representation type application, and outputs the extracted message to the display unit in the form of at least one of the bulletin message and the image.

In accordance with another aspect of the present invention, there is provided a mobile terminal which is connected to a service management server and a content providing server via a wired/wireless communication network and outputs a message to a display unit in standby mode, which has memory, a control unit, the display unit and a key input unit, and in which a standby screen occupation representation type application is installed, the mobile terminal including a means for receiving at least one image message from the service management server, wherein the message is generated by the service management server on the basis of information provided by the content providing server that provides desired information previously set by a user of the mobile terminal; a means for determining whether the message is a bulletin message; a means for storing the message in the memory if the message is a bulletin message as a result of the determination; a means for executing the standby screen occupation representation type application in standby mode under the control of the control unit; a means for extracting the message using the standby screen occupation representation type application; and a means for outputting the extracted message to the display unit.

In accordance with another aspect of the present invention, there is provided a mobile terminal which is connected to a service management server and at least one content providing server via a wired/wireless communication network and outputs a message to a display unit in standby mode, which has memory, a control unit, the display unit and a key input unit, and in which a standby screen occupation representation type application is installed, the mobile terminal including a means for downloading at least one piece of image information from the service management server, wherein the image information is generated in the content providing server that provides an image previously set by a user of the mobile terminal; a means for storing the image information in the memory; a means for executing the standby screen occupation representation type application in standby mode under the control of the control unit; a means for extracting the image information using the standby screen occupation representation type application; a means for outputting the image to the display unit on the basis of the extracted image information; a means for transmitting a first image modification request signal to the service management server, wherein the service management server transmits a second image modification request signal to the content providing server in response to the first image modification request signal, and receives image modification information in response to the second image modification request signal; a means for receiving an image modification message from the service management server in accordance with the image modification information; and a means for modifying the image on the basis of the image modification message and outputting the modified image to the display unit.

In accordance with another aspect of the present invention, there is provided a mobile terminal which is connected to a service management server and at least one content providing server via a wired/wireless communication network and outputs a message to a display unit in standby mode, which has memory, a control unit, the display unit and a key input unit, and in which a standby screen occupation representation type application is installed, the mobile terminal including a means for downloading at least one piece of image information from the service management server, wherein the image information is generated in the content providing server that provides an image previously set by a user of the mobile terminal; a means for storing the image information in the memory; a means for executing the standby screen occupation representation type application in standby mode under the control of the control unit; a means for extracting the image information using the standby screen occupation representation type application; a means for outputting the image to the display unit on the basis of the extracted image information; a means for transmitting an image modification request signal to the content providing server; a means for receiving an image modification message from the content providing server in response to the image modification request signal; and a means for modifying the image on the basis of the image modification message and outputting the modified image to the display unit.

In accordance with another aspect of the present invention, there is provided a service management server that is connected to at least one mobile terminal and at least one content providing server via a wired/wireless communication network and outputs a message to the display unit of the mobile terminal in standby mode of the mobile terminal, the service management server including a means for receiving service setting information from the mobile terminal, wherein the service setting information includes content of a type related to at least one of a bulletin message and an image that will be output from the mobile terminal to the display unit; a means for transmitting a content request signal to the content providing server on the basis of the service setting information; a means for receiving content in response to the content request signal; a means for processing the content into message form; and a means for transmitting the processed message to the mobile terminal; wherein the mobile terminal stores the received message in memory, executes a standby screen occupation representation type application in standby mode, extracts the message using the standby screen occupation representation type application, and outputs the extracted message to the display unit in the form of at least one of the bulletin message and the image.

In accordance with another aspect of the present invention, there is provided a mobile terminal which is connected to a service management server and a content providing server via a wired/wireless communication network and outputs a message to a display unit in standby mode, which has memory, a control unit, the display unit and a key input unit, and in which a standby screen occupation representation type application is installed, the mobile terminal including memory for storing a program; and a processor for executing the program in conjunction with the memory; wherein the processor, using the program, receives at least one image message from the service management server, the message being generated by the service management server based on information provided by the content providing server that provides desired information previously set by the user of the mobile terminal, determines whether the message is a bulletin message, stores the message in the memory if the message is the bulletin as a result of the determination, drives the standby screen occupation representation type application in standby mode under the control of the control unit, extracts the message using the standby screen occupation representation type application, and outputs the extracted message to the display unit.

In accordance with another aspect of the present invention, there is provided a mobile terminal which is connected to a service management server and a content providing server via a wired/wireless communication network and outputs a message to a display unit in standby mode, which has memory, a control unit, the display unit and a key input unit, and in which a standby screen occupation representation type application is installed, the mobile terminal including memory for storing a program; and a processor for executing the program in conjunction with the memory; wherein the processor, using the program, downloads at least one piece of image information from the service management server, the image information being generated in the content providing server that provides an image previously set by the user of the mobile terminal, stores the image information in the memory, drives the standby screen occupation representation type application in standby mode under the control of the control unit, extracts the image information using the standby screen occupation representation type application, outputs the image to the display unit based on the extracted image information, transmits a first image modification request signal to the service management server, the service management server transmitting a second image modification request signal to the content providing server in response to the first image modification request signal and receiving image modification information corresponding the second image modification request signal, receives an image modification message corresponding to the image modification information from the service management server, modifies the image based on the image modification message and outputs the modified image to the display unit.

In accordance with another aspect of the present invention, there is provided a service management server that is connected to at least one mobile terminal and at least one content providing server via a wired/wireless communication network and outputs a message to the display unit of the mobile terminal in standby mode of the mobile terminal, including memory for storing a program; and a processor for executing the program in conjunction with the memory; wherein the processor, using the program, receives service setting information from the mobile terminal, the service setting information including a content type related to at least one of a bulletin message and an image that will be output from the mobile terminal to the display unit, transmits a content request signal to the content providing server based on the service setting information, receives content in response to the content request signal, processes the content into message form, and transmits the processed message to the mobile terminal; and wherein the mobile terminal stores the received message in memory, executes a standby screen occupation representation type application in standby mode, extracts the message using the standby screen occupation representation type application, and outputs the extracted message to the display unit in the form of at least one of a bulletin message and an image.

In accordance with another aspect of the present invention, there is provided a method of driving an application for standby mode that is performed by a mobile terminal connected to a service management server through a mobile communication network, the method including the steps of transmitting a content information request signal to the service management server; receiving content information corresponding to the content information request signal from the service management server, wherein the service management server assigns service channels on a content basis; configuring an application response packet based on the content information; and outputting a content list in standby mode based on the application response packet; wherein the output content list includes at least one content item including a quick launch function.

In a preferred embodiment, the method may further include the step of driving a standby screen occupation representation type application in standby mode before the application response packet is configured. The method may further including the step of outputting an application information list if an agent key is pressed by a user while the standby screen occupation representation type application is output. The method may further include the steps of receiving a selection signal for a selected application item from the user based on the application information list; and driving a selected application in response to the selection signal.

In accordance with another aspect of the present invention, there is provided a mobile terminal that is connected to a service management server via a mobile communication network and performs an application for standby mode, the mobile terminal including memory for storing a program; and a processor for executing the program in conjunction with the memory; wherein the processor, using the program, performs the steps of transmitting a content information request signal to the service management server; receiving content information corresponding to the content information request signal from the service management server, wherein the service management server assigns service channels on a content basis; configuring an application response packet based on the content information; and outputting a content list in standby mode based on the application response packet; wherein the output content list includes at least one content item having a quick launch function.

In accordance with another aspect of the present invention, there is provided a method of providing standby mode content to a mobile terminal in a service management server connected to at least one mobile terminal and at least one content providing server via a wired/wireless communication network, the method including the steps of transmitting a content information request signal to the content providing server at predetermined intervals; receiving content information in response to the content information request signal; updating current content information in the server based on the received content information; receiving the content information request signal from the mobile terminal; processing content information corresponding to the content information request signal into message form; and transmitting the processed message to the mobile terminal; wherein the mobile terminal stores the received message in memory, executes a standby screen occupation representation type application in standby mode, extracts the message using the standby screen occupation representation type application, and outputs the message to the display unit through at least one of bulletin message form and image form.

In a preferred embodiment, the standby screen occupation representation type application is previously downloaded by the mobile terminal from the service management server. The standby screen occupation representation type application is executed in a mobile platform of the mobile terminal. The mobile platform is one of GVM, SK-VM, KVM, MAP, BREW and WIPI. The message includes a message header, bulletin contents and message details. The message header includes a Telesvc-id, storage time, a content ID and a callback URL. If the message has Telesvc-id in the message header, the message is determined to be a bulletin message and thus stored in the memory using the standby screen occupation representation type application. Message contents are output to the display unit in a slide show fashion.

In accordance with another aspect of the present invention, there is provided a method of providing standby mode content to the mobile terminal in a service management server connected to at least one mobile terminal and at least one content providing server via a wired/wireless communication network, the method including the steps of receiving updated content information from the content providing server whenever content is updated in the content providing server; updating current content information in the server based on the received content information; receiving the content information request signal from the mobile terminal; processing content information corresponding to the content information request signal into message form; and transmitting the processed message to the mobile terminal; wherein the mobile terminal stores the received message in memory, executes a standby screen occupation representation type application in standby mode, extracts the message using the standby screen occupation representation type application, and outputs the message to the display unit in at least one of bulletin message form and image form.

In accordance with another aspect of the present invention, there is provided a method of providing standby mode content to the mobile terminal in a service management server connected to at least one mobile terminal and at least one content providing server via a wired/wireless communication network, the method including the steps of transmitting a content information request signal to the content providing server at predetermined intervals; receiving content information in response to the content information request signal; updating current content information in the server based on the received content information; comparing content status of the mobile terminal with content information update status; if, as a result of the comparison, the content update status is newer than the content status of the mobile terminal, processing the content information into message form; and transmitting the processed message to the mobile terminal; wherein the mobile terminal stores the received message in memory, executes a standby screen occupation representation type application in standby mode, extracts the message using the standby screen occupation representation type application, and outputs the message to the display unit in at least one of bulletin message form and image form.

In accordance with another aspect of the present invention, there is provided a method of providing standby mode content to a mobile terminal in a service management server connected to at least one mobile terminal and at least one content providing server via a wired/wireless communication network, the method including the steps of receiving updated content information from the content providing server whenever content is updated in the content providing server; updating current content information in the server based on the received content information; comparing content status of the mobile terminal with content information update status; if, as a result of the comparison, the content update status is newer than the content status of the mobile terminal, processing the content information into message form; and transmitting the processed message to the mobile terminal; wherein the mobile terminal stores the received message in memory, executes a standby screen occupation representation type application in standby mode, extracts the message using the standby screen occupation representation type application, and outputs the message to the display unit through at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including a means for transmitting a content information request signal to the content providing server at predetermined intervals; a means for receiving content information in response to the content information request signal; a means for updating current content information in the server based on the received content information; a means for receiving the content information request signal from the mobile terminal; a means for processing content information corresponding to the content information request signal into message form; and a means for transmitting the processed message to the mobile terminal; wherein the mobile terminal stores the received message in memory, executes a standby screen occupation representation type application in standby mode, extracts the message using the standby screen occupation representation type application, and outputs the message to the display unit through at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including a means for receiving updated content information from the content providing server whenever content is updated in the content providing server; a means for updating current content information in the server based on the received content information; a means for receiving the content information request signal from the mobile terminal; a means for processing content information corresponding to the content information request signal into message form; and a means for transmitting the processed message to the mobile terminal; wherein the mobile terminal stores the received message in memory, executes a standby screen occupation representation type application in standby mode, extracts the message using the standby screen occupation representation type application, and outputs the message to the display unit through at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including a means for transmitting a content information request signal to the content providing server at predetermined intervals; a means for receiving content information in response to the content information request signal; a means for updating current content information in the server on the basis of the received content information; a means for comparing content status of the mobile terminal with content information update status; a means for processing the content information into message form if, as a result of the comparison, the content update status is newer than the content status of the mobile terminal; and a means for transmitting the processed message to the mobile terminal; wherein the mobile terminal stores the received message in memory, executes a standby screen occupation representation type application in standby mode, extracts the message using the standby screen occupation representation type application, and outputs the message to the display unit in at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including a means for receiving updated content information from the content providing server whenever content is updated in the content providing server; a means for updating current content information in the server based on the received content information; a means for comparing content status of the mobile terminal with content information update status; a means for processing the content information into message form if, as a result of the comparison, the content update status is newer than the content status of the mobile terminal; and a means for transmitting the processed message to the mobile terminal; wherein the mobile terminal stores the received message in memory, executes a standby screen occupation representation type application in standby mode, extracts the message using the standby screen occupation representation type application, and outputs the message to the display unit in at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including memory for storing a program; and a processor for executing the program in conjunction with the memory; wherein the processor, using the program, transmits a content information request signal to the content providing server at predetermined intervals, receives content information in response to the content information request signal, updates current content information based on the received content information, receives the content information request signal from the mobile terminal, processes content information corresponding to the content information request signal into message form, and transmits the processed message to the mobile terminal; and wherein the mobile terminal stores the received message in memory, executes a standby screen occupation representation type application in standby mode, extracts the message using the standby screen occupation representation type application, and outputs the message to the display unit through at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including memory for storing a program; and a processor for executing the program in conjunction with the memory; wherein the processor, using the program, receives updated content information from the content providing server whenever content is updated in the content providing server, updates current content information based on the content information, receives the content information request signal from the mobile terminal, processes content information corresponding to the content information request signal into message form, and transmits the processed message to the mobile terminal; and wherein the mobile terminal stores the received message in memory, executes a standby screen occupation representation type application in standby mode, extracts the message using the standby screen occupation representation type application, and outputs the message to the display unit through at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including memory for storing a program; and a processor for executing the program in conjunction with the memory; wherein the processor, using the program, transmits a content information request signal to the content providing server at predetermined intervals, receives content information in response to the content information request signal, updates current content information based on the content information, compares the content status of the mobile terminal with content information update status, processes the content information into message form if the content update status is newer than the content status of the mobile terminal as a result of the comparison, and transmits the processed message to the mobile terminal; and wherein the mobile terminal stores the received message in memory, executes a standby screen occupation representation type application in standby mode, extracts the message using the standby screen occupation representation type application, and outputs the message to the display unit through at least one of bulletin message form and image form.

In accordance with another aspect of the present invention, there is provided a service management server connected to at least one mobile terminal and at least one content providing server via a wired/wireless communication network and configured to provide standby mode content to the mobile terminal, the service management server including memory for storing a program; and a processor for executing the program in conjunction with the memory; wherein the processor, using the program, receives updated content information from the content providing server whenever content is updated in the content providing server, updates current content information based on the content information, compares content status of the mobile terminal with content information update status, processes the content information into message form if the content update status is newer than the content status of the mobile terminal as a result of the comparison, and transmits the processed message to the mobile terminal; and wherein the mobile terminal stores the received message in memory, executes a standby screen occupation representation type application in standby mode, extracts the message using the standby screen occupation representation type application, and outputs the message to the display unit through at least one of bulletin message form and image form.

In accordance with the present invention, there are provided a method and apparatus that can output received messages to a display unit in bulletin board form in standby mode using SMS and CBS.

Furthermore, in accordance with the present invention, there are provided a method and apparatus that can change a standby screen image according to an event generated in a mobile terminal.

Furthermore, in accordance with the present invention, there are provided a method and apparatus that can output a message and image to a display unit in a standby state through a standby screen occupation representation type application while occupying a standby screen in a mobile terminal.

Furthermore, in accordance with the present invention, there are provided a method and apparatus that can easily and rapidly transfer desired information to mobile communication subscribers through a standby screen.

Furthermore, in accordance with the present invention, it can be expected that the activation of the wireless Internet can be promoted and sales can increase from the standpoint of a mobile communication service provider.

Furthermore, in accordance with the present invention, an application for displaying content desired by a user can be provided.

Furthermore, in accordance with the present invention, various pieces of information can be easily and rapidly transferred by providing an application selected by a user in quick launch type list form in standby mode.

Furthermore, in accordance with the present invention, an application selected by a user can be automatically executed in standby mode after the application has been executed.

Furthermore, in accordance with the present invention, content can be provided in standby mode using the format, time and mode desired by a user.

Furthermore, in accordance with the present invention, various pieces of information can be easily and rapidly transferred by providing standby mode content at the time desired by a user in ticker form.

Furthermore, in accordance with the present invention, standby mode content can be used for advertisement, education and memorization by providing it at the time desired by a user.

These and other embodiments of the present invention are further made apparent, in the remainder of the present document, to those of ordinary skill in the art.

BRIEF DESCRIPTION OF DRAWINGS

In order to more fully describe embodiments of the present invention, reference is made to the accompanying drawings. These drawings are not to be considered limitations in the scope of the invention, but are merely illustrative.

FIG. 11 is a flowchart illustrating a procedure of outputting a bulletin message to the display unit of the mobile terminal in accordance with the first embodiment of the present invention;

FIG. 12 is a flowchart illustrating a procedure of outputting a standby screen image to the display unit and changing the standby screen image in accordance with the first embodiment of the present invention;

FIG. 38 is a diagram illustrating a user information database according to the second embodiment of the present invention;

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

First Embodiment

Figure 1:
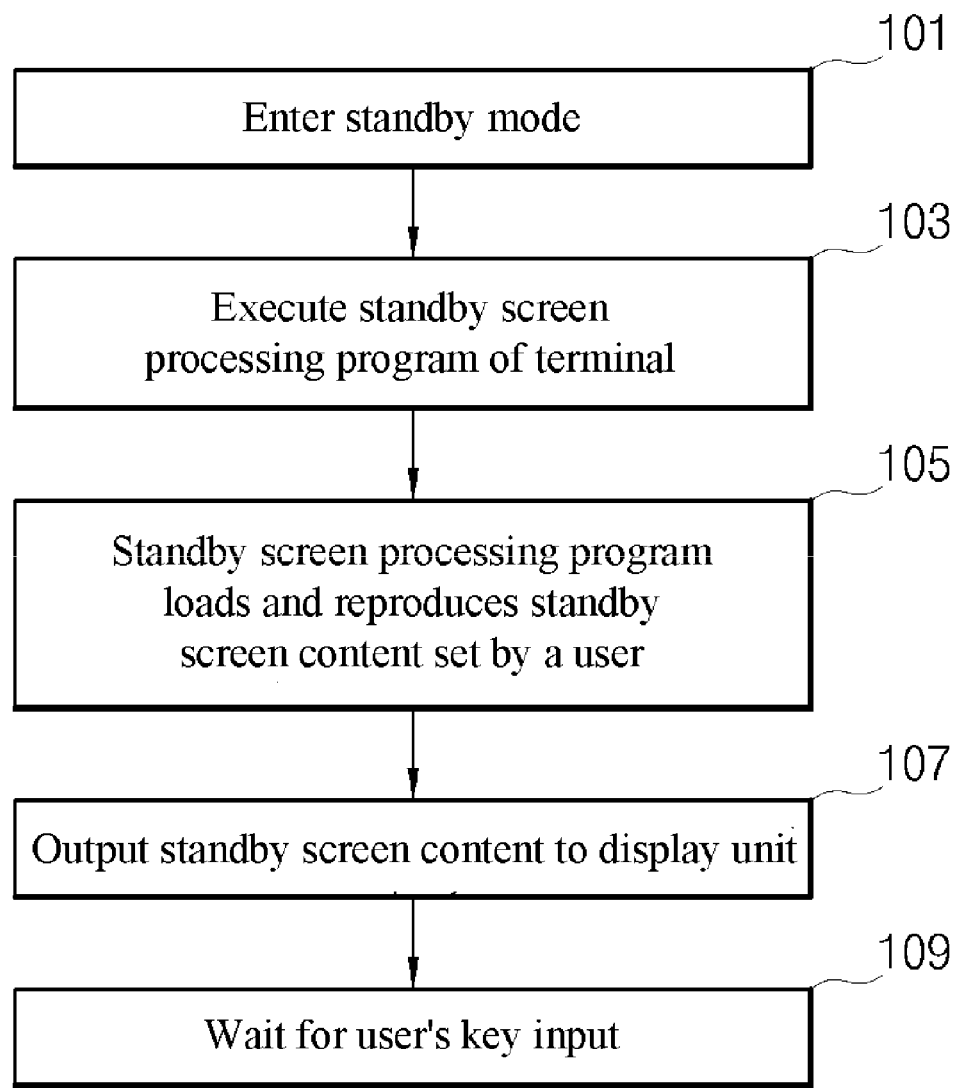
FIG. 1 is a flowchart illustrating a prior art standby screen processing procedure in a mobile terminal.
Figure 2:
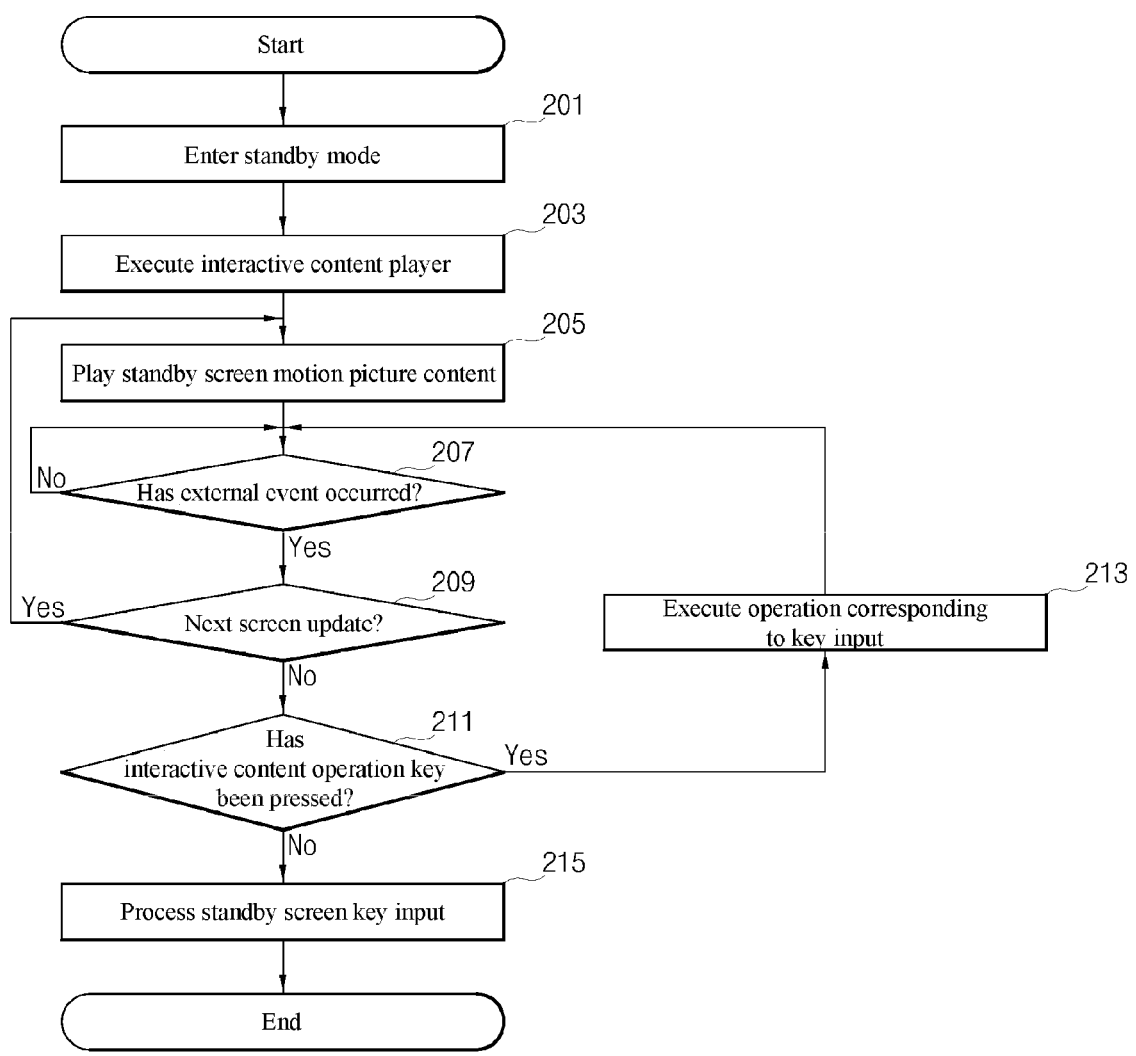
FIG. 2 is a flowchart schematically illustrating a method of reproducing interactive standby mode content in the mobile terminal.
Figure 3:
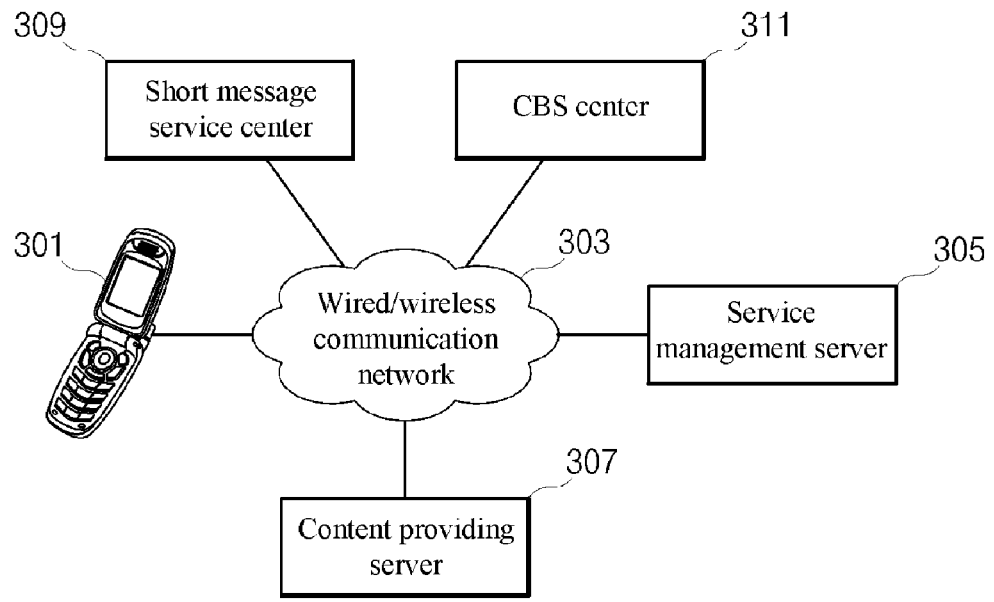
FIG. 3 is a diagram schematically illustrating the construction of an apparatus for providing standby screen occupation service in accordance with a first embodiment of the present invention.

FIG. 3 is a diagram schematically illustrating the construction of an apparatus for providing service in accordance with a first embodiment of the present invention.

Referring to FIG. 3, the system for providing standby screen service includes a mobile terminal 301, a service management server 305, a content providing server 307, a Short Messaging Service Center (SMSC) 309 and a Cell Broadcasting Service Center (CBSC) 311.

The mobile terminal 301 is provided with a mobile platform, may be provided with a standby screen occupation representation type application according to the present invention, and includes a function of exchanging messages. The mobile terminal 301 also has functions of connecting to and communicating with the service management server 305 via a wired/wireless communication network 303 and receiving a message from the service management server 305 and outputting the received message in standby mode in bulletin board form. The mobile terminal 301 includes a mobile phone, a Personal Digital Assistant (PDA) phone, a smart phone, a notebook computer, a tablet Personal Computer (PC) and the like.

The service management server 305 provides the mobile terminal 301 with the standby screen occupation representation type application according to the present invention. Furthermore, the service management server 305 functions to receive content from the content providing server 307 providing content set by the mobile terminal 301, to process the content into bulletin and standby screen images, and transmit the processed images to the mobile terminal via the SMSC 309 and the CBSC 311.

In accordance with the present invention, the content providing server 307 has an existing mobile phone function of providing various types of content as they are, and a further function of providing content information to the service management server 305 in accordance with the present invention.

The SMSC 309 and the CBSC 311 have the same functions as those in an existing wireless communication network, and a further function of receiving message information from the service management server 305 and transmitting the message information to the mobile terminal 301 in the form of a message according to the service of the present invention.

A method of providing the service according to the present invention is schematically described with reference to the above-described construction below. First, the user of the mobile terminal 301 gains access to the service management server 305 via a wired or wireless communication network, subscribes to the service according to the present invention, and then downloads the standby screen occupation representation type application, and installs it in the mobile terminal. The mobile terminal 301 can set desired content by executing the standby screen occupation representation type application. Furthermore, the mobile terminal 301 can receive an image to be output to the display unit in standby mode from the service management server 305 or the content providing server 307. Thereafter, the service management server 305 receives the content information from the content providing server 307 providing content set in the mobile terminal, processes the content information into a message according to the present invention, and transmits the processed message to the mobile terminal 301. After the mobile terminal 301 has stored the received message in memory, the mobile terminal 301 outputs the stored message in bulletin board form and the image to a standby screen by executing the standby screen occupation representation type application in standby mode. Furthermore, the mobile terminal 301 can open a lid according to a predetermined scenario, or automatically change the image in response to an event based on key input. The mobile terminal can also transmit an image modification request signal to the service management server in response to the event, receive image modification information, and change the image of a standby screen according to the image modification information.

Figure 4:
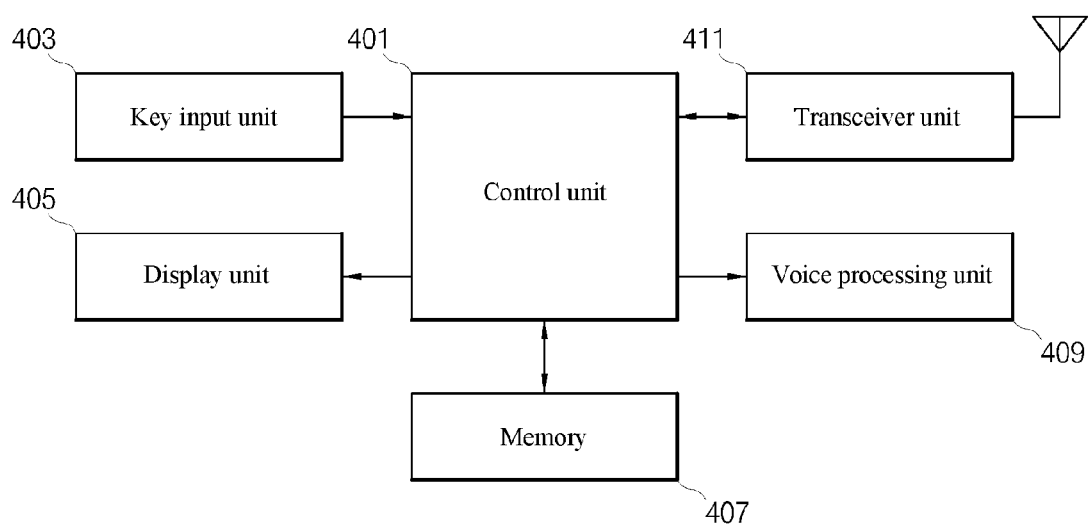
FIG. 4 is a diagram schematically illustrating the construction of a mobile terminal for providing standby screen occupation service in accordance with the first embodiment of the present invention.

FIG. 4 is a diagram illustrating the construction of a mobile terminal for providing standby screen occupation service in accordance with the first embodiment of the present invention.

Referring to FIG. 4, the mobile terminal according to the present invention includes a control unit (Central Processing Unit (CPU)) 401, a key input unit 403 in charge of inputting the various functions and operations of the mobile terminal under the control of the control unit 401, a display unit 405, memory 407, a voice processing unit 409 and a transceiver unit 411.

The control unit 401 receives a signal processed in the transceiver unit 411, and controls the overall operation of the mobile terminal. Furthermore, when the mobile terminal according to the present invention enters standby mode, the control unit 401 executes the standby screen occupation representation type application, outputs a received message to the display unit 405 in bulletin board form, and performs control such that the image of a standby screen can be changed. The control unit 401 also controls various components.

The display unit 405 is a display apparatus such as a Liquid Crystal Display (LCD), and displays the overall operational status of the mobile terminal or the progress of a program under the control of the control unit 401. That is, the display unit 405 displays the overall operational status of the mobile terminal, input user information, and so on. The display unit 405 further has a function of outputting a message in the standby mode of the mobile terminal in bulletin board form, and outputting an image to the standby screen.

The memory 407 stores operating programs and a system program of the control unit 401. The operating programs and the system program are generally stored in Read Only Memory (ROM), and can be erased when necessary. Electrically erasable ROMs can include Electrically Erasable and Programmable Read Only Memory (EEPROM), flash memory and the like. Furthermore, the memory 407 includes Random Access Memory (RAM) that temporarily stores data generated during the execution of various operating programs. The operating programs include the standby screen occupation representation type application according to the present invention. The memory 407 further has a function of storing messages received from the service management server.

The voice processing unit 409 functions to modulate a voice signal, which is received from a microphone, into voice data, and demodulate voice data, which is received from the transceiver unit 411, and voice data, which is stored in the memory 407, into a voice signal and then output the demodulated voice signal through a speaker as voice.

The transceiver unit 411 functions to convert a signal, which is output from the control unit 401, into a wireless signal and a wireless signal, which is received through an antenna, into a predetermined signal under the control of the control unit 401.

A method of outputting a message and an image to the display unit in standby mode in the mobile terminal constructed as described above is as follows. The user of the mobile terminal downloads the standby screen occupation representation type application from the service management server through the transceiver unit 411, or loads the standby screen occupation representation type application into the memory 407 by connecting to a personal computer using a cable. The user can execute the standby screen occupation representation type application and select an image to be output to the standby screen in standby mode and a message to be output in bulletin board form and to be desirably received by pressing at least one key of the key input unit 403. The mobile terminal transmits a service setting request signal corresponding to the selection to the service management server, thus completing service setting, and receives the image or the message to be output in bulletin board form in response thereto. The setting process can be performed through access to the service management server via a wired/wireless communication means, such as the Internet and an Automatic Response System (ARS), without the execution of the standby screen occupation representation type application. Thereafter, if the call end button of the key input unit 403 is pressed or if there has been no key input for a predetermined time, the mobile terminal enters standby mode under the control of the control unit 401. At this time, the mobile terminal outputs the image to the standby screen and receives the image from the service management server by driving the standby screen occupation representation type application, and outputs a message stored in the memory 407 to the display unit 405 in bulletin board form, under the control of the control unit 401.

Figure 5:
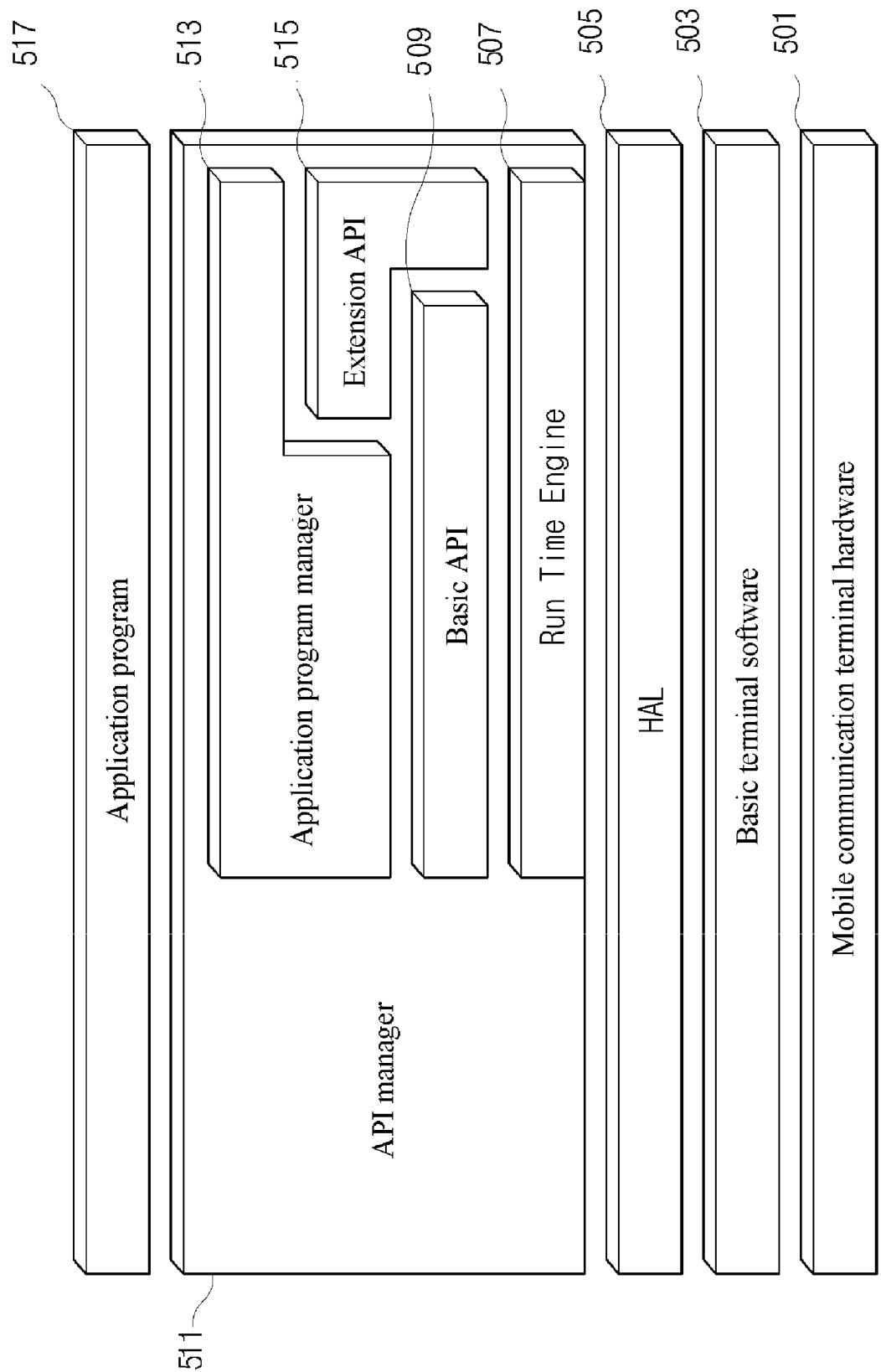
FIG. 5 is a diagram schematically illustrating the construction of the platform of the mobile terminal in which an application program for providing standby screen occupation service in accordance with the first embodiment of the present invention is installed.

FIG. 5 is a diagram illustrating the construction of the platform of a mobile terminal in which an application program for providing standby screen occupation service in accordance with the first embodiment of the present invention is installed.

Referring to FIG. 5, the mobile platform includes mobile communication terminal hardware 501, basic terminal software 503, a Handset Application Layer (HAL) 505, a run time engine 507, a basic Application Program Interface (API) 509, an API manager 511, an application program manager 513, an extension API 515 and an application program 517. The mobile platform includes GVM, SK-VM, KVM, MAP, BREW and WIPI, and has the conventional functions of an existing mobile platform as they are. The mobile platform also functions to transmit a standby screen occupation state to the service management server in the case where the standby screen occupation representation type application according to the present invention occupies the standby screen of the mobile communication terminal or exits from the standby screen occupation state.

The mobile communication terminal hardware 501 can include all mobile communication terminals or portable terminals such as a mobile phone, a PDA, a PDA phone and a smart phone. The basic terminal software 503 includes software, an LCD driver, a KPD driver and a serial driver for basic terminal operation. The HAL 505 is an abstraction layer that maintains the hardware independence of the platform, and supports independence such that upper layers can operate on the HAL 505 regardless of the types of the mobile communication terminal hardware 501 and the basic terminal software 503.

The basic API 509 is a collection of basic APIs supported in a platform used by an application program developer. The basic API 509 includes the C API and the Java API, so that it can provide convenience to program developers. The API manager 511 functions to update and add the basic API 509 and extension API 515 of the platform. Furthermore, the API manager 511 also provides a function of downloading the application program manager 513. The application program manager 513 performs the overall management functions of the application program 517 such as the viewing of information, download, installation, execution, deletion and security management. The extension API 515 is a collection of mobile platform APIs that are candidates for standardization, and provides a collection of APIs for providing various services.

The application program 517 refers to an application, which is installed in a mobile terminal having the platform installed therein and can operate regardless of the type of terminal environment or basic terminal software. The application program includes the standby screen occupation representation type application according to the first embodiment of the present invention.

With reference to the above-described construction, a method of providing service according to the present invention is described below. The mobile platform having the above-described construction is installed in the mobile communication terminal. The user of the mobile communication terminal downloads the standby screen occupation representation type application according to the present invention from the mobile communication service provider or the service management server using the application program manager 513 by manipulating the keys of the mobile communication terminal. In this case, two or more standby screen occupation representation type applications can be installed in the mobile communication terminal. The standby screen occupation representation type application can be implemented using the C language or the Java language. By executing the standby screen occupation representation type application, the user can set the standby screen occupation representation type application to occupy a standby screen, and select an image to be output to a standby screen in the memory, or set content to be output to the standby screen and receive the content from the service management server or the content providing server. The user can also set content to be output in bulletin board form in standby mode by executing the standby screen occupation representation type application. Furthermore, the user can cancel or change the service according to the present invention using the standby screen occupation representation type application. Meanwhile, the user can delete the standby screen occupation representation type application using the application program manager 513 if he does not want the service according to the present invention.

Figure 6:
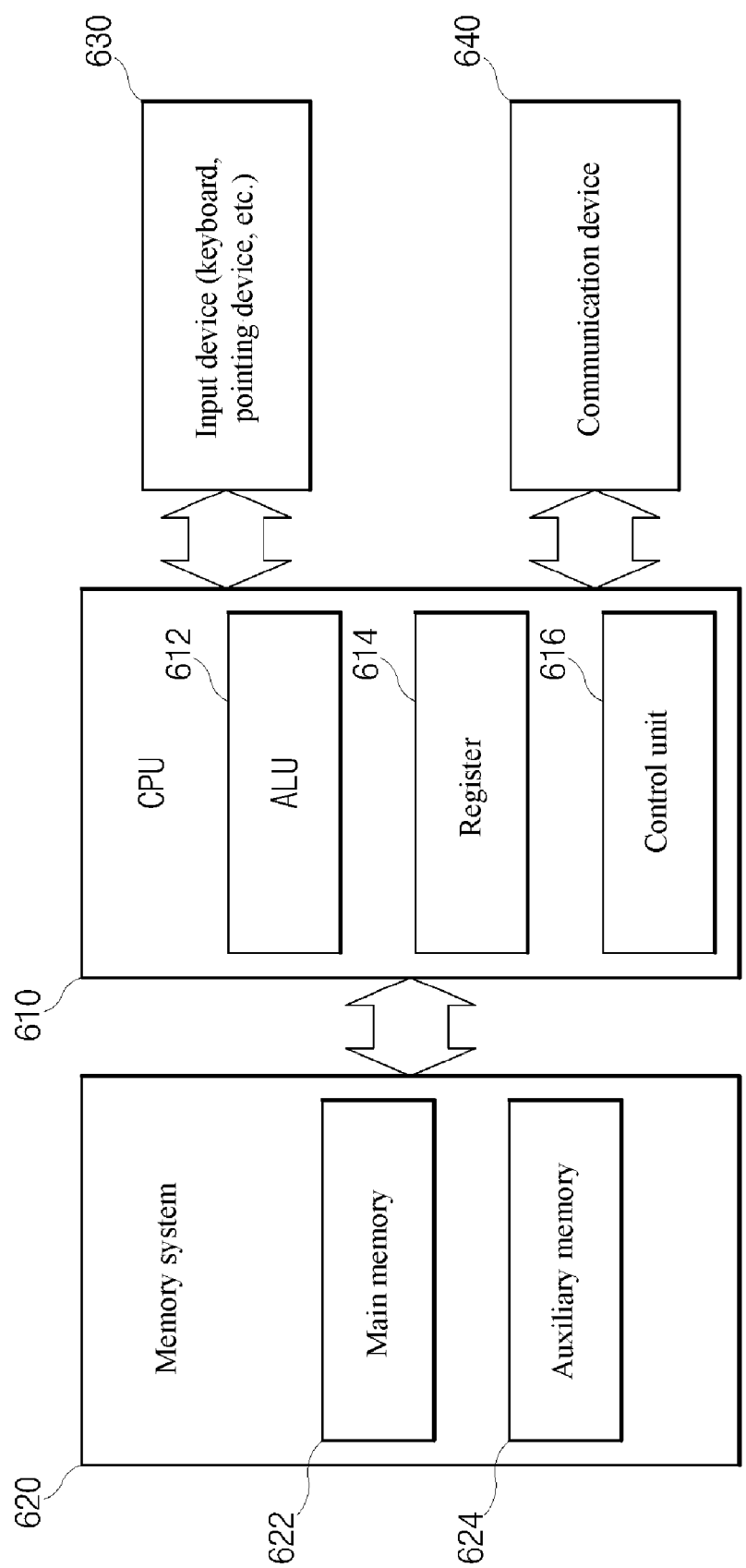
FIG. 6 is a diagram illustrating the construction of a service management server according to the first embodiment of the present invention.

FIG. 6 is a diagram illustrating the construction of the service management server according to the first embodiment of the present invention.

Referring to FIG. 6, the service management server includes a memory system 620, at least one Central Processing Unit (CPU) 610 connected to the memory system 620 and configured to perform high-speed operation, an input device 630, and a communication device 640.

The CPU 610 includes an Arithmetic Logic Unit (ALU) 612 for performing mathematical operations, a register 614 for temporarily storing data and instructions, and a control unit 616 for controlling the operation of the service management server. The CPU 610 may be a processor having one of a variety of architectures such as Alpha from Digital Equipment Corporation, MIPS from MIPS Technology, NEC, IDT, Siemens, etc., x86 from Intel Corporation, Cyrix, AMD and Nexgen, and PC (PowerPC) from IBM Corporation and Motorola.

The memory system 620 includes high-speed main memory 622 having a storage medium form such as RAM or ROM, auxiliary memory 624 having a long-term storage medium form such as a floppy disk, a hard disk, a tape, a CD-ROM or flash memory, and a device for storing data using electrical, magnetic and optical properties, and other storage media. The main memory 622 may further include video display memory that outputs an image through a display apparatus.

The input device 630 further includes a keyboard, a mouse and so on. The mouse may include a physical transducer such as a touch screen or a microphone. The communication device 640 includes a communication interface for communicating with a content providing server, a mobile terminal, etc.

Figure 7:
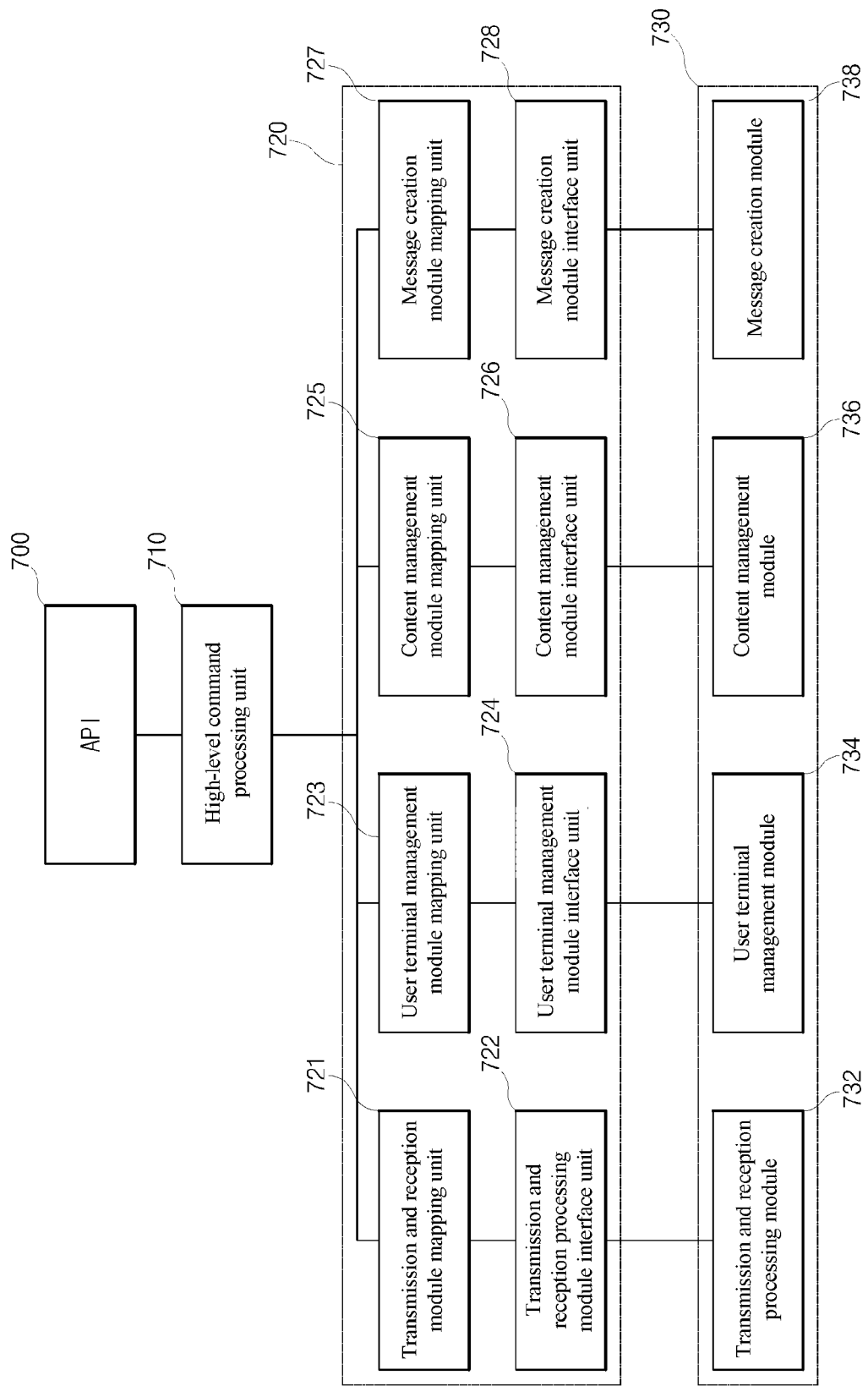
FIG. 7 is a diagram illustrating the configuration of the modules of the service management server according to the first embodiment of the present invention.

FIG. 7 is a diagram illustrating the configuration of the modules of the service management server according to the first embodiment of the present invention.

Referring to FIG. 7, the service management server may include a transmission and reception processing module 732 for processing wired and wireless communication with a content providing server, a mobile terminal, etc., a user terminal management module 734 for managing mobile terminals that have subscribed to the service according to the present invention, a content management module 736 functioning to receive content information from a corresponding content providing server and provide content to a mobile terminal so as to provide the content set in the mobile terminal, and a message creation module 738 for receiving content information from a content providing server and generating a message to be transmitted to a mobile terminal. The entire construction of the service management server according to a preferred embodiment of the present invention is described below with reference to these application modules.

The service management server may employ one of a variety of Operating Systems (OS) as a system OS. This OS controls the operation of each of the application modules 730 by providing a high-level command to an API 700.

The service management server includes a high-level command processing unit 710 that identifies a corresponding application module 730 according to a high-level command provided from the API 700, decodes the high-level command and provides the decoded high-level command to a corresponding unit. An application module control unit 720 controls the operation of the application module 730 according to a command provided from the high-level command processing unit 710. That is, the high-level command processing unit 710 determines whether an application module 730 corresponding to a high-level command provided from the API 700 exists. If a corresponding application module 730 is determined to exist, the high-level command processing unit 710 decodes the high-level command into a command that can be recognized by a corresponding application module 730, and transmits the decoded command to a corresponding mapping unit or controls transmission of a message. In this case, the application module 730 includes the transmission and reception processing module 732, the user terminal management module 734, the content management module 736 and the message creation module 738. The application module control unit 720 includes mapping units 721, 723, 725 and 727 and interface units 722, 724, 726 and 728 for the respective application modules.

The transmission and reception processing module mapping unit 721 receives a high-level command to perform wired/wireless communication with a content providing server, a mobile terminal or the like from the high-level command processing unit 710, maps the high-level command to a device-level command that can be processed by the transmission and reception processing module 732, and provides the mapped command to the transmission and reception processing module 732 through the transmission and reception processing module interface unit 722. Furthermore, the transmission and reception processing module 732 can include a physical transmission interface for transmitting or receiving data to or from a content providing server when necessary. At this time, the physical transmission interface includes a communication interface such as an SS7 voice network interface or a TCP/IP network interface.

The user terminal management module 734 manages mobile terminals that have subscribed to the service and stores service setting for each mobile terminal. In other words, the user terminal management module mapping unit 723 receives a high-level command to manage mobile terminals from the high-level command processing unit 710, maps the command to a device-level command that can be recognized by the user terminal management module 734, and provides the user terminal management module 734 with the mapped device-level command through the user terminal management module interface unit 724.

The content management module 736 manages content information received from a content providing server in order to provide an appropriate message to a mobile terminal. In other words, the content management module mapping unit 725 receives a high-level command to manage content information, which is received from a content providing server, from the high-level command processing unit 710, maps the high-level command to a device-level command that can be recognized by the content management module 736, and provides the mapped command to the content management module 736 through the content management module interface unit 726.

The message creation module mapping unit 727 generates a message to be transmitted to a mobile terminal. In other words, the message creation module mapping unit 727 receives a high-level command to generate an SMS or broadcast message from the high-level command processing unit 710, maps the high-level command to a device-level command that can be recognized by the message creation module 738, and provides the mapped command to the message creation module 738 through the message creation module interface unit 728.

Figure 8:
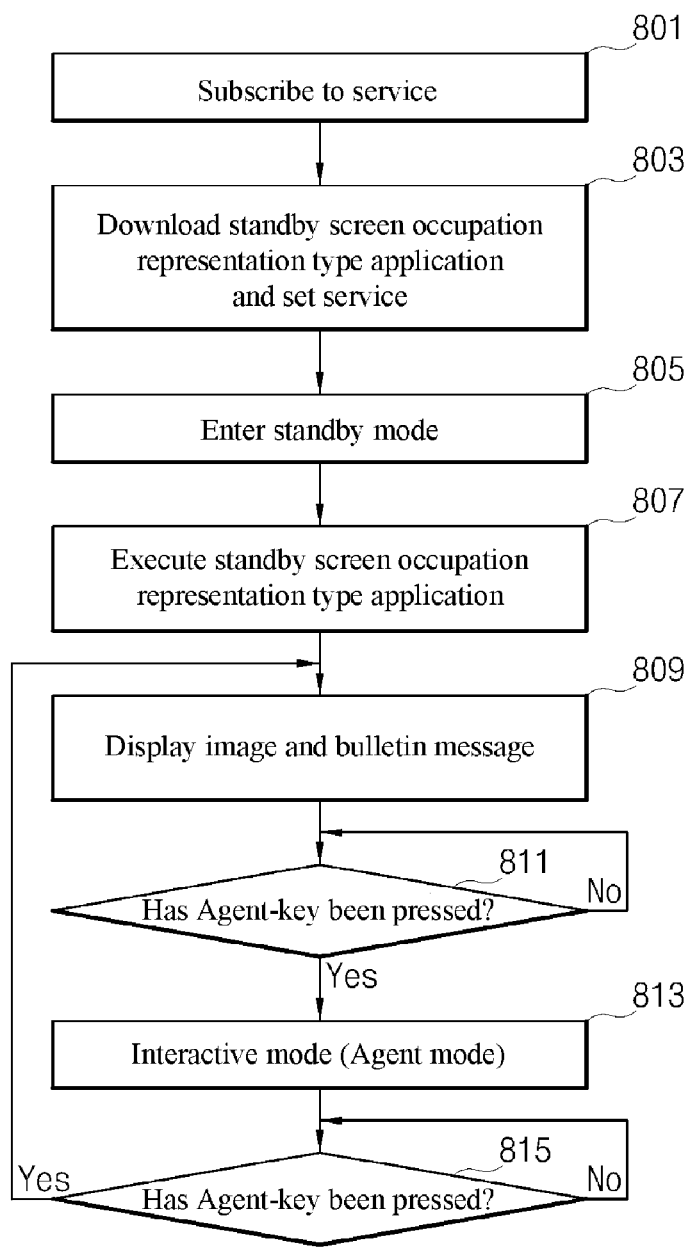
FIG. 8 is a flowchart illustrating a standby screen occupation service procedure according to the first embodiment of the present invention.

FIG. 8 is a flowchart illustrating a standby screen occupation service procedure according to the first embodiment of the present invention.

Referring to FIG. 8, the user of the mobile terminal that wants to subscribe to the service according to the present invention gains access to a service management server via a wired/wireless communication network and subscribes to the service (step 801), and downloads a standby screen occupation representation type application through the mobile terminal, installs the downloaded application in the mobile terminal and sets a service environment (step 803). The service subscription procedure at step 801 and the setting procedure at step 803 are described in detail with reference to FIG. 9.

When communication is terminated, the call end button of the key input unit is pressed or there has been no key input for a predetermined time, the mobile terminal enters standby mode (step 805). In standby mode, the mobile terminal drives the standby screen occupation representation type application under the control of a control unit (step 807). The standby screen occupation representation type application outputs a previously set standby screen image to the display unit, and outputs a message, which is received from the service management server, to the display unit in bulletin board form (step 809). The process of outputting a message to a display unit in bulletin board form at step 809 is described in detail with reference to FIG. 11, and the process of outputting an image to a display unit at step 809 is described in detail with reference to FIG. 12.

If an agent key is pressed in standby mode (step 811), the mobile terminal enters interactive mode where the standby screen occupation representation type application is activated (step 813). The agent key is automatically generated when the standby screen occupation representation type application is installed. The functions of keys other than the agent key in standby mode are the same as those of keys in a common standby mode. The process of driving the standby screen occupation representation type application in interactive mode of step 813 is described in detail with reference to FIG. 13.

If the agent key is pressed in interactive mode, the mobile terminal returns to standby mode and performs the process of step 809.

Figure 9:
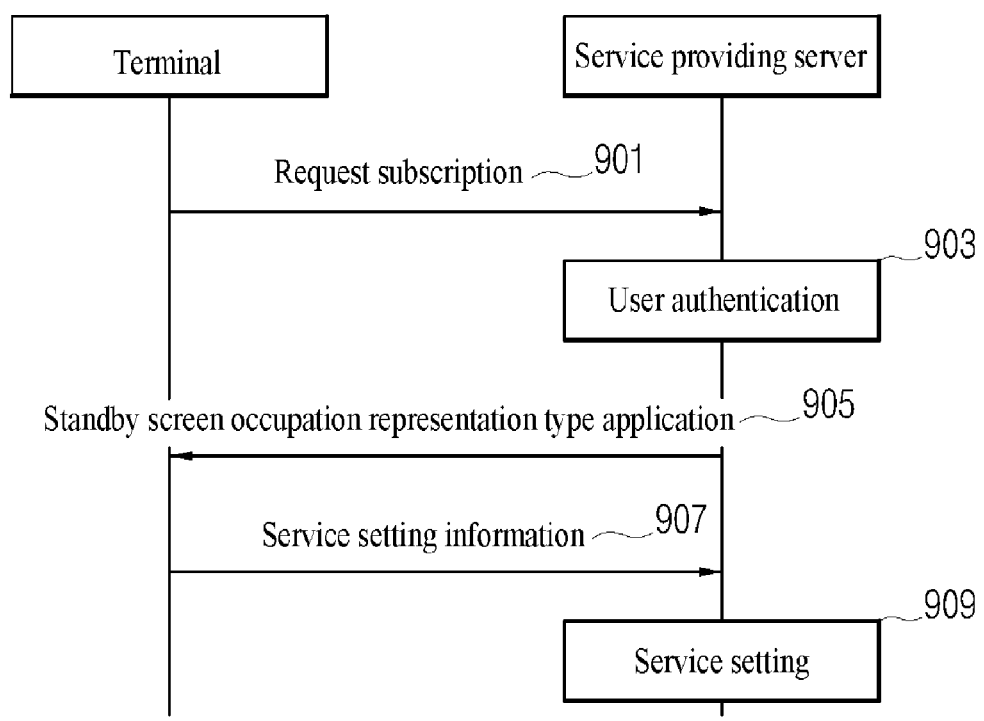
FIG. 9 is a signal flowchart illustrating a standby screen occupation service subscription procedure and a service environment setting procedure according to the first embodiment of the present invention.

FIG. 9 is a signal flowchart illustrating the standby screen occupation service subscription procedure and the service environment setting procedure according to the first embodiment of the present invention.

Referring to FIG. 9, the user of the mobile terminal gains access to the service providing server via a wired/wireless communication network, and transmits a service subscription request signal according to the present invention to the service providing server (step 901). The service providing server authenticates the user (step 903). If the authentication is successful, the service providing server transmits the standby screen occupation representation type application to the mobile terminal (step 905). The standby screen occupation representation type application can be transmitted to the mobile terminal in an Over The Air Software Download (OTA-SD) manner. Furthermore, the standby screen occupation representation type application can be transmitted to a personal computer and then uploaded to a mobile terminal while the personal computer and the mobile terminal remain connected each other, or the user can directly visit the service providing server or a communication service provider and then install the standby screen occupation representation type application in the mobile terminal. The mobile terminal transmits service setting information to the service providing server in order to set a service environment using the standby screen occupation representation type application (step 907). The service setting information includes information indicating the type of an image to be output to a standby screen in standby mode and a message to be output in bulletin board form in standby mode. The image content includes entertainment service, such as Damagochi, etc., communication service, such as messenger, and information service, such as news and weather. Furthermore, the message content for a bulletin board includes content such as stock reports, news, weather and real estate reports. At step 909, the service providing server registers the service environment of the mobile terminal and updates a service environment in the mobile terminal, on the basis of the service setting information, thereby completing service setting. Furthermore, it is to be understood that the user can set a service environment while accessing the service providing server through wired and wireless communication without executing the standby screen occupation representation type application. The process of setting a service environment by executing the standby screen occupation representation type application at step 907 and step 909 is described in detail with reference to FIGS. 16a to 16c.

Figure 10:
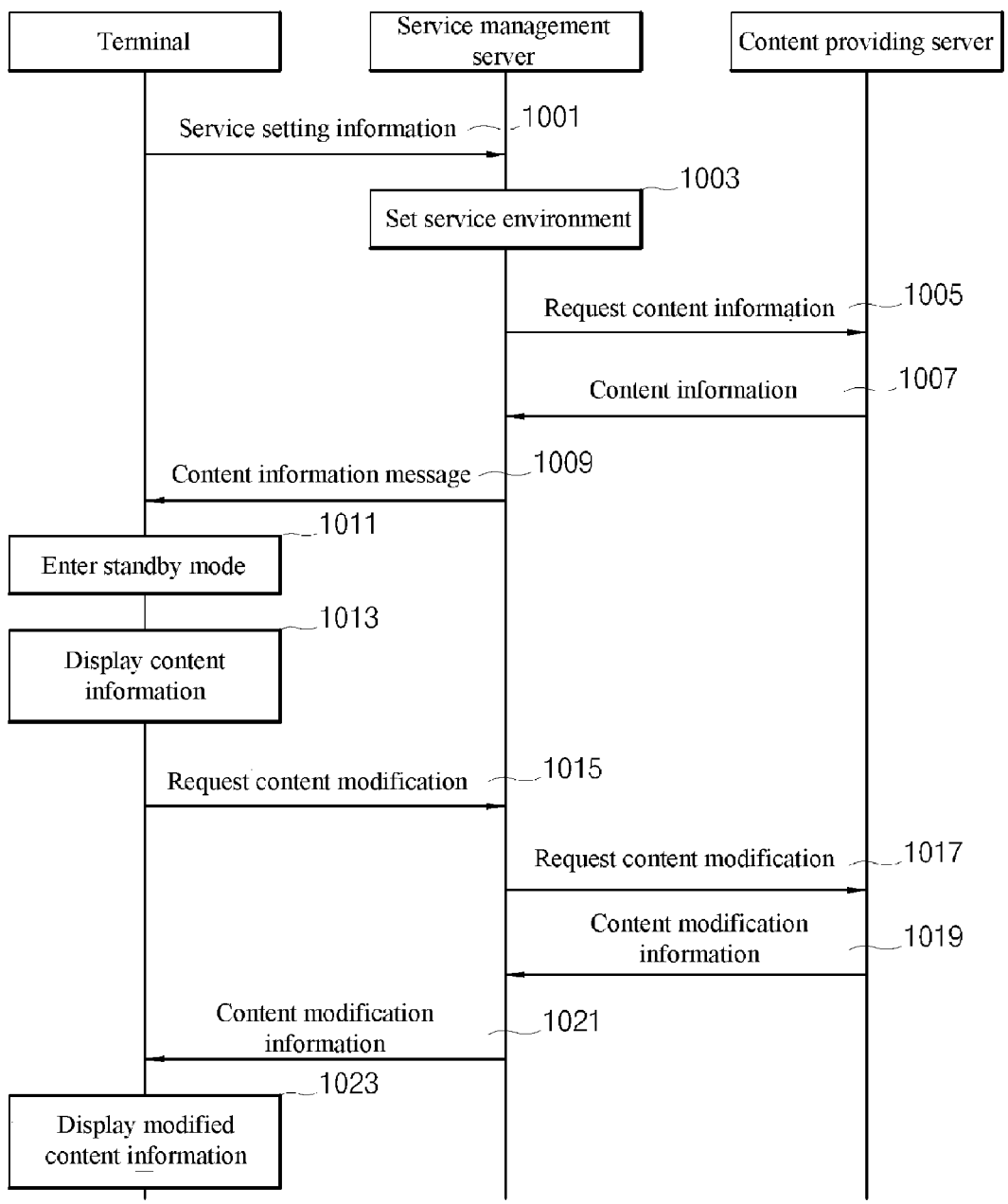
FIG. 10 is a signal flowchart illustrating a standby screen occupation service procedure according to the first embodiment of the present invention.

FIG. 10 is a signal flowchart illustrating a standby screen occupation service procedure according to the first embodiment of the present invention.

Referring to FIG. 10, the mobile terminal drives a standby screen occupation representation type application to transmit a service setting information signal to the service management server (step 1001). The service setting information includes information indicating an image to be output to a standby screen and the type of message to be output in bulletin board form in standby mode. The service management server sets and updates a service environment on the basis of the service setting information signal (step 1003). The service management server transmits a content request signal to a content providing server in order to acquire necessary content information according to the setting of the service environment (step 1005). The content providing server transmits content to the service management server in response to the content request signal (step 1007). In this case, step 1005 may be omitted, and the service management server may receive content from the content providing server and extract only content, which is set in the mobile terminal, from the received content. The service management server processes the content into message form, and transmits a message containing the content to the mobile terminal (step 1009). In this case, the content message includes image information and message information to be output in bulletin board form.

Thereafter, the mobile terminal stores the received content message in memory, and then enters standby mode (step 1011). The mobile terminal then outputs the image and the bulletin to the display unit of the mobile terminal (step 1013). Thereafter, if at least one key of the mobile terminal is pressed or if an event occurs according to a predetermined method (e.g., the opening of the lid of the mobile terminal three times), the mobile terminal transmits a content modification request signal to the service management server (step 1015). The service management server transmits the content modification request signal to the content providing server corresponding to the content modification request signal (step 1017). The content providing server transits content modification information to the service management server in response to the content modification request signal (step 1019). The service management server transmits the content modification information to the mobile terminal (step 1021). At steps 1015 to 1021, the mobile terminal can directly transmit the content modification request signal to the content providing server, and receive the content modification information from the content providing server in response to the content modification request signal. The mobile terminal modifies a standby screen image or a bulletin based on the received content modification information, and outputs the modified image and message (step 1023).

FIG. 11 is a flowchart illustrating a procedure of outputting a bulletin to the display unit of the mobile terminal in accordance with the first embodiment of the present invention.

Referring to FIG. 11, if communication is terminated, the call end button of a key input unit is pressed or there has been no key input for a predetermined time, the mobile terminal enters standby mode (step 1101). In standby mode, the mobile terminal drives a standby screen occupation representation type application to extract a bulletin stored in memory, under the control of a control unit (step 1103). In this case, the bulletin includes a message header, bulletin content and message details. The mobile terminal displays the bulletin content on a bulletin board region that is a part of the display unit in a slide show fashion (step 1105). Thereafter, if the agent key of the key input unit of the mobile terminal is pressed to activate the standby screen occupation representation type application, and at least one key of the mobile terminal is pressed to generate a detailed view event (step 1107), the mobile terminal outputs message details to the display unit (step 1109).

FIG. 12 is a flowchart illustrating a procedure of outputting a standby screen image to a display unit and changing the standby screen image in accordance with the first embodiment of the present invention.

Referring to FIG. 12, if communication is terminated, the call end button of the key input unit is pressed or there has been no key input for a predetermined time, the mobile terminal enters standby mode (step 1201). In standby mode, the mobile terminal drives a standby screen occupation representation type application and determines whether a standby screen image has been set (step 1203). If it is determined that the standby screen image has not been set, step 1205 is performed. If the standby screen image is determined to have been set, step 1207 is performed. At step 1205, the mobile terminal outputs a basic standby screen to a display unit.

At step 1207, the mobile terminal outputs a previously set image to a display unit. In this case, the image is received from the service management server or the content providing server according to the present invention, and is set and stored as an image of the standby screen occupation representation type application. If the lid of the terminal is opened, at least one key of the terminal is pressed or an internal event, such as an alarm or a timer, occurs at steps 1209 and 1211, the mobile terminal automatically modifies an image according to an internal scenario and outputs the modified image. Furthermore, the mobile terminal transmits an image modification request signal to the service management server according to the internal event. If an image modification message is received, the mobile terminal modifies and outputs the image.

Figure 13:
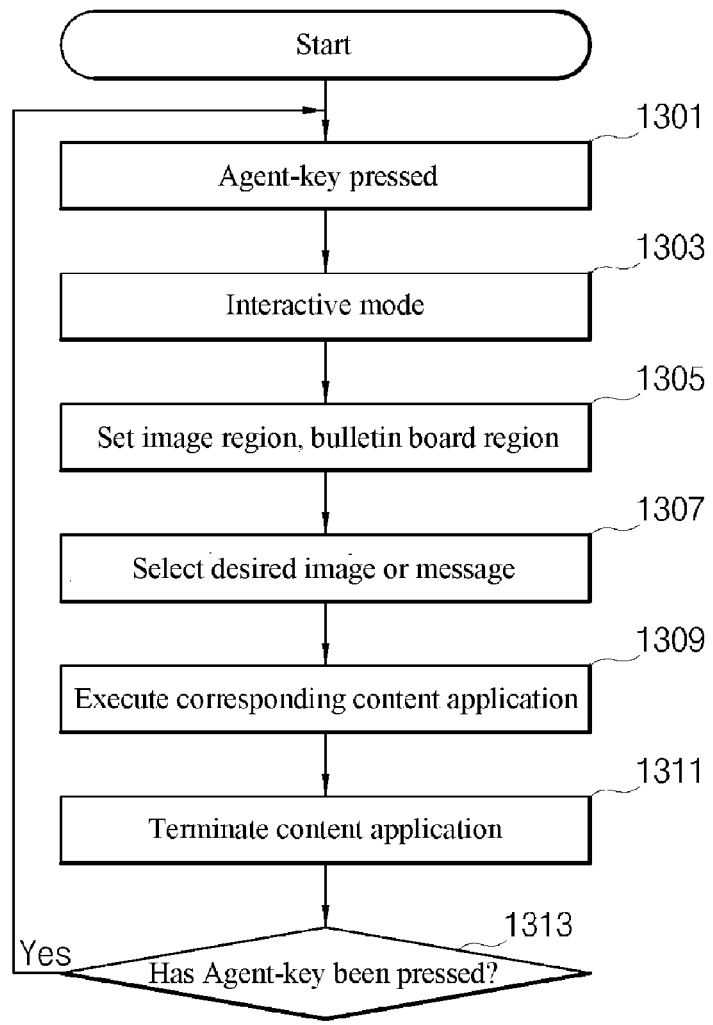
FIG. 13 is a flowchart illustrating a procedure of executing a standby screen occupation representation type application in interactive mode in accordance with the first embodiment of the present invention.

FIG. 13 is a flowchart illustrating a procedure of executing a standby screen occupation representation type application in interactive mode according to the first embodiment of the present invention.

Referring to FIG. 13, if a standby screen occupation representation type application is installed in a mobile terminal, the mobile terminal generates an agent key in standby mode. If the agent key is pressed (step 1301), the mobile terminal activates the standby screen occupation representation type application and operates in interactive mode (step 1303). In interactive mode, the user of the mobile terminal can select a desired message and view the message in detail, and can also directly execute a corresponding content application or can automatically access a server that provides corresponding content.

In interactive mode, at least one key of the terminal is pressed, and an image region or a bulletin board region is activated (step 1305). If the image region or the bulletin board region is activated and a confirmation button is then pressed (step 1307), the mobile terminal executes a corresponding content application (step 1309). For example, if an image is selected as a result of execution of content application, the mobile terminal automatically gains access to a content providing server that provides the image. If a message posted in the bulletin board region is selected, detailed information is displayed. If the confirmation button is pressed again, the mobile terminal automatically gains access to a server that provides corresponding content. If a corresponding content application is terminated (step 1311) and an agent key or a call end button is pressed in interactive mode, the mobile terminal returns to standby mode (step 1313).

Figure 14:
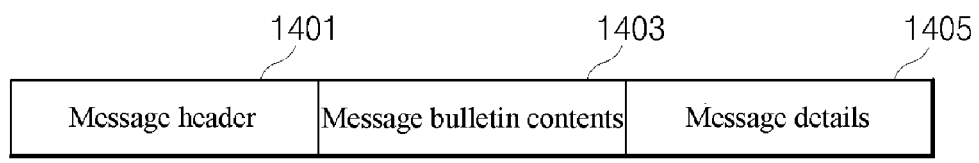
FIG. 14 is a diagram illustrating the format of a message according to the first embodiment of the present invention.

FIG. 14 is a diagram illustrating the format of a message according to the first embodiment of the present invention.

Referring to FIG. 14, a message, which is received from the service management server to the mobile terminal, includes a message header 1401, message bulletin contents 1403 and message details 1405. The message header 1401 includes various pieces of information related to the service according to the present invention. In this case, examples of the information include Telesvc-id, storage time, a content type, a callback Uniform Resource Locator (URL) and the like. If a message is received, the mobile terminal determines whether Telesvc-id exists in the message. If Telesvc-id is determined to exist, the mobile terminal determines the message to be a message according to the present invention. If Telesvc-id is not included in the message, the mobile terminal determines the message to be a common message. In this case, if the content type included in the message header 1401 is classified as a highly important one, the mobile terminal can output the message details 1405 directly to the display unit. If the message is an image modification message, the mobile terminal can automatically modify an image and can automatically execute a corresponding application.

The mobile terminal, which receives the message according to the present invention, does not output the message to the display unit, but stores the message in the memory and then outputs the message bulletin contents 1403 to the bulletin board region of the display unit in standby mode. If a detailed view event occurs while the message bulletin contents 1403 are being output, the mobile terminal can output the message details 1405 to the display unit, or can gain access to the content providing server or service management server based on the callback URL and then output detailed contents to the display unit. Meanwhile, the mobile terminal stores the message for a time period corresponding to the storage time, and then automatically deletes the message when the storage time elapses.

Figure 15:
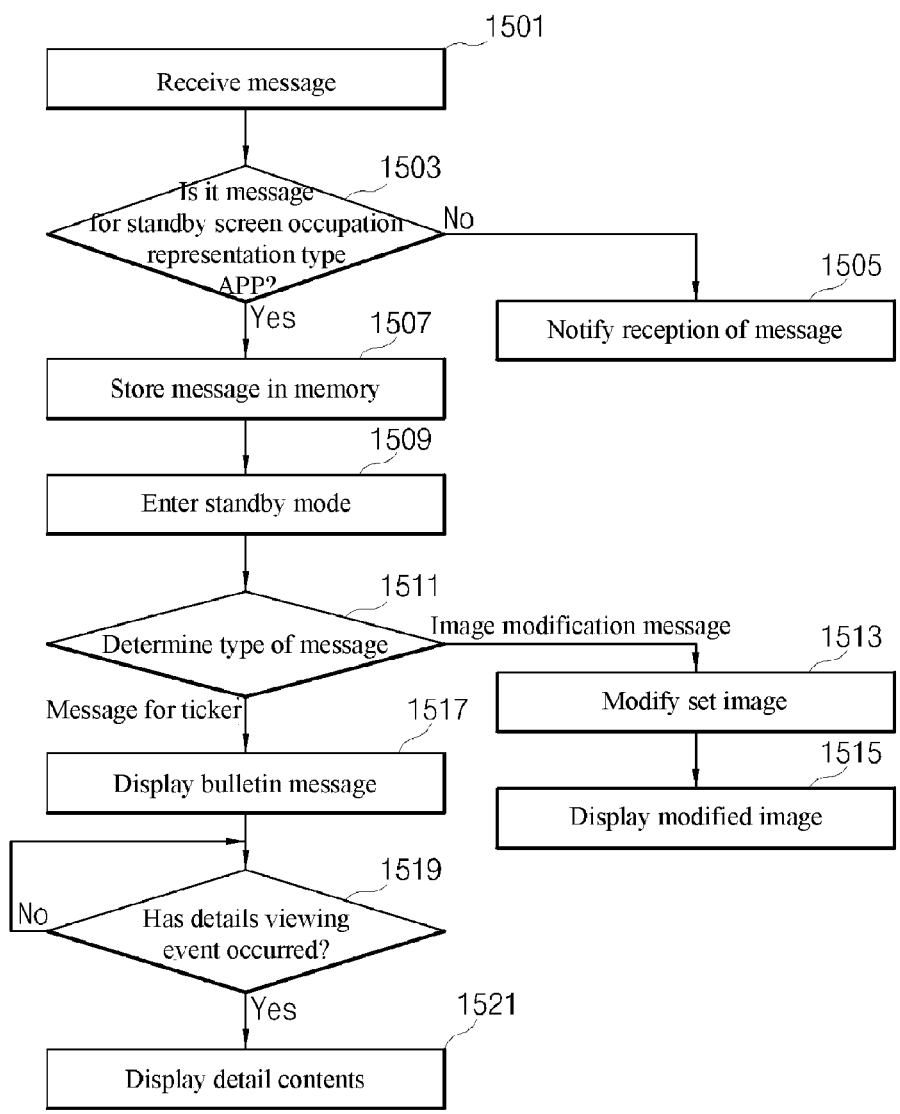
FIG. 15 is a flowchart illustrating a procedure of processing a received message in the mobile terminal in accordance with the first embodiment of the present invention.

FIG. 15 is a flowchart illustrating a procedure of processing a received message in a mobile terminal in accordance with the first embodiment of the present invention.

Referring to FIG. 15, if a message is received (step 1501), a mobile terminal determines whether the received message is a message for the standby screen occupation representation type application according to the present invention (step 1503). If, as a result of the determination, the message is the message for the standby screen occupation representation type application, step 1507 is performed. If the message is a common message, step 1505 is performed. At step 1505, the mobile terminal notifies the user of the reception of the message through an alarm or the display unit, and follows the common message reception processing procedure. At step 1507, the mobile terminal stores the message in the memory of the standby screen occupation representation type application. The mobile terminal executes the standby screen occupation representation type application in standby mode (step 1509), and then determines whether the message is a bulletin message or a message for image modification (step 1511). If, as a result of the determination, the message is a bulletin message, step 1517 is performed. If the message is an image modification message, step 1513 is performed. At step 1513, the mobile terminal modifies a set image based on the image modification message (step 1513) and outputs the modified image to a display unit (step 1515).

At step 1517, the mobile terminal outputs bulletin contents of the bulletin message onto the bulletin board region of the display unit. At this time, if a plurality of bulletin messages exists, the mobile terminal outputs bulletins in a slide show fashion. If a detailed view event occurs by pressing at least one key of the mobile terminal (S1519), the mobile terminal outputs the detailed contents of a message that is being output to the bulletin board region to the display unit (step 1521).

Figure 16:
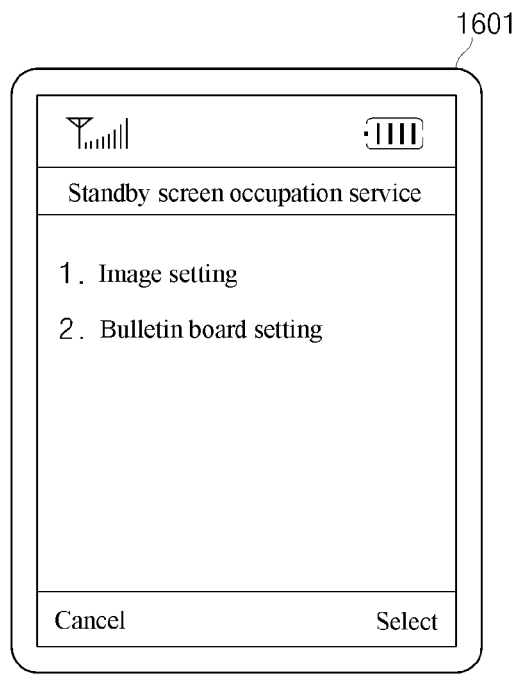
FIGS. 16 to 18 are diagrams of the screens of the mobile terminal to illustrate a procedure of setting the standby screen occupation representation type application in accordance with the first embodiment of the present invention.
Figure 17:
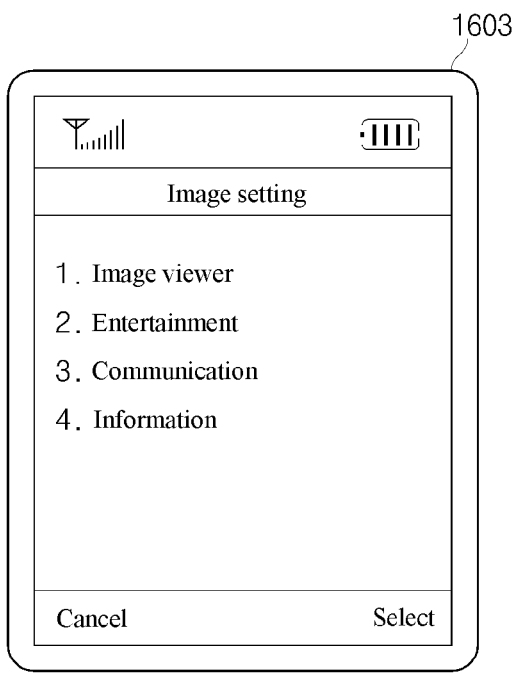
Figure 18:
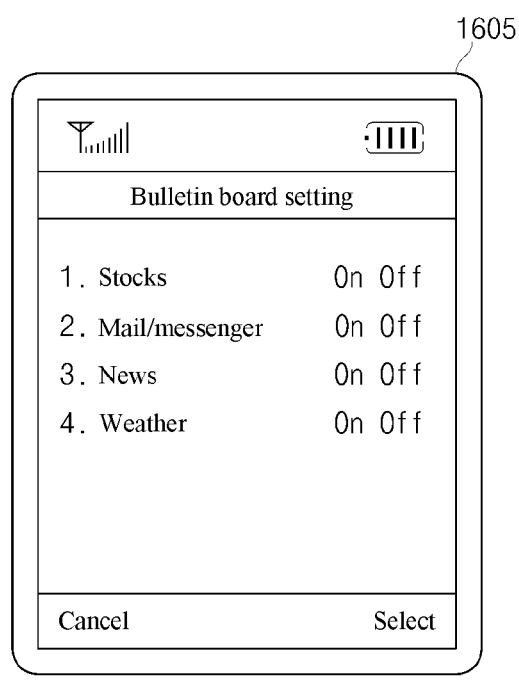

FIGS. 16 to 18 are diagrams of the screens of the mobile terminal illustrating a procedure of setting the standby screen occupation representation type application in accordance with the first embodiment of the present invention.

Referring to FIGS. 16 to 18, if a mobile terminal downloads the standby screen occupation representation type application from the service management server and executes the standby screen occupation representation type application, the agent service setting screen 1601 is output to the display unit. The agent service setting screen 1601 includes an image setting item and a bulletin board (ticker) setting item. The image setting item is an item for setting an image to be output to a standby screen, and the bulletin board setting item is an item for setting the type of message to be output to a bulletin board region.

If the user of the mobile terminal selects the image setting item from the agent service setting screen 1601 and presses a confirmation button, the mobile terminal outputs an image setting screen 1603 to the display unit. The image setting screen 1603 can include image viewer, entertainment, communication and information items. In this case, the image viewer item is used to view an image set by a user, the entertainment item is game type service such as Damagochi, the communication item is interactive type service such as messenger, e-mail and chatting, and the information item refers to information service such as stock reports and shopping malls.

If the bulletin board setting item is selected and the confirmation button is pressed in the agent service setting screen 1601, the mobile terminal outputs the bulletin board setting screen 1605 to the display unit. The user of the mobile terminal can set the type of message, which will be output to the bulletin board region in standby mode, in the bulletin board setting screen 1605.

An example of the service according to the present invention is described with reference to FIGS. 19 to 21.

Figure 19:
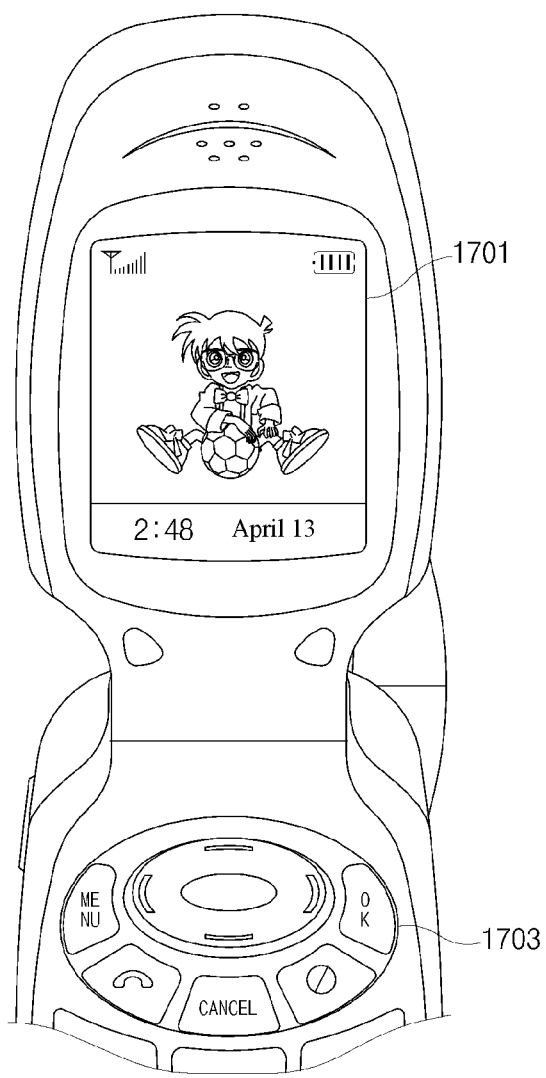
FIGS. 19 to 21 are diagrams illustrating the screens of the display unit and key input unit of the mobile terminal according to the first embodiment of the present invention.

FIG. 19 is a diagram illustrating the display unit and key input unit of the mobile terminal in standby mode before a standby screen occupation representation type application is installed according to the first embodiment of the present invention.

Referring to FIG. 19, the mobile terminal in which the standby screen occupation representation type application is not installed outputs a standby screen 1701, which is set by a user, to the display unit under the control of the basic standby screen control program in standby mode. Furthermore, in standby mode, the respective keys of the key input unit 1703 have the same functions as those in the existing standby mode.

Figure 20:
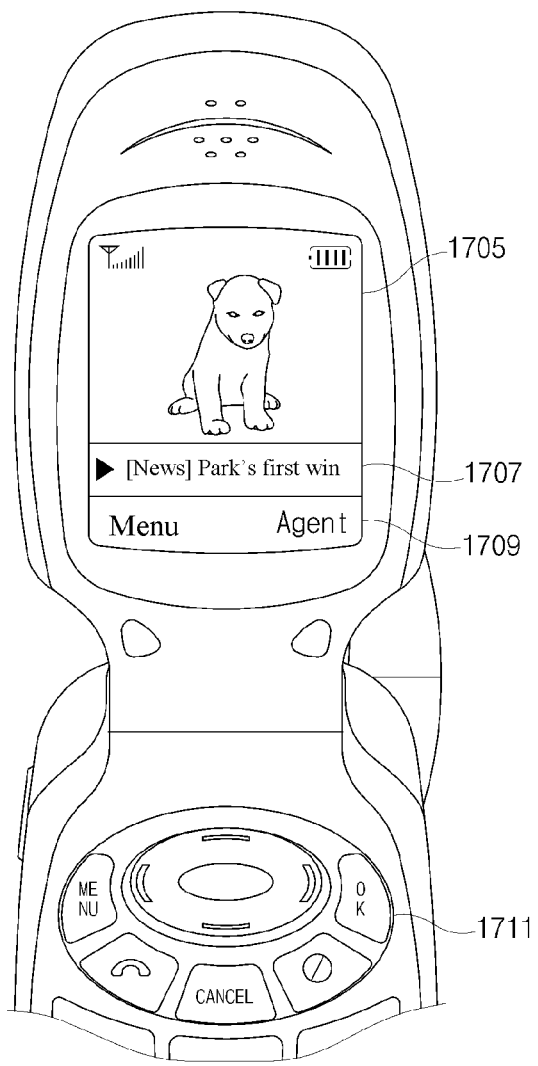

FIG. 20 is a diagram illustrating the display unit and key input unit of a mobile terminal in standby mode after the standby screen occupation representation type application has been installed, in accordance with the first embodiment of the present invention.

Referring to FIG. 20, if the mobile terminal downloads and installs the standby screen occupation representation type application, an image region 1705, a bulletin board region 1707 and an agent key region 1709, which are separated from each other, are output to the display unit in standby mode. The agent key region 1709 is generated when the standby screen occupation representation type application is installed. An image set to a standby screen image is output to the image region 1705. Bulletin messages, which are received and stored in memory, are output to the bulletin board region 1707 in a slide show fashion. In standby mode, in the key input unit 1711 of the mobile terminal, a confirmation button is an agent key that activates the standby screen occupation representation type application, and buttons other than the confirmation button have the same functions as is an existing standby screen.

Figure 21:
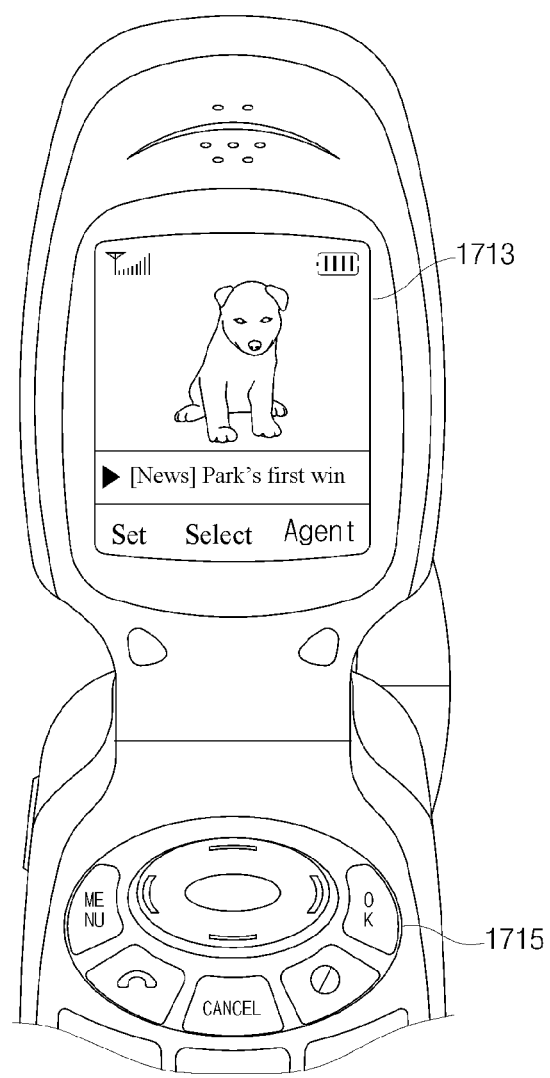

FIG. 21 is a diagram illustrating the display unit and key input unit of a mobile terminal in interactive mode in accordance with the first embodiment of the present invention.

Referring to FIG. 21, if the agent key is pressed in standby mode, a mobile terminal outputs an agent service screen 1713 including an image region and a bulletin board region to a display unit in interactive mode where a standby screen occupation representation type application is activated. In the agent service screen 1713, one of the image region and the bulletin board region is activated. Furthermore, in order to change the region where the image region or the bulletin board region is located, at least one key (e.g., a menu button) is pressed. In interactive mode, the buttons of the key input unit 1715 perform respective functions that are defined so as to execute the standby screen occupation representation type application. Meanwhile, the confirmation button of the key input unit 1715 corresponds to the agent key. If the agent key is pressed, the mobile terminal returns to standby mode.

Second Embodiment

Figure 22:
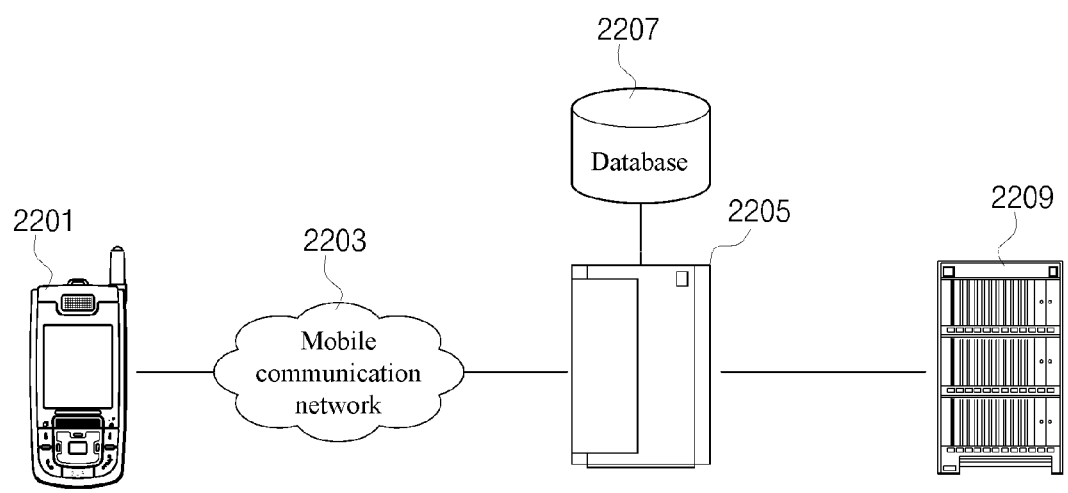
FIG. 22 is a diagram schematically illustrating the construction of an apparatus for providing standby mode content in accordance with a second embodiment of the present invention.

FIG. 22 is a diagram schematically illustrating the construction of an apparatus for providing standby mode content according to a second embodiment of the present invention.

Referring to FIG. 22, the apparatus for providing standby mode content includes a mobile terminal 2201, a mobile communication network 2203, a service management server 2205, a database 2207 and a content providing server 2209.

The mobile terminal 2201 is provided with a mobile terminal platform and allows standby screen occupation representation type content according to the present invention to be installed therein. The mobile terminal 2201 has a function of exchanging messages. The mobile terminal 2201 also communicates with the service management server 2205 via the mobile communication network 2203. The mobile terminal also receives content from the service management server 2205 and outputs the content in standby mode. The mobile terminal includes a mobile phone, a PDA phone, a smart phone, a notebook computer, a tablet PC and the like.

The service management server 2205 provides the mobile terminal 2201 with the standby screen occupation representation type content according to the present invention. Furthermore, the service management server 2205 receives content from the content providing server 2209, which provides content for the mobile terminal 2201, processes the content into a standby screen image, and transmits the processed image to the mobile terminal 2201 via the mobile communication network 2203.

The database 2207 databases service information related to the mobile terminal 2201 and content information provided by the content providing server 2209. The database 2207 may be included in the service management server 2205.

The content providing server 2209 has conventional functions of providing various types of content for existing mobile terminals as they are, and further includes a function of providing content information to the service management server 2205. Furthermore, the content providing server 2209 provides updated content information to the service management server 2205 in conjunction with the service management server 2205.

A method of providing service according to the present invention is schematically described below with reference to the above-described construction. The user of the mobile terminal 2201 gains access to the service management server 2205 via a wired/wireless communication network, and subscribes to the service according to the present invention. The user then downloads the standby screen occupation representation type content, and installs it in the mobile terminal. The mobile terminal 2201 can set desired content by executing the standby screen occupation representation type content. Furthermore, the mobile terminal 2201 can receive an image to be output to the display unit in standby mode from the service management server 2205 or the content providing server 2209. Thereafter, the mobile terminal 2201 receives content information from the content providing server 2209 that provides content selected by the user of the terminal. The service management server 2205 processes content information into selected application information according to the present invention, and transmits the processed application information to the mobile terminal 2201. The mobile terminal 2201 stores the received selected application in the memory, outputs the selected application information, and outputs a stored message through a standby screen in list form. Thereafter, the mobile terminal 2201 can select and automatically drive desired content according to the selected application information.

Figure 23:
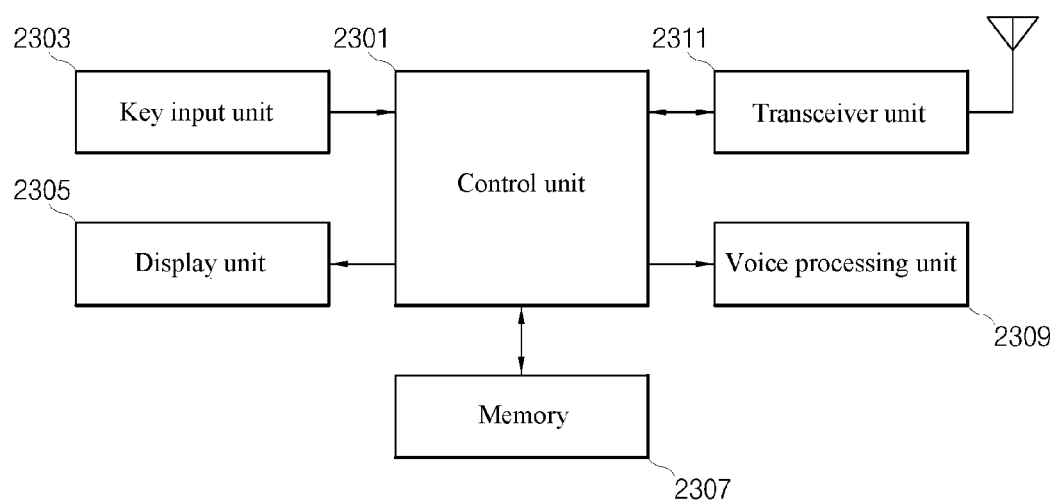
FIG. 23 is a diagram illustrating the construction of a mobile terminal for providing standby mode content in accordance with the second embodiment of the present invention.

FIG. 23 is a diagram illustrating the construction of a mobile terminal for providing standby mode content in accordance with the second embodiment of the present invention.

Referring to FIG. 23, the mobile terminal according to the present invention includes a control unit 2301, a key input unit 2303 through which input corresponding to a variety of functions and operations of the mobile terminal can be entered under the control of the control unit 2301, a display unit 2305, memory 2307, a voice processing unit 2309 and a transceiver unit 2311.

The control unit 2301 receives a signal processed in the transceiver unit 2311, and controls the overall operation of the mobile terminal. Furthermore, the control unit 2301 controls content, which is received from a service management server, so that the content is reproduced through the display unit 2305 and a speaker connected to the voice processing unit 2309, according to an environment set by a user. The control unit 2301 also controls a variety of components.

The display unit 2305 is a display apparatus such as an LCD, and displays the operational status of the mobile terminal or the progress of a program under the control of the control unit 2301. That is, the display unit 2305 displays the overall status of the mobile terminal, input user information and so on. The display unit 2305 further has a function of outputting content a message received from the service management server or designated application information through the standby screen, according to an environment set by a user.

The memory 2307 stores the operating programs and system program of the control unit 2301. The operating programs and the system program are generally stored in Read Only Memory (ROM), and can be erased when necessary. Electrically erasable ROM can include EEPROM, flash memory and the like. Furthermore, the memory 2307 includes Random Access Memory (RAM) that temporarily stores data that are generated during the execution of various operating programs. The operating program includes the standby screen occupation representation type application and a selected application. The memory 2307 further has a function of storing messages received from the service management server.

The voice processing unit 2309 functions to modulate a voice signal received from a microphone into voice data, and demodulate voice data received from the transceiver unit 2311 and voice data stored in the memory 2307 into a voice signal and then output the demodulated voice signal through a speaker as voice.

The transceiver unit 2311 functions to convert a signal output from the control unit 2301 into a wireless signal and convert a wireless signal received through an antenna into a predetermined signal, under the control of the control unit 2301.

A method of reproducing a selected application and automatically driving content according to user selection in the mobile terminal having the above-described construction is described below. The user of the mobile terminal is provided with selected application information from the service management server through the transceiver unit 2311, stores it in the memory 2307 and reproduces it. The user can execute the selected application information by selecting at least one key of the key input unit 2303. Thereafter, if the user selects desired content from selected application information, the mobile terminal receives content from the service management server and automatically drives the received content through the display unit 2305 and the speaker under the control of the control unit 2301

Figure 24:
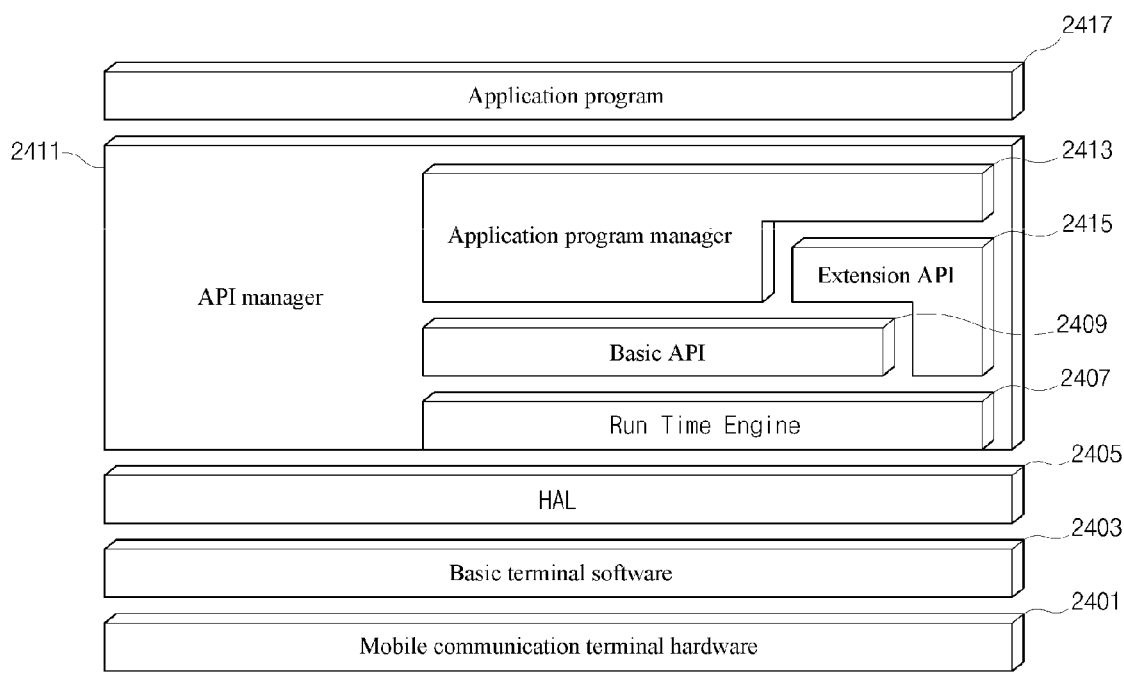
FIG. 24 is a diagram illustrating the construction of the platform of a mobile terminal in which an application program for providing selected application information will be installed, in accordance with the second embodiment of the present invention.

FIG. 24 is a diagram illustrating the construction of the platform of the mobile terminal in which an application program for providing selected application information will be installed, in accordance with the second embodiment of the present invention.

Referring to FIG. 24, the terminal platform includes a mobile communication terminal hardware 2401, basic terminal software 2403, a Handset Application Layer (HAL) 2405, a run time engine 2407, a basic API 2409, an API manager 2411, an application program manager 2413, an extension API 2415 and an application program 2417. The terminal platform has GVM, SK-VM, KVM, MAP, BREW and WIPI, and thus has the same functions as those of an existing terminal platform. Furthermore, the terminal platform also functions to transmit a standby screen occupation state to the service management server such that content selected by a user occupies the standby screen or is automatically executed using selected application information according to the present invention.

The mobile communication terminal hardware 2401 may include all mobile communication terminals or portable terminals such as a mobile phone, a PDA, a PDA phone and a smart phone. The basic terminal software 2403 includes software for basic terminal operation, an LCD driver, a KPD driver and a serial driver. The HAL 2405 is an abstraction layer that maintains the hardware independence of the platform, so that upper layers can operate on the HAL 2405 regardless of the types of the mobile communication terminal hardware 2401 and the basic terminal software 2403.

The basic API 2409 is a collection of basic APIs supported in a platform used by an application program developer. The basic API 2409 includes the C API and the Java API, and provides convenience to program developers. The API manager 2411 functions to update and add the basic API 2409 and the extension API 2415 of the platform. Furthermore, the API manager 2411 also provides a function of downloading the application program manager 2413. The application program manager 2413 performs the overall management functions of the application program 2417 such as the viewing of information, download, installation, execution, deletion and security management. The extension API 2415 is a collection of mobile platform APIs that are candidates for the standardization of a mobile terminal platform, and provides a collection of APIs for providing various services.

The application program 2417 refers to content that is installed in a terminal provided with a platform and can operate regardless of the type of terminal environment or basic terminal software. The application program includes selected application information.

A method of providing service according to the present invention is described below with reference to the above-described construction. The mobile platform having the above-described construction is installed in the mobile communication terminal. The user of the mobile communication terminal receives selected application information from the mobile communication service provider or the service management server using the application program manager 2413 by selecting desired content. The selected application information can be implemented using the C language or the Java language. The user selects desired content from the selected application information, and executes the selected content. Thereafter, if content is received from the service management server according to the content selected by the user, the mobile terminal automatically drives the received content.

Figure 25:
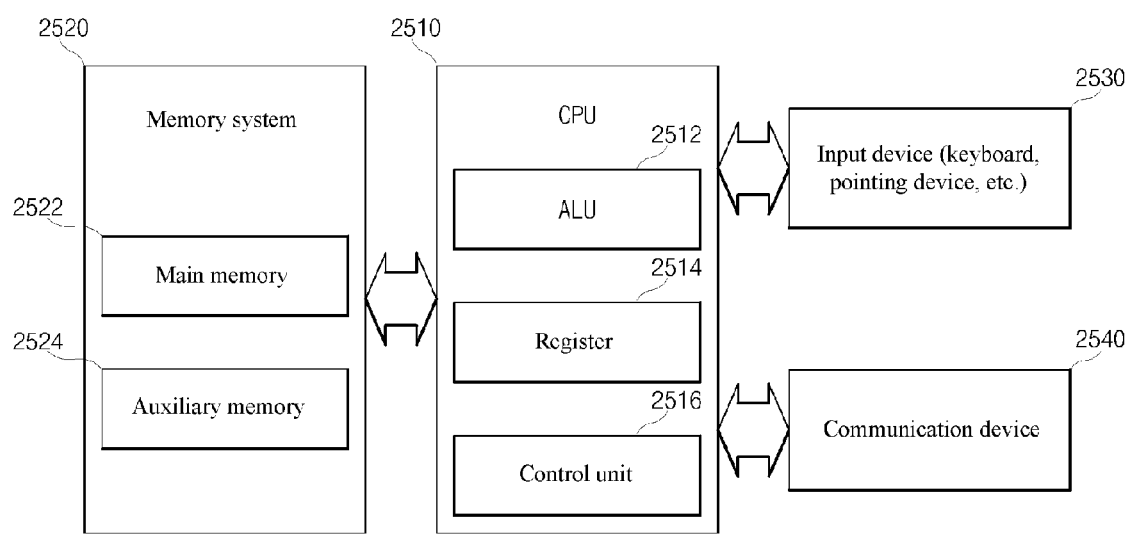
FIG. 25 is a diagram illustrating the construction of a service management server according to the second embodiment of the present invention.

FIG. 25 is a diagram illustrating the construction of a service management server according to the second embodiment of the present invention.

Referring to FIG. 25, the service management server includes a memory system 2520, at least one CPU 2510 connected to the memory system 2520 and configured to perform high-speed operation, an input device 2530 and a communication device 2540.

The CPU 2510 includes an ALU 2512 for performing mathematical operations, a register 2514 for temporarily storing data and instructions, and a control unit 2516 for controlling the operation of the service management server. The CPU 2510 can be a processor having one of a variety of architectures such as Alpha from Digital Equipment Corporation, MIPS from MIPS Technology, NEC, IDT, Siemens, etc., x86 from Intel Corporation, Cyrix, AMD and Nexgen, and PC (PowerPC) from IBM Corporation and Motorola.

The memory system 2520 includes high-speed main memory 2522 having a storage medium form such as RAM or ROM, auxiliary memory 2524 having a long-term storage medium form such as a floppy disk, a hard disk, a tape, a CD-ROM or flash memory, and a device for storing data using electrical, magnetic and optical properties, and other storage media. The main memory 2522 can further include video display memory that outputs an image through a display apparatus.

The input device 2530 further includes a keyboard, a mouse and so on. The mouse can include a physical transducer such as a touch screen or a microphone. The communication device 2540 includes a communication interface for communicating with a content providing server, a mobile terminal, etc.

Figure 26:
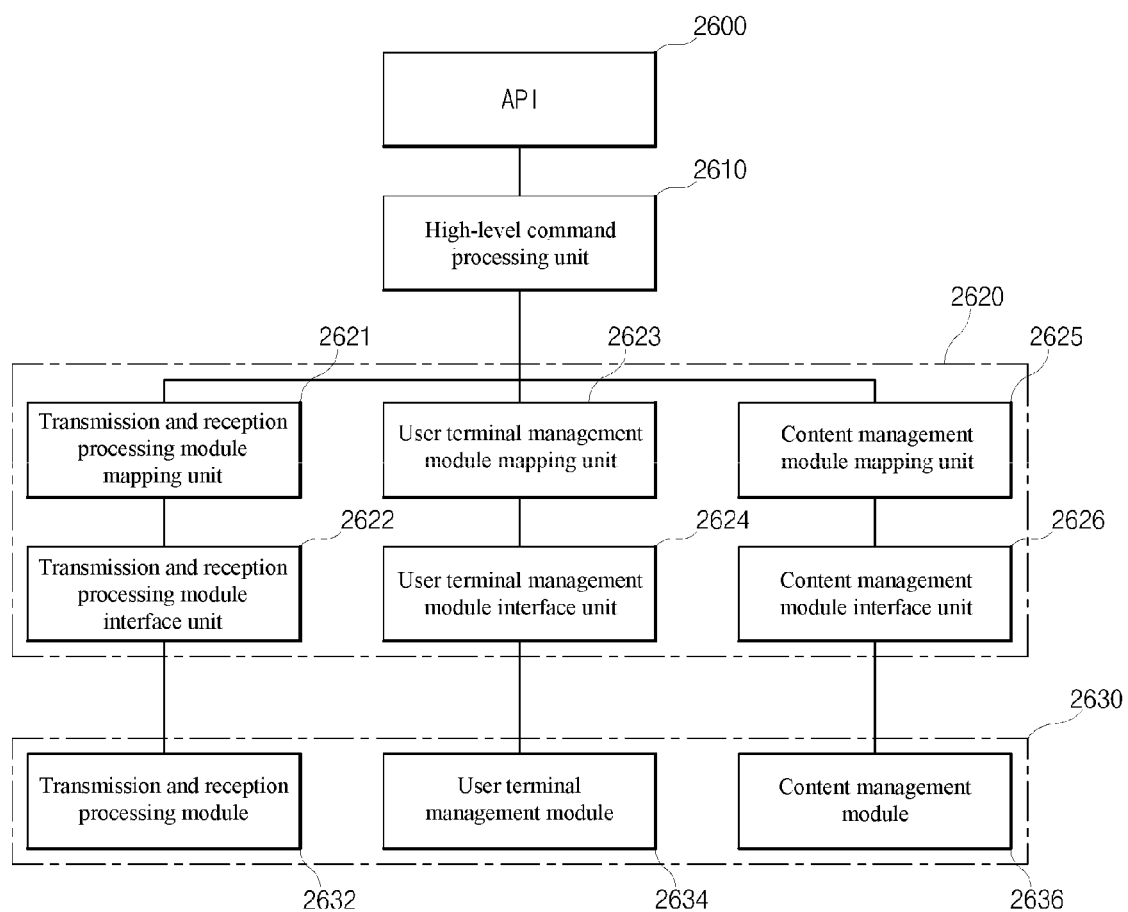
FIG. 26 is a diagram illustrating the configuration of the modules of a service management server according to the second embodiment of the present invention.

FIG. 26 is a diagram illustrating the configuration of the modules of a service management server according to the second embodiment of the present invention.

Referring to FIG. 26, the service management server can include a transmission and reception processing module 2632 for processing wired and wireless communication with a content providing server, a mobile terminal, etc., a user terminal management module 2634 for managing mobile terminals that have subscribed to the service according to the present invention, and a content management module 2636 functioning to receive content information from a corresponding content providing server and provide content to a mobile terminal so as to provide the content set in the mobile terminal. The entire construction of the service management server according to a preferred embodiment of the present invention is described below with reference to these application modules.

The service management server can employ one of a variety of Operating Systems (OS) as a system OS. This OS controls the operation of the respective application modules 2630 by providing a high-level command to an API 2600.

The service management server includes a high-level command processing unit 2610 that identifies a corresponding application module 2630 according to a high-level command provided from the API 2600, decodes the high-level command and provides the decoded high-level command to a corresponding unit. An application module control unit 2620 controls the operation of the application module 2630 according to a command provided from the high-level command processing unit 2610. That is, the high-level command processing unit 2610 determines whether an application module 2630 corresponding to a high-level command provided from the API 2600 exists. If it is determined that a corresponding application module 2630 exists, the high-level command processing unit 2610 decodes the high-level command into a command that can be recognized by a corresponding application module 2630, and transmits the decoded command to a corresponding mapping unit. In this case, the application module 2630 includes the transmission and reception processing module 2632, the user terminal management module 2634 and the content management module 2636. The application module control unit 2620 includes mapping units 2621, 2623 and 2625 and interface units 2622, 2624 and 2626 for the respective application modules.

The transmission and reception processing module mapping unit 2621 receives a high-level command to perform wired/wireless communication with the content providing server, a mobile terminal or the like from the high-level command processing unit 2610, maps the high-level command to a device-level command that can be processed by the transmission and reception processing module 2632, and provides the mapped command to the transmission and reception processing module 2632 through the transmission and reception processing module interface unit 2622. Furthermore, the transmission and reception processing module 2632 can include a physical transmission interface for transmitting or receiving data to or from a content providing server when necessary. At this time, the physical transmission interface includes a communication interface such as an SS7 voice network interface and a TCP/IP network interface.

The user terminal management module 2634 manages mobile terminals that have subscribed to the service and stores service setting for each mobile terminal. In other words, the user terminal management module mapping unit 2623 receives a high-level command to manage mobile terminals from the high-level command processing unit 2610, maps the command to a device-level command that can be recognized by the user terminal management module 2634, and provides the user terminal management module 2634 with the mapped device-level command through the user terminal management module interface unit 2624.

The content management module 2636 manages content information, which is received from a content providing server, so as to provide appropriately selected application information to a mobile terminal, assigns service channels on a content basis, and manages the channels. In other words, the content management module mapping unit 2625 receives a high-level command to manage content information, which is received from a content providing server, from the high-level command processing unit 2610, maps the high-level command to a device-level command that can be recognized by the content management module 2636, and provides the mapped command to the content management module 2636 through the content management module interface unit 2626.

Figure 27:
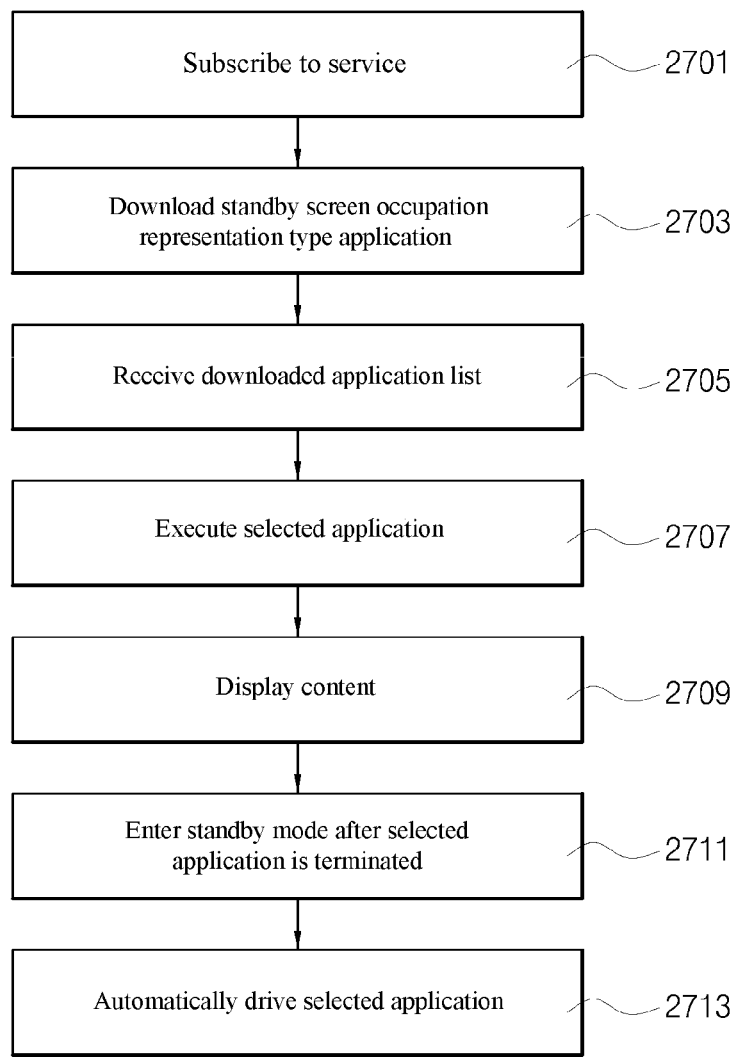
FIG. 27 is a flowchart schematically illustrating a automatic selected application construction service procedure according to the second embodiment of the present invention.

FIG. 27 is a flowchart schematically illustrating a procedure of automatic selected-application construction service according to the second embodiment of the present invention. In this case, the automatic selected-application construction service refers to service in which a mobile terminal outputs selected application information, which is received from a service management server, through the display unit in standby mode.

Referring to FIG. 27, the user of the mobile terminal that wants to subscribe to standby screen occupation service subscribes to the service by gaining access to a service management server via a wired/wireless communication network (step 2701), downloads a standby screen occupation representation type application through the mobile terminal, installs the downloaded application in the mobile terminal, and sets a service environment (step 2703). Thereafter, the mobile terminal receives a previously downloaded application list from the service management server according to the environment set at step 2703 (step 2705). When an application selected by the user is executed in the mobile terminal (step 2707), the mobile terminal displays corresponding content information on a standby screen (step 2709). The mobile terminal enters standby mode after the selected application has been terminated (step 2711). The process of automatically driving the selected application at steps 2703 and 2713 is described in detail with reference to FIG. 28. Furthermore, a process of receiving the selected application of updated content information from the service management server is described in detail with reference to FIG. 29.

Figure 28:
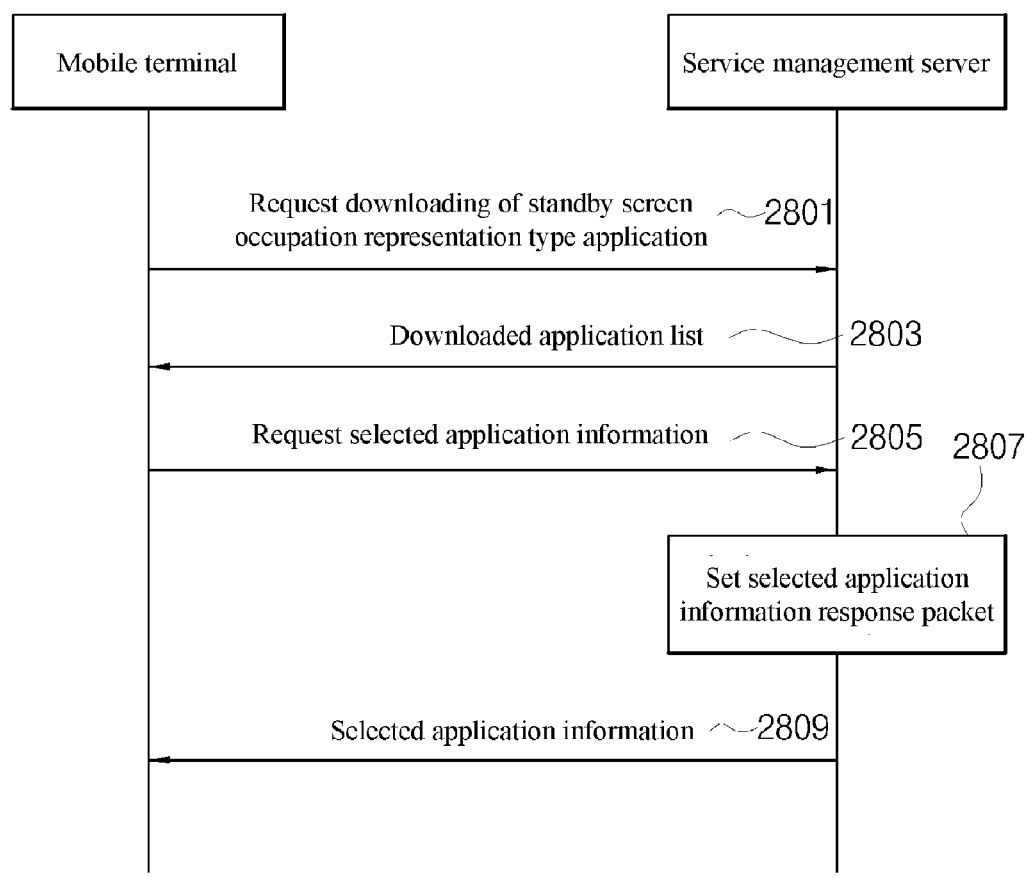
FIG. 28 is a signal flowchart illustrating a procedure of providing selected application information in accordance with the second embodiment of the present invention.

FIG. 28 is a signal flowchart illustrating a procedure of providing selected application information in accordance with the second embodiment of the present invention.

Referring to FIG. 28, the user of the mobile terminal requests a standby screen occupation representation type application from a service management server, and downloads the application to the mobile terminal (step 2801). At this time, the service management server transmits the downloaded application list to the mobile terminal (step 2803). Thereafter, the user of the terminal requests application information, which is selected by the user from the application list, from the service management server (step 2805). The application list includes information indicating the type of content. The content includes entertainment service such as Damagochi, etc., communication service such as messenger, and content such as news, weather, stock reports and real estate reports. At step 2807, the service management server provides the mobile terminal with selected application information in quick launch type list form by setting the requested selected application response packet (step 2809).

Figure 29:
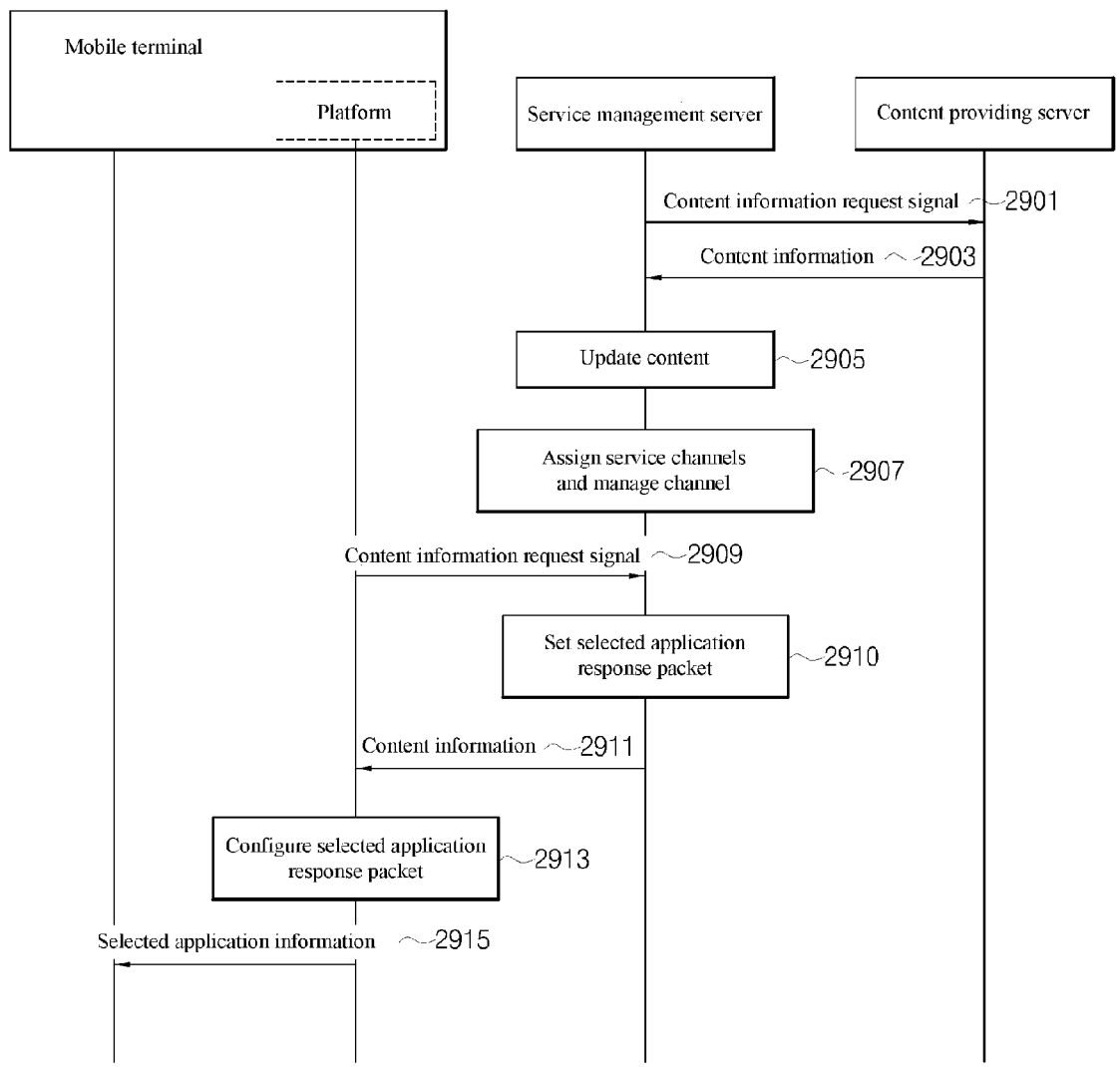
FIG. 29 is a signal flowchart illustrating a procedure of providing updated content to the mobile terminal in quick launch type selected application information form in accordance with the second embodiment of the present invention.

FIG. 29 is a signal flowchart illustrating a procedure of providing updated content to the mobile terminal in quick launch type selected application information form in accordance with the second embodiment of the present invention.

Referring to FIG. 29, the service management server transmits a content information request signal to the content providing server at predetermined intervals so as to update content to be provided to the mobile terminal (step 2901). The content providing server transmits content information corresponding to the received content information request signal to the service management server (step 2903). At this time, another embodiment according to the present invention covers the case where updated content is generated in the content providing server. The service management server updates content based on the content information received from the content providing server (step 2905), assigns service channels on a content basis, and manages the channels (step 2907). Thereafter, if the content information request signal is received from the mobile terminal (step 2909), the service management server transmits corresponding content information to the terminal platform (step 2911). At this time, the terminal platform configures a selected application response packet for the request for information (step 2913). Thereafter, the terminal platform processes content, which is requested by the user, into a quick launch type list, and transmits the processed content to the mobile terminal as selected application information (step 2915).

Figure 30:
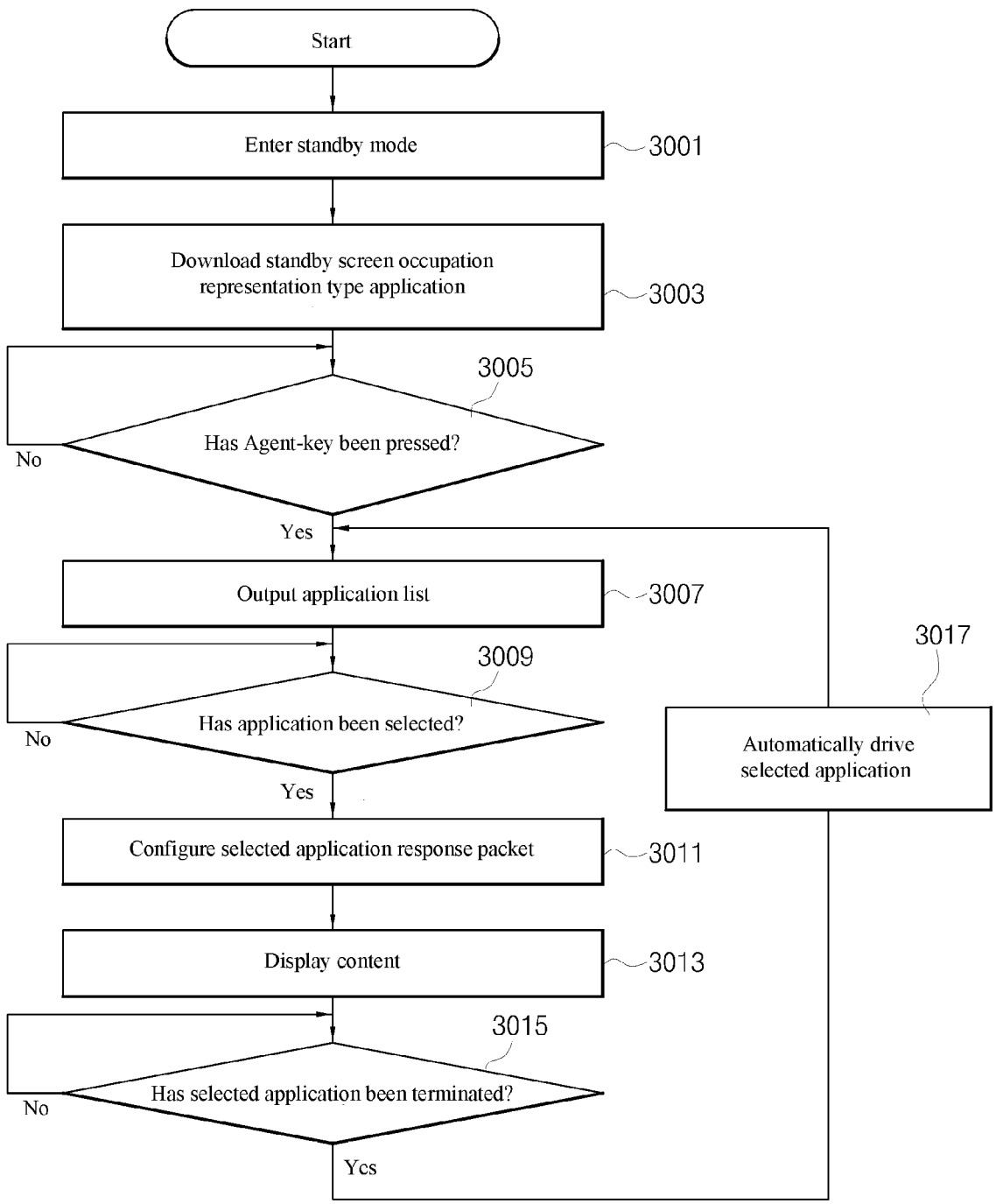
FIG. 30 is a flowchart illustrating a procedure of automatically driving a selected application in accordance with the second embodiment of the present invention and occupying a standby screen with the selected application.

FIG. 30 is a flowchart illustrating a procedure of automatically driving a selected application according to the second embodiment of the present invention and occupying a standby screen with the selected application.

Referring to FIG. 30, if the call end button of the key input unit is pressed or there has been no key input for a predetermined time when communication is terminated, the mobile terminal enters standby mode (step 3001). In standby mode, the mobile terminal drives a standby screen occupation representation type application under the control of a control unit (step 3003).

If the agent key is pressed (step 3005) while the standby screen occupation representation type content is driven, the mobile terminal outputs an application list that has already been downloaded through a display unit (step 3007). The user of the terminal can view detailed information in the application list by selecting a desired application (step 3009). At this time, a terminal platform can configure a selected application response packet for the request of information (step 3011), and can automatically gain access to a server that outputs corresponding content or provide corresponding content (step 3013).

After the selected application has been completely driven (step 3015), the mobile terminal enters standby mode where the selected application response packet is configured (step 3017). Thereafter, the driving of the selected application terminated in the mobile terminal is processed into an entry of a quick launch type list, so that selected application information is automatically driven and occupies the standby screen (step 3019).

An example of the service according to the present invention is described below with reference to FIGS. 31 to 36.

Figure 31:
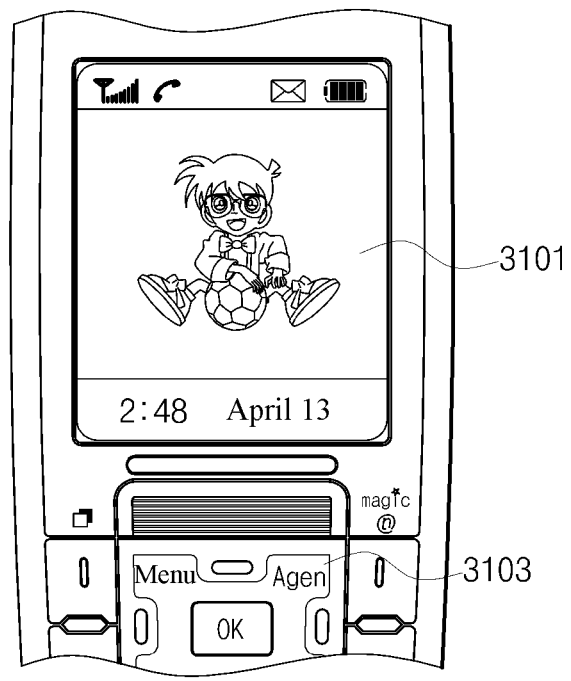
FIG. 31 is a diagram illustrating the display unit and key input unit of the mobile terminal in standby mode before a standby screen occupation representation type application is installed, in accordance with the second embodiment of the present invention.

FIG. 31 is a diagram illustrating the display unit and key input unit of the mobile terminal in standby mode before the standby screen occupation representation type application is installed, in accordance with the second embodiment of the present invention.

Referring to FIG. 31, the mobile terminal in which the standby screen occupation representation type application is not installed outputs a standby screen 3101, which is set by a user, through the display unit under the control of the basic standby screen control program in standby mode. Furthermore, in standby mode, the respective keys of the key input unit 3103 have the conventional functions in existing standby mode.

Figure 32:
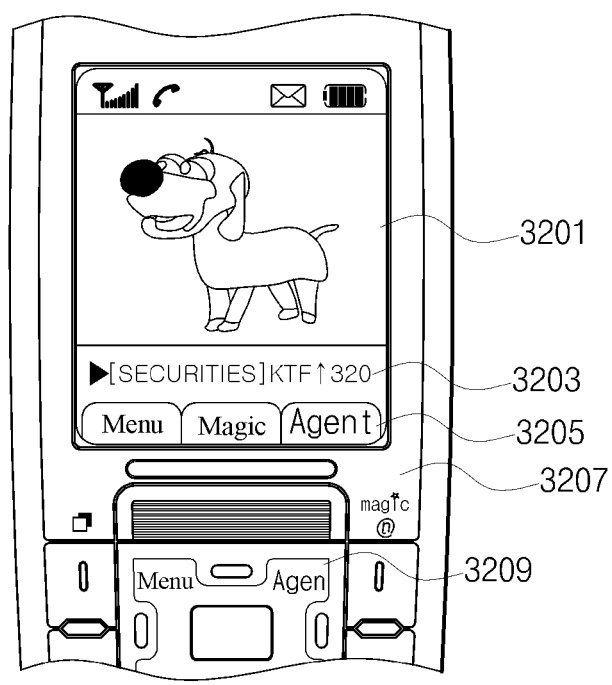
FIG. 32 is a diagram illustrating the display unit and key input unit of a mobile terminal, in which standby screen occupation type application content is installed, in standby mode, in accordance with the second embodiment of the present invention.

FIG. 32 is a diagram illustrating the display unit and key input unit of the mobile terminal, in which standby screen occupation type application content is installed, in standby mode, in accordance with the second embodiment of the present invention.

Referring to FIG. 32, if the mobile terminal downloads and installs a standby screen occupation representation type application, an image region 3201, a bulletin board region 3203 and an agent key region 3205, which are separated from each other, are output to the display unit in standby mode. The agent key region 3205 is generated when the standby screen occupation representation type application is installed. An image set for a standby screen image is output to the image region 3201. Bulletin messages, which are received and stored in memory, are output to the bulletin board region 3203 in a slide show fashion. In standby mode, in the key input unit 3207 of the mobile terminal, an agent button 3209 is an agent key that activates an application list that has already been downloaded, and buttons other than the agent 3209 have the conventional functions of an existing standby screen.

Figure 33:
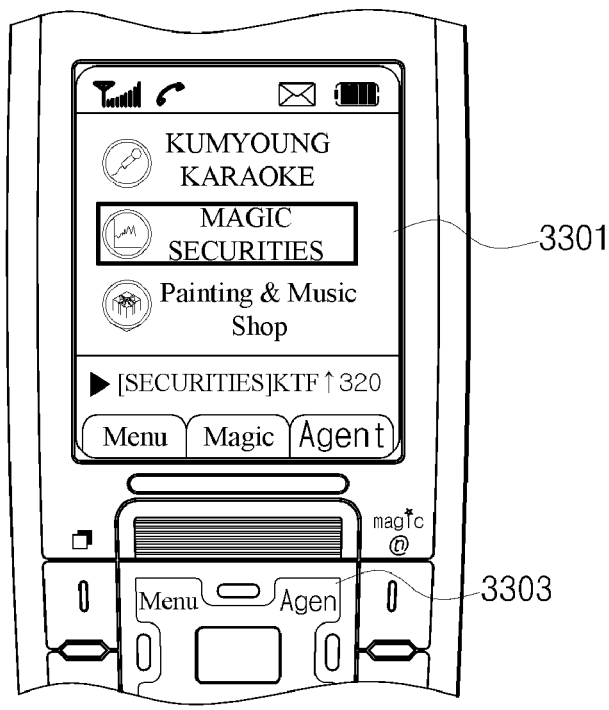
FIG. 33 is a diagram illustrating the display unit and key input unit of the mobile terminal in downloaded application list output mode in accordance with the second embodiment of the present invention.

FIG. 33 is a diagram illustrating the display unit and key input unit of the mobile terminal in downloaded application list output mode according to the second embodiment of the present invention.

Referring to FIG. 33, if an agent key is pressed, an application list that has already been downloaded is activated, and the mobile terminal outputs a screen 3301 including the application list region and the bulletin board region to a display unit. The user of the terminal selects one application item from the application list screen 3301 in order to execute a desired application. In downloaded application list output mode, the buttons of the key input unit 3303 perform their respective functions defined to drive an application selected by the user of the terminal.

Figure 34:
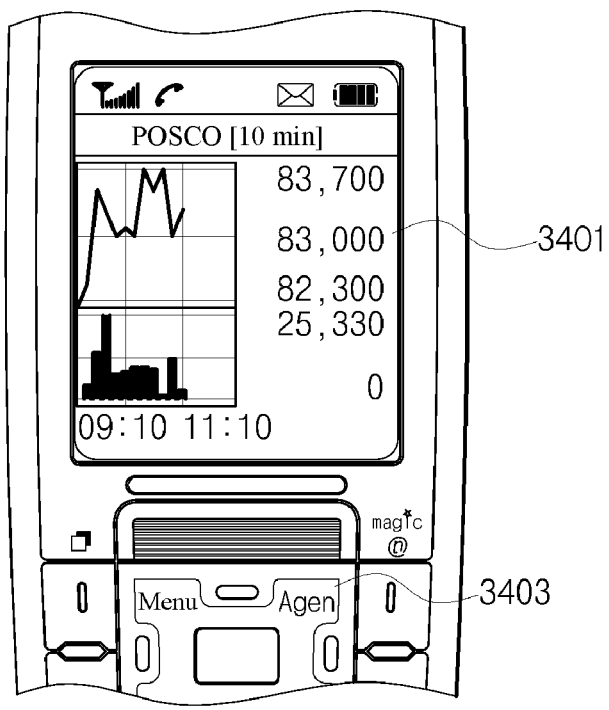
FIG. 34 is a diagram illustrating the display unit and key input unit of the mobile terminal in corresponding content display mode in accordance with the second embodiment of the present invention.

FIG. 34 is a diagram illustrating the display unit and key input unit of the mobile terminal in corresponding content display mode according to the second embodiment of the present invention.

Referring to FIG. 34, if the user selects a desired application, corresponding content is activated and a mobile terminal outputs a screen 3401 including desired content information to a display unit. When the lid of the mobile terminal is shut so as to terminate the selected application in application driving mode, the call end button of the key input unit is pressed or there has been no key input for a predetermined time, the mobile terminal enters standby mode where a selected application response packet is configured. In corresponding content display mode, buttons of the key input unit 3403 perform their respective functions defined to display corresponding content information.

Figure 35:
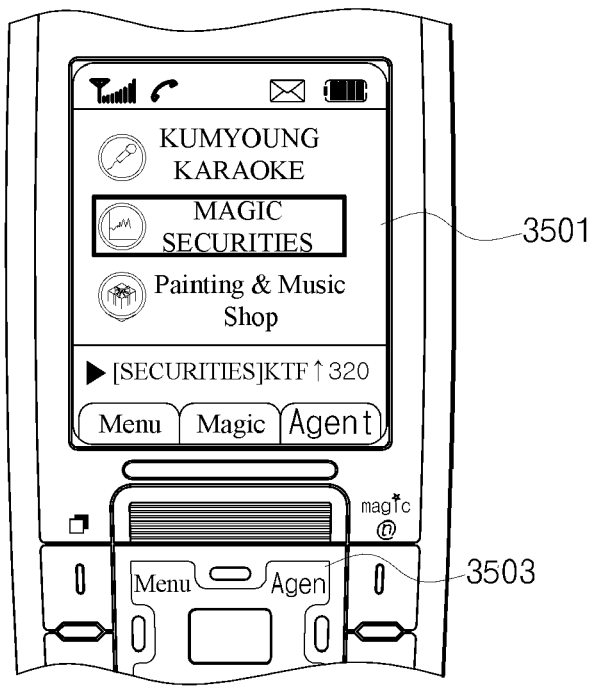
FIG. 35 is a diagram illustrating the display unit and key input unit of the mobile terminal in standby mode where a selected application response packet is configured, in accordance with the second embodiment of the present invention.

FIG. 35 is a diagram illustrating the display unit and key input unit of the mobile terminal in standby mode where a selected application response packet is configured, in accordance with the second embodiment of the present invention.

Referring to FIG. 35, if a selected application is terminated, standby mode is activated and a mobile terminal outputs an application driving screen 3501 in which a selected application response packet is configured in standby mode. In standby mode where the selected application response packet is configured, the buttons of the input unit 3503 perform their respective functions defined to automatically drive a selected application.

Figure 36:
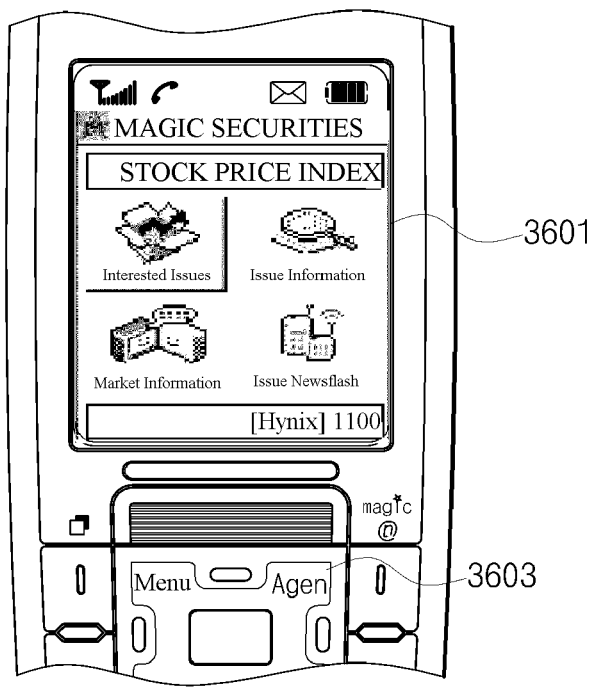
FIG. 36 is a diagram illustrating the display unit and key input unit of the mobile terminal in an automatic execution state of a selected application, in accordance with the second embodiment of the present invention.

FIG. 36 is a diagram illustrating the display unit and key input unit of the mobile terminal in the automatic execution state of a selected application, in accordance with the second embodiment of the present invention.

Referring to FIG. 36, the mobile terminal processes a terminated selected application into an entry of a quick launch type list, and automatically drives selected application information in standby mode (step 3601). In the automatic execution state of the selected application, the buttons of the input unit 3603 perform their respective functions defined to drive content.

Figure 37:
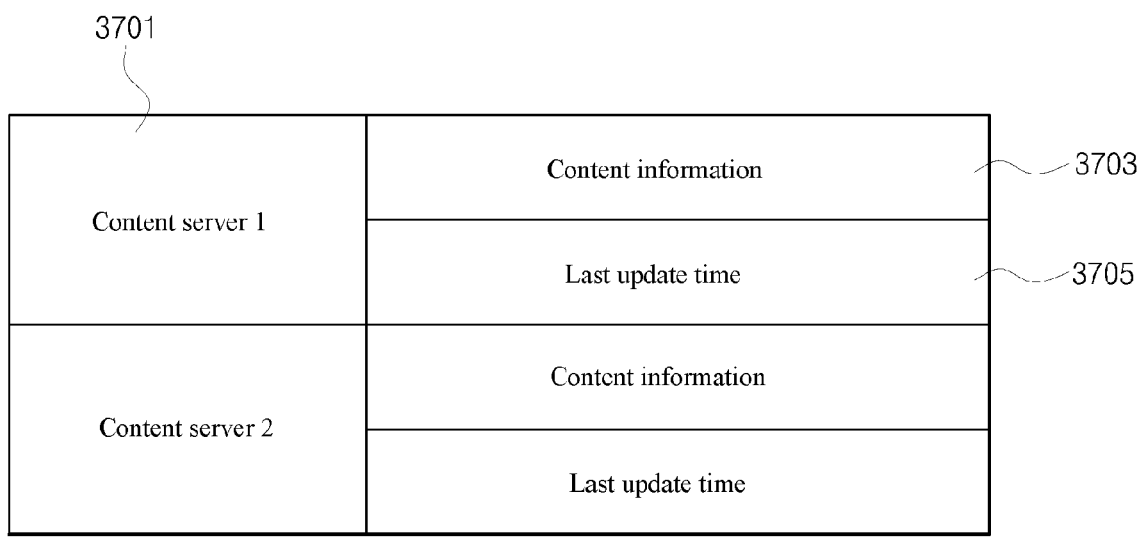
FIG. 37 is a diagram illustrating a content database according to the second embodiment of the present invention.

FIG. 37 is a diagram illustrating a content database according to the second embodiment of the present invention.

Referring to FIG. 37, the content database stores content information, which will be provided from a service management server to a mobile terminal. The content database includes content information 3703 and last update time 3705 for each content server 3701. At this time, the content server 3701 may refer to a content providing server, or each content where a content providing server provides two or more content. The content information 3703 contains the contents of content to be transmitted to the mobile terminal. The time when each item of content was updated last is entered in the last update time 3705.

FIG. 38 is a diagram illustrating a user information database according to the second embodiment of the present invention.

Referring to FIG. 38, a user information database includes terminal information 3803, application information 3805 and last update time 3807 for each customer 3801. In this case, the terminal information 3803 contains information such as a mobile terminal number and a service activation state. The application information 3805 contains information such as whether a mobile terminal has entered standby mode where a selected application response packet is configured, the setting result of a selected application response packet construction for the request for content transmission, content type and a service set environment. The last update time 3807 refers to the time when content information was last transmitted to the mobile terminal for each item of content. By comparing the last update time with the time when the content was updated last, which has been described in conjunction with reference to FIG. 37, the service management server can transmit the latest updated content to the mobile terminal whenever content is updated.

Third Embodiment

Figure 39:
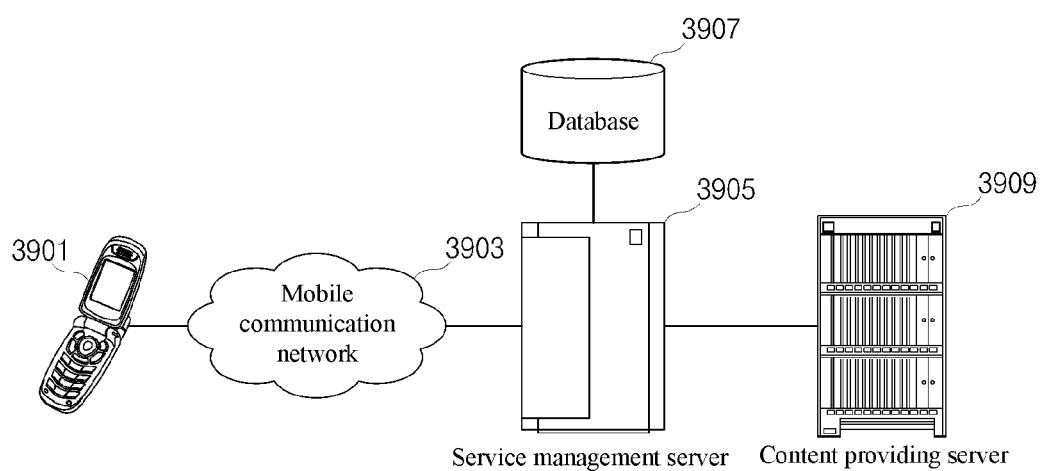
FIG. 39 is a diagram schematically illustrating the construction of an apparatus for providing standby mode content in accordance with a third embodiment of the present invention.

FIG. 39 is a diagram schematically illustrating the construction of an apparatus for providing standby mode content according to a third embodiment of the present invention.

Referring to FIG. 39, the apparatus for providing standby mode content includes a mobile terminal 3901, a mobile communication network 3903, a service management server 3905, a database 3907 and a content providing server 3909.

The mobile terminal 3901 is provided with a mobile platform, has a standby screen occupation representation type application according to the present invention installed therein, and has a function of exchanging messages. The mobile terminal 3901 has functions of connecting to the mobile communication network 3903 and communicating with the service management server 3905, and receiving content (message) from the service management server 3905 and outputting the content in bulletin board form in standby mode. The mobile terminal includes a mobile phone, a PDA phone, a smart phone, a notebook, a tablet PC and the like.

The service management server 3905 provides the mobile terminal 3901 with the standby screen occupation representation type application according to the present invention. Furthermore, the service management server 3905 receives content from the content providing server 3909, which provides content for the mobile terminal 3901, processes the contents into a bulletin message and a standby screen image, and transmits the processed message and the image to the mobile terminal 3901 via the mobile communication network 3903 in SMS form, multimedia message form or cell broadcast service form.

The database 3907 databases service information on the mobile terminal 3901 and content information provided by the content providing server 3909. The database 3907 can be included in the service management server 3905.

The content providing server 3909 has conventional functions of providing various types of content for existing mobile terminals as they are, and further includes a function of providing content information to the service management server 3905. Furthermore, the content providing server 3909 provides updated content information to the service management server 3905 in conjunction with the service management server 3905.

The user of the mobile terminal 3901 gains access to the service management server 3905 through the wired/wireless communication network, and subscribes to the service according to the present invention. The user then downloads the standby screen occupation representation type application and installs the standby screen occupation representation type application in the mobile terminal. The mobile terminal 3901 can set desired content by executing the standby screen occupation representation type application. Furthermore, the mobile terminal 3901 can receive an image to be output to the display unit in standby mode from the service management server 3905 or the content providing server 3909. Thereafter, the service management server 3905 receives the content information from the content providing server 3909 that provides content set in the mobile terminal, processes the content into a message according to the present invention, and transmits the processed message to the mobile terminal 3901. The mobile terminal 3901 stores the received message in memory, executes the standby screen occupation representation type application in standby mode, outputs the stored message in bulletin board form, and also outputs the image to a standby screen. Furthermore, the mobile terminal 3901 can open a lid according to a predetermined scenario, or automatically change the image in response to an event depending upon key input. The mobile terminal can also transmit an image modification request signal to the service management server in response to the event, receive a consequently modified image, and change a standby screen image according to the image modification information.

Figure 40:
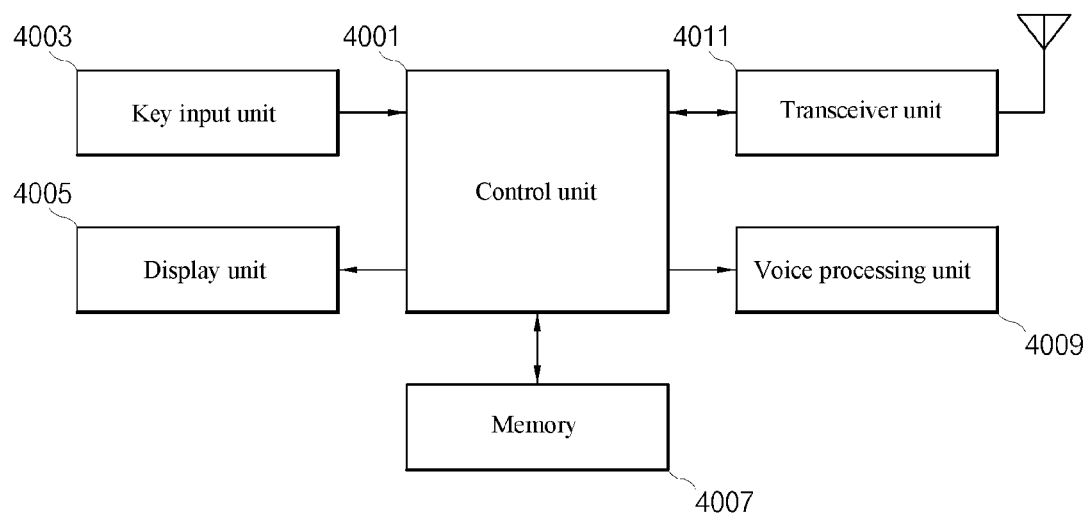
FIG. 40 is a diagram illustrating the construction of a mobile terminal for providing standby mode content in accordance with the third embodiment of the present invention.

FIG. 40 is a diagram illustrating the construction of a mobile terminal for providing standby mode content in accordance with the third embodiment of the present invention.

Referring to FIG. 40, the mobile terminal according to the present invention includes a control unit 4001, a key input unit 4003 in charge of inputting the various functions and operations of the mobile terminal under the control of the control unit 4001, a display unit 4005, memory 4007, a voice processing unit 4009 and a transceiver unit 4011.

The control unit 4001 receives a signal processed in the transceiver unit 4011, and controls the overall operation of the mobile terminal. Furthermore, the control unit 4001 controls content received from a service management server so that the content is reproduced through the display unit 4005 and a speaker connected to the voice processing unit 4009 according to an environment set by a user. The control unit 4001 also controls a variety of components.

The display unit 4005 is a display apparatus such as an LCD, and displays the operational status of the mobile terminal or the progress of a program under the control of the control unit 4001. That is, the display unit 4005 displays the overall status of the mobile terminal, and input user information and so on. The display unit 4005 further has a function of outputting a content message, which is received from the service management server, in standby mode according to an environment set by a user.

The memory 4007 stores the operating programs and system program of the control unit 4001. The operating programs and the system program are generally stored in Read Only Memory (ROM) and can be erased when necessary. Electrically erasable ROMs can include EEPROM, flash memory and the like. Furthermore, the memory 4007 includes Random Access Memory (RAM) that temporarily stores data that are generated during the execution of various operating programs. The operating programs include the standby screen occupation representation type application according to the present invention. The memory 4007 further has a function of storing messages received from the service management server.

The voice processing unit 4009 functions to modulate a voice signal, which is received from a microphone, into voice data, and demodulate voice data, which are received from the transceiver unit 4011, and voice data, which are stored in the memory 4007, into a voice signal and then output the demodulated voice signal through a speaker as voice.

The transceiver unit 4011 functions to convert a signal, which is output from the control unit 4001, into a wireless signal and convert a wireless signal, which received through an antenna, into a predetermined signal under the control of the control unit 4001.

A method of reproducing content in the mobile communication terminal having the above-described construction in accordance with an environment set by a user is described as follows. The user of the mobile terminal downloads the standby screen occupation representation type application from the service management server through the transceiver unit 4011, or loads the standby screen occupation representation type application to the memory 4007 through a cable connected to a personal computer. The user can execute the standby screen occupation representation type application and set a user environment, such as the type of content to be played, a time and a method, by pressing at least one key of the key input unit 4003. The setting process can be performed through access to the service management server through wired and wireless communication means, such as the Internet and an ARS, without executing the standby screen occupation representation type application. If an internal event or an external event corresponding to a period where the mobile terminal will play content occurs, the mobile terminal receives content from the service management server, and reproduces the received content through the display unit 4005 and a speaker under the control of the control unit 4001.

Figure 41:
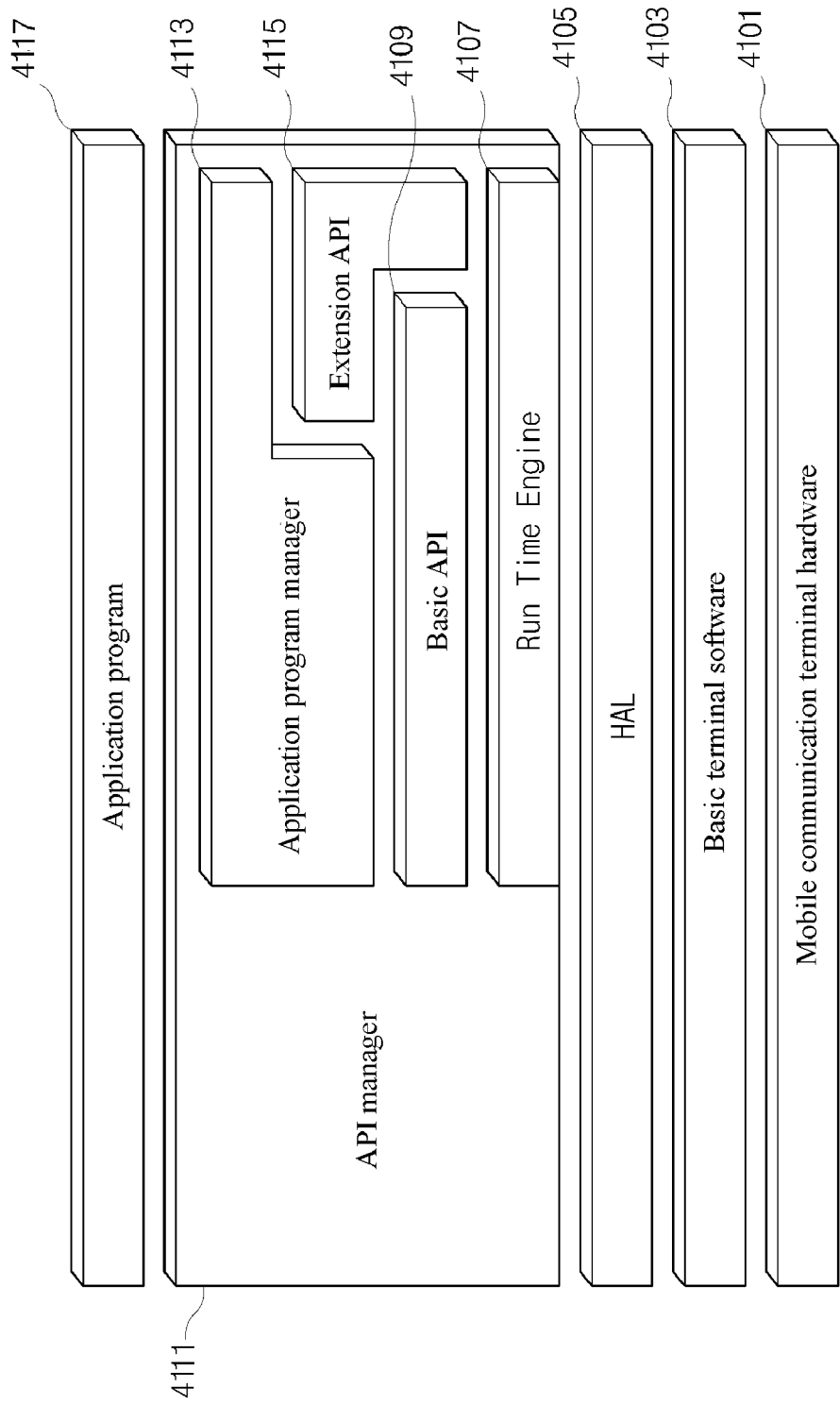
FIG. 41 is a diagram illustrating the construction of the platform of the mobile terminal in which an application program for providing bulletin service will be installed, in accordance with the third embodiment of the present invention.

FIG. 41 is a diagram illustrating the construction of the platform of a mobile terminal in which an application program for providing bulletin service will be installed, in accordance with the third embodiment of the present invention.

Referring to FIG. 41, the mobile platform includes mobile communication terminal hardware 4101, basic terminal software 4103, a HAL 4105, a run time engine 4107, a basic API 4109, an API manager 4111, an application program manager 4113, an extension API 4115 and an application program 4117. The mobile platform includes GVM, SK-VM, KVM, MAP, BREW and WIPI, and has the conventional functions of an existing mobile platform. The mobile platform also functions to transmit a standby screen occupation state to the service management server in the case where the standby screen occupation representation type application according to the present invention occupies the standby screen of the mobile communication terminal or exits from the standby screen occupation state.

The mobile communication terminal hardware 4101 may include all mobile communication terminals or portable terminals such as a mobile phone, a PDA, a PDA phone and a smart phone. The basic terminal software 4103 includes software, an LCD driver, a KPD driver and a serial driver for basic terminal operation. The HAL 4105 is an abstraction layer that maintains the hardware independence of the platform, so that upper layers can operate on the HAL 4105 regardless of the types of the mobile communication terminal hardware 4101 and the basic terminal software 4103.

The basic API 4109 is a collection of basic APIs supported in a platform used by an application program developer. The basic API 4109 includes the C API and the Java API, and is convenient for program developers. The API manager 4111 functions to update and add the basic API 4109 and the extension API 4115 of the platform. Furthermore, the API manager 4111 also provides a function of downloading the application program manager 4113. The application program manager 4113 performs the overall management functions such as the viewing of information, download, installation, execution, deletion and security management of the application program 4117. The extension API 4115 is a collection of mobile platform APIs that are candidates for standardization, and provides a collection of APIs for providing various services.

The application program 4117 refers to an application, which is installed in a mobile terminal having the platform installed therein and can operate regardless of the type of terminal environment or basic terminal software. The application program includes the standby screen occupation representation type application according to an embodiment of the present invention.

A method of providing service according to the present invention is described below with reference to the above-described construction. The mobile platform described above is installed in the mobile communication terminal. The user of the mobile communication terminal downloads the standby screen occupation representation type application according to the present invention from the mobile communication service provider or the service management server using the application program manager 4113 by pressing the keys of the mobile communication terminal. In this case, two or more standby screen occupation representation type applications can be installed in the mobile communication terminal. The standby screen occupation representation type application can be implemented using the C language or the Java language. The user sets an environment in which content will be reproduced by executing a standby screen occupation representation type application. The user may also cancel or change the service according to the present invention by executing the standby screen occupation representation type application. Meanwhile, if the user does not want the service according to the present invention, the user can delete the standby screen occupation representation type application using the application program manager 4113. Thereafter, if content is received from the service management server according to an environment set by a user, the mobile terminal reproduces the received content by executing the standby screen occupation representation type application.

Figure 42:
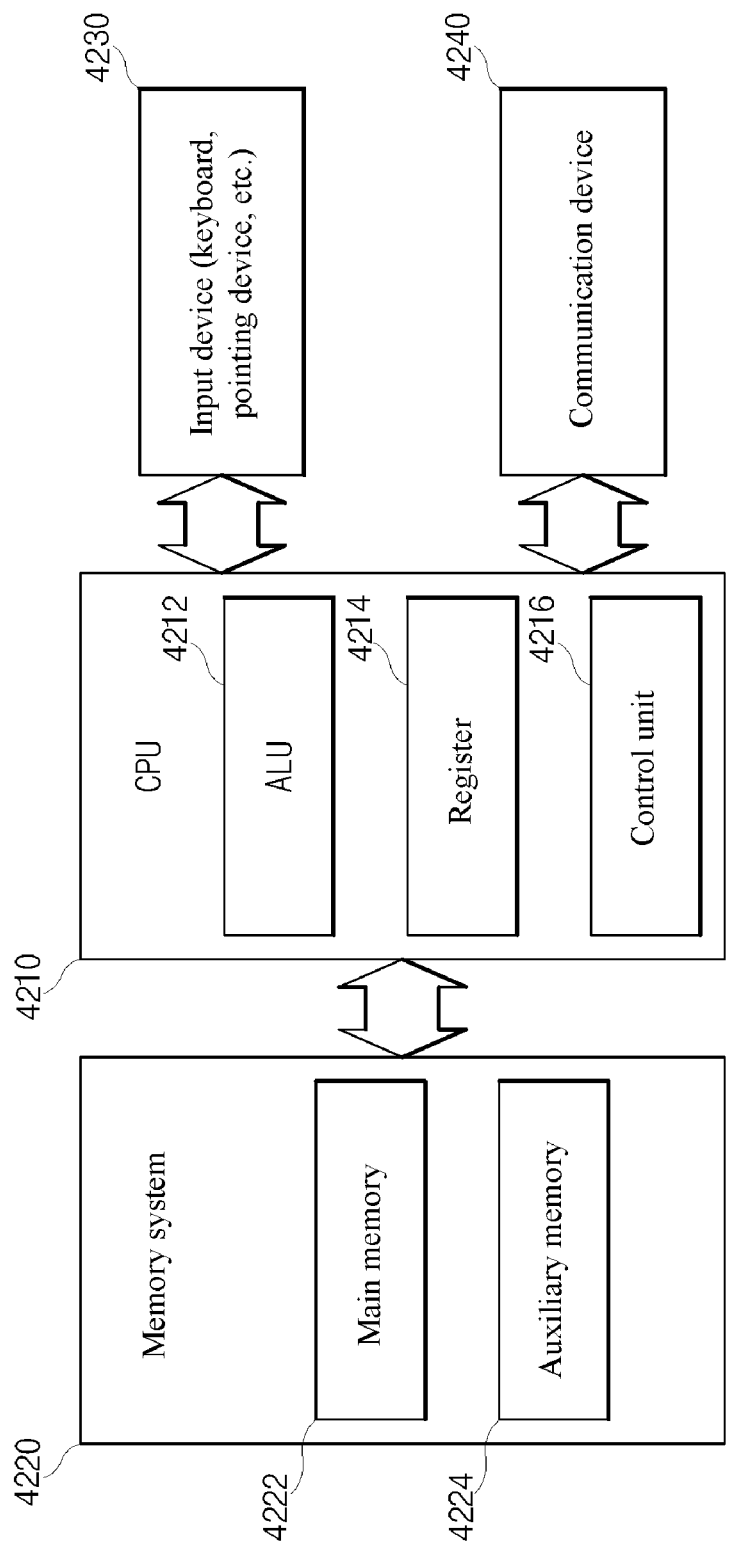
FIG. 42 is a diagram illustrating the construction of a service management server according to the third embodiment of the present invention.

FIG. 42 is a diagram illustrating the construction of a service management server according to the third embodiment of the present invention.

Referring to FIG. 42, the service management server includes a memory system 4220, at least one CPU 4210 connected to the memory system 4220 and configured to perform high-speed operation, an input device 4230, and a communication device 4240.

The CPU 4210 includes an ALU 4212 for performing mathematical operations, a register 4214 for temporarily storing data and instructions, and a control unit 4216 for controlling the operation of the service management server. The CPU 4210 can be a processor having one of a variety of architectures such as Alpha from Digital Equipment Corporation, MIPS from MIPS Technology, NEC, IDT, Siemens, etc., x86 from Intel Corporation, Cyrix, AMD and Nexgen, and PC (PowerPC) from IBM Corporation and Motorola.

The memory system 4220 includes high-speed main memory 4222 having a storage medium form such as RAM or ROM, auxiliary memory 4224 having a long-term storage form such as a floppy disk, a hard disk, a tape, a CD-ROM or flash memory, and a device for storing data using electrical, magnetic and optical properties, and other storage media. The main memory 4222 can further include video display memory that outputs an image through a display apparatus.

The input device 4230 further includes a keyboard, a mouse and so on. The mouse can include a physical transducer such as a touch screen or a microphone. The communication device 4240 includes a communication interface for communicating with a content providing server, a mobile terminal, etc.

Figure 43:
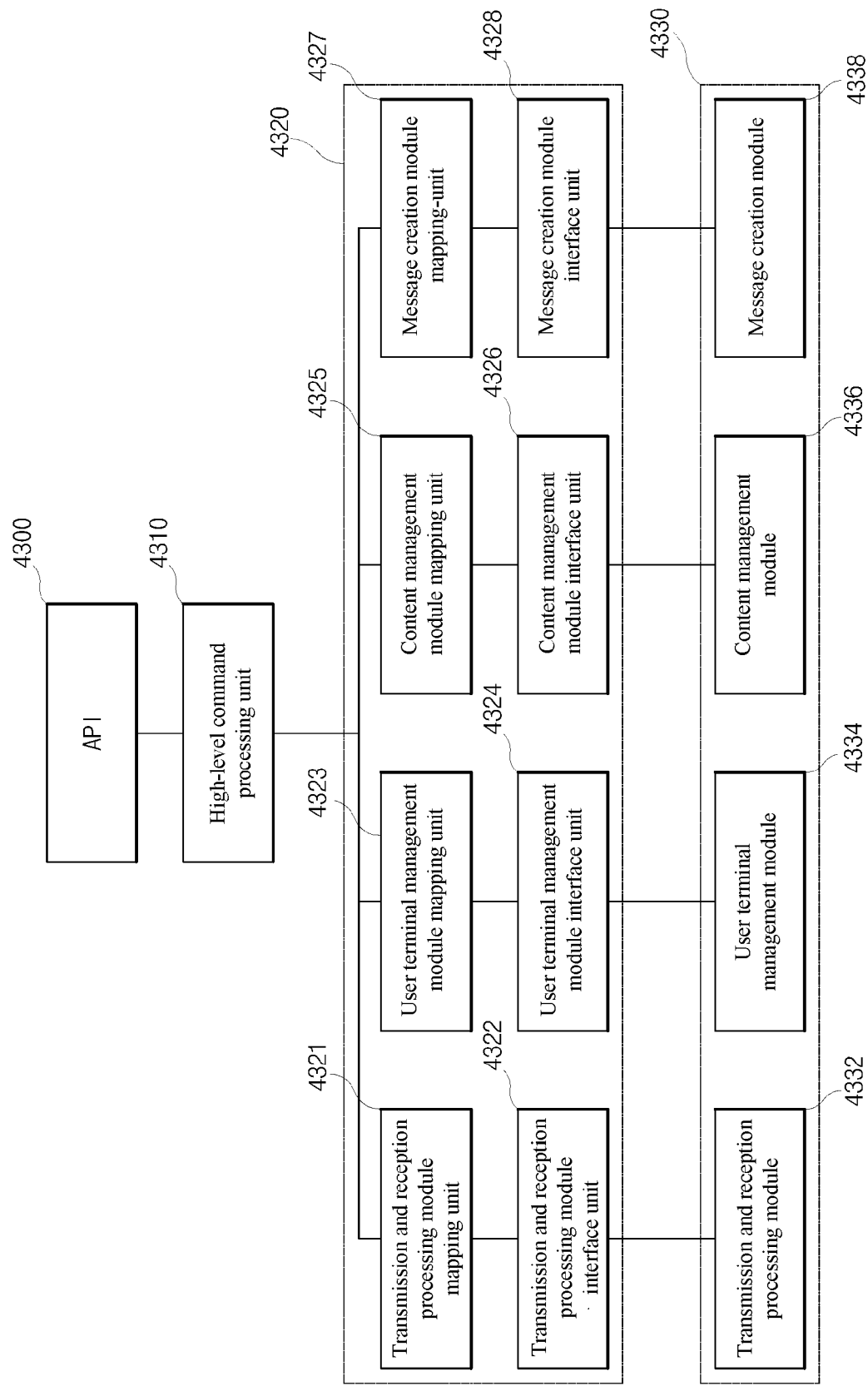
FIG. 43 is a diagram illustrating the configuration of the modules of the service management server according to the third embodiment of the present invention.

FIG. 43 is a diagram illustrating the configuration of the modules of the service management server according to the third embodiment of the present invention.

Referring to FIG. 43, the service management server can include a transmission and reception processing module 4332 for processing wired and wireless communication with a content providing server, a mobile terminal, etc., a user terminal management module 4334 for managing mobile terminals that have subscribed to the service according to the present invention, a content management module 4336 functioning to receive content information from a corresponding content providing server and provide content to a mobile terminal so as to provide the content set in the mobile terminal, and a message creation module 4338 for extracting content and processing the content into message to be output to a mobile terminal. The entire construction of the service management server according to a preferred embodiment of the present invention is described below with reference to these application modules.

The service management server can employ one of a variety of Operating Systems (OS) as a system OS. This OS controls the operation of the respective application modules 4330 by providing a high-level command to an API 4300.

The service management server includes a high-level command processing unit 4310 that identifies a corresponding application module 4330 according to a high-level command provided from the API 4300, decodes the high-level command and provides the decoded high-level command to a corresponding unit. An application module control unit 4320 controls the operation of the application module 4330 according to a command provided from the high-level command processing unit 4310. That is, the high-level command processing unit 4310 determines whether an application module 4330 corresponding to a high-level command provided from the API 4300 exists. If a corresponding application module 4330 is determined to exist, the high-level command processing unit 4310 decodes the high-level command into a command that can be recognized by a corresponding application module 4330, and transmits the decoded command to a corresponding mapping unit or controls transmission of a message. In this case, the application module 4330 includes the transmission and reception processing module 4332, the user terminal management module 4334, the content management module 4336 and the message creation module 4338. The application module control unit 4320 includes mapping units 4321, 4323, 4325 and 4327 and interface units 4322, 4324, 4326 and 4328 for the respective application modules.

The transmission and reception processing module mapping unit 4321 receives a high-level command to perform wired/wireless communication with the content providing server, the mobile terminal or the like from the high-level command processing unit 4310, maps the high-level command to a device-level command that can be processed by the transmission and reception processing module 4332, and provides the mapped command to the transmission and reception processing module 4332 through the transmission and reception processing module interface unit 4322. Furthermore, the transmission and reception processing module 4332 may include a physical transmission interface for transmitting or receiving data to or from a content providing server when necessary. At this time, the physical transmission interface includes a communication interface such as an SS7 voice network interface and a TCP/IP network interface.

The user terminal management module 4334 manages mobile terminals that have subscribed to the service and store service settings for each mobile terminal. In other words, the user terminal management module mapping unit 4323 receives a high-level command to manage mobile terminals from the high-level command processing unit 4310, maps the command to a device-level command that can be recognized by the user terminal management module 4334, and provides the user terminal management module 4334 with the mapped device-level command through the user terminal management module interface unit 4324.

The content management module 4336 manages content information received from a content providing server in order to provide an appropriate message to a mobile terminal. In other words, the content management module mapping unit 4325 receives a high-level command to manage content information, which is received from a content providing server, from the high-level command processing unit 4310, maps the high-level command to a device-level command that can be recognized by the content management module 4336, and provides the mapped command to the content management module 4336 through the content management module interface unit 4326.

The message creation module 4338 generates a message through which corresponding content will be transmitted to a mobile terminal. In other words, the message creation module mapping unit 4327 receives a high-level command to generate a message to be transmitted to a mobile terminal from the high-level command processing unit 4310, maps the high-level command to a device-level command that can be recognized by the message creation module 4338, and provides the mapped command to the message creation module 4338 through the message creation module interface unit 4328.

Figure 44:
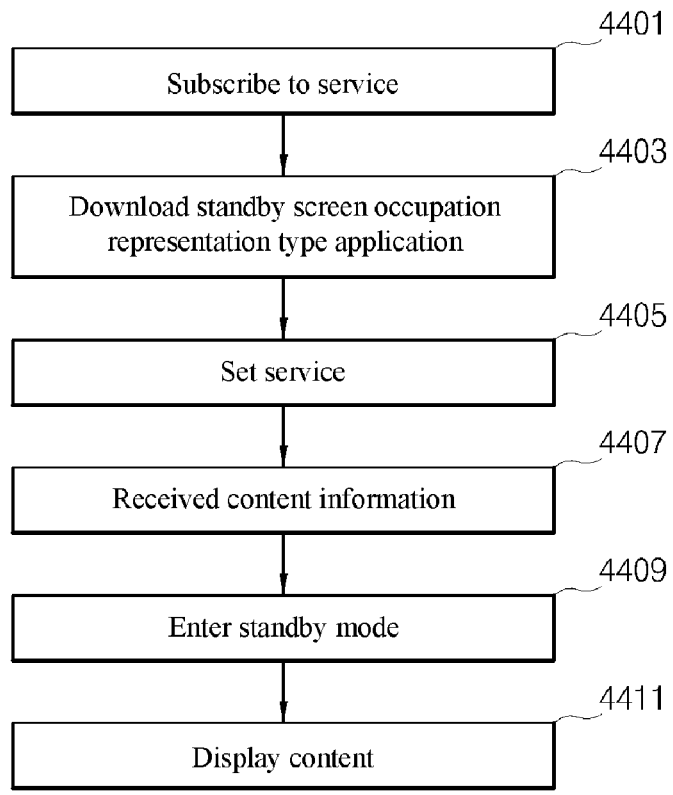
FIG. 44 is a flowchart schematically illustrating a standby screen occupation service procedure according to the third embodiment of the present invention.

FIG. 44 is a flowchart schematically illustrating a standby screen occupation service procedure according to the third embodiment of the present invention. In this case, standby screen occupation service refers to the service in which a mobile terminal outputs received content information (message) from a service management server to a display unit in standby mode.

Referring to FIG. 44, the user of a mobile terminal that wants to subscribe to the service according to the present invention subscribes to the service by gaining access to a service management server via a wired/wireless communication network (step 4401), downloads a standby screen occupation representation type application through the mobile terminal, installs the downloaded application in the mobile terminal, and sets a service environment (steps 4403 and 4405). The service subscription procedure at step 4401 and the setting procedure at step 4405 are described in detail with reference to FIG. 45.

Thereafter, the mobile terminal receives updated content from the service management server according to the environment set at step 4405 (step 4407). The procedure of receiving the updated content from the service management server is described in detail with reference to FIGS. 46 to 49.

Thereafter, if the mobile terminal enter standby mode (step 4409), the mobile terminal drives a standby screen occupation representation type application to display the received content in standby mode (step 4411).

Figure 45:
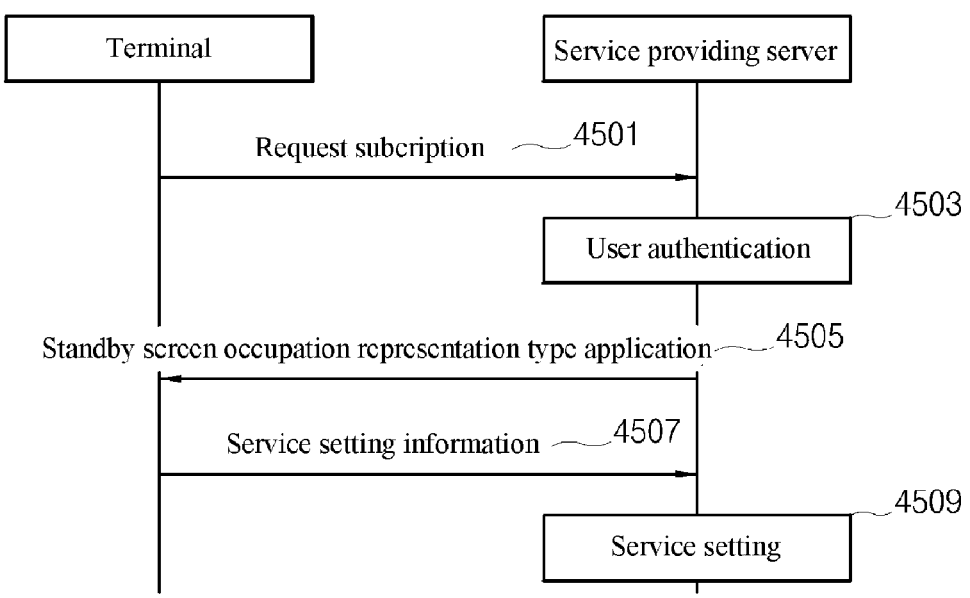
FIG. 45 is a signal flowchart illustrating a standby screen occupation service subscription procedure and a service environment setting procedure according to the third embodiment of the present invention.

FIG. 45 is a signal flowchart illustrating a standby screen occupation service subscription procedure and a service environment setting procedure according to the third embodiment of the present invention.

Referring to FIG. 45, the user of the mobile terminal gains access to a service providing server via a wired/wireless communication network, and transmits a service subscription request signal according to the present invention to the service providing server (step 4501). The service providing server authenticates the user (step 4503). If the authentication is successful, the service providing server transmits the standby screen occupation representation type application to the mobile terminal (step 4505). The standby screen occupation representation type application can be transmitted to the mobile terminal in an OTA-SD manner. Furthermore, the standby screen occupation representation type application can be transmitted to a personal computer and can then be uploaded to a mobile terminal while the personal computer and the mobile terminal remain connected to each other, or the user can have the standby screen occupation representation type application installed in the mobile terminal by directly visiting a service providing server or a communication service provider. The mobile terminal transmits service setting information to the service providing server in order to set a service environment using the standby screen occupation representation type application (step 4507). The service setting information includes information indicating the type of an image to be output to the standby screen in standby mode and a message to be output in bulletin board form in standby mode. The image content includes entertainment service such as Damagochi, etc., communication service such as messenger, and information service such as news and weather. Furthermore, the message content for a bulletin board includes content such as stock reports, news, weather and real estate reports. At step 4509, the service providing server registers a service environment in the mobile terminal and updates a service environment in the mobile terminal, on the basis of the service setting information, thereby completing service setting. Furthermore, it is to be understood that the user can set a service environment while gaining access to the service providing server through wired and wireless communication without executing the standby screen occupation representation type application. The process of setting a service environment by executing the standby screen occupation representation type application at step 4507 and step 4509 is described in detail with reference to FIGS. 56 to 58.

Figure 46:
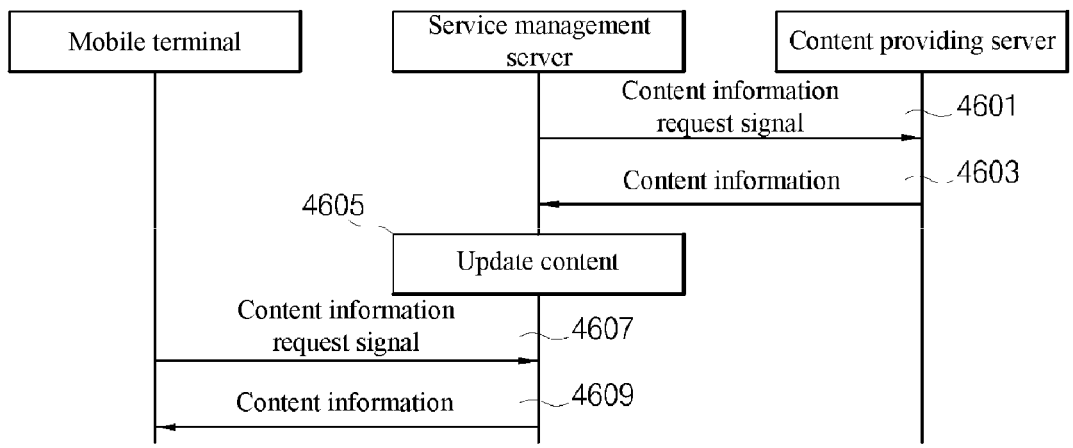
FIG. 46 is a signal flowchart illustrating a procedure of providing updated content to the mobile terminal in accordance with the third embodiment of the present invention.

FIG. 46 is a signal flowchart illustrating a procedure of providing updated content to the mobile terminal in accordance with the third embodiment of the present invention.

Referring to FIG. 46, the service management server transmits a content information request signal to the content providing server at predetermined intervals in order to update content to be provided to the mobile terminal (step 4601). The content providing server transmits content information corresponding to the received content information request signal from the service management server (step 4603). The service management server updates content based on the content information received from the content providing server (step 4605). Thereafter, if a content information request signal is received from the mobile terminal (step 4607), the service management server transmits corresponding content information to the mobile terminal (step 4609). At this time, the content information is processed into a form, which can be reproduced in the mobile terminal, through the standby screen occupation representation type application, and then transmitted to the mobile terminal.

Figure 47:
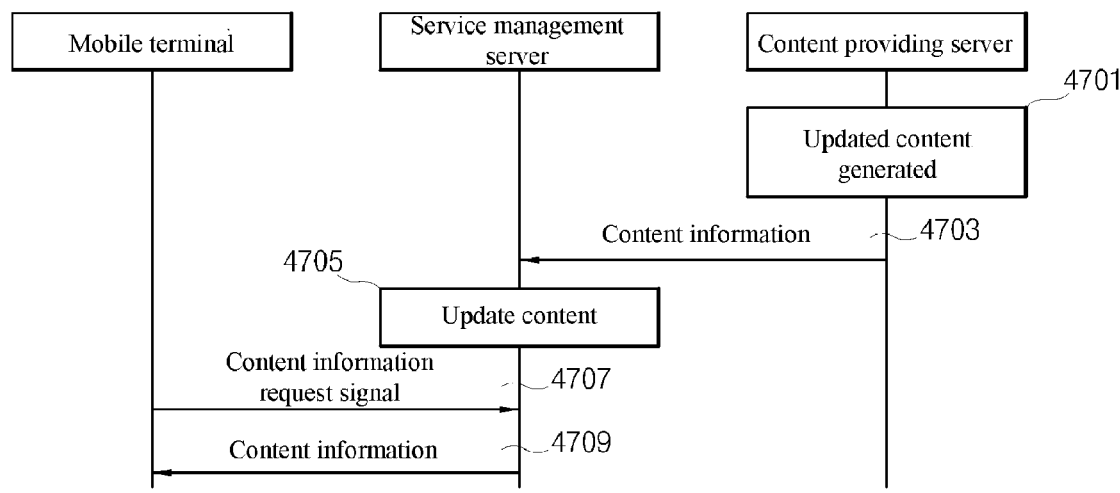
FIG. 47 is a signal flowchart illustrating a procedure of providing updated content to the mobile terminal in accordance with the third embodiment of the present invention.

FIG. 47 is a signal flowchart illustrating a procedure of providing updated content to the mobile terminal in accordance with the third embodiment of the present invention.

Referring to FIG. 47, if content is updated in the content providing server (step 4701), the content providing server transmits the updated content information to a service management server (step 4703). The service management server updates content, which stored in a database, based on the received content information (step 4705).

The mobile terminal then transmits a content information request signal to the service management server in response to an internal event, etc. according to user settings (step 4707). The service management server transmits the content information to the mobile terminal in response to the received content information request signal (step 4709). At this time, the content information is processed into form that can be reproduced in the mobile terminal through a standby screen occupation representation type application, and then transmitted to the mobile terminal.

Figure 48:
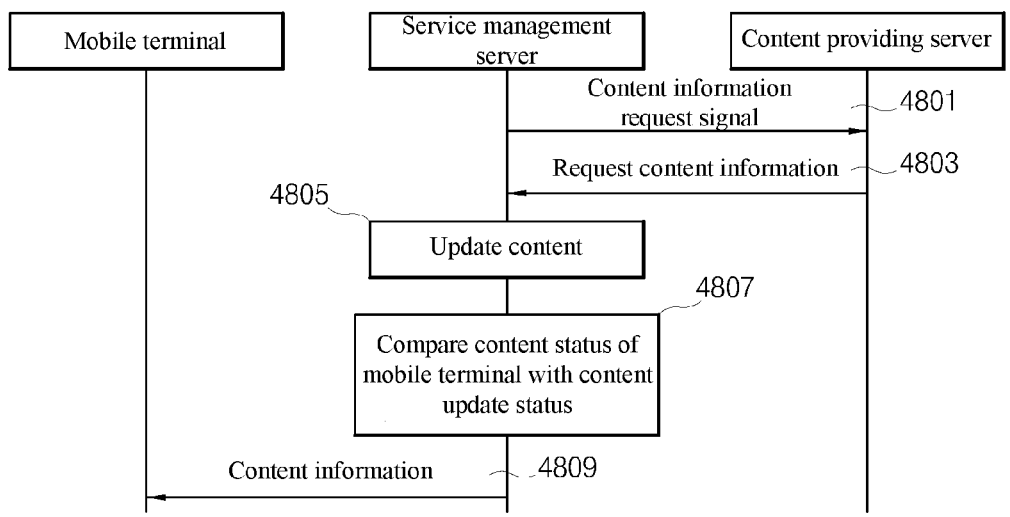
FIG. 48 is a signal flowchart illustrating a procedure of providing updated content to the mobile terminal in accordance with the third embodiment of the present invention.

FIG. 48 is a signal flowchart illustrating a procedure of providing updated content to a mobile terminal in accordance with the third embodiment of the present invention.

Referring to FIG. 48, the service management server transmits a content information request signal to the content providing server at predetermined intervals so as to update content to be provided to a mobile terminal (step 4801). The content providing server transmits content information corresponding to the received content information request signal to the service management server (step 4803). The service management server updates content based on the content information received from the content providing server (step 4805).

The service management server then compares the content status of the mobile terminal, which is stored in a database, and content status (step 4807). At this time, if the time when content was updated is later than the content status time of the mobile terminal, the service management server transmits updated content information to the mobile terminal (step 4809). In this case, the content information is processed into form that can be reproduced in the mobile terminal through a standby screen occupation representation type application, and is then transmitted to the mobile terminal.

Figure 49:
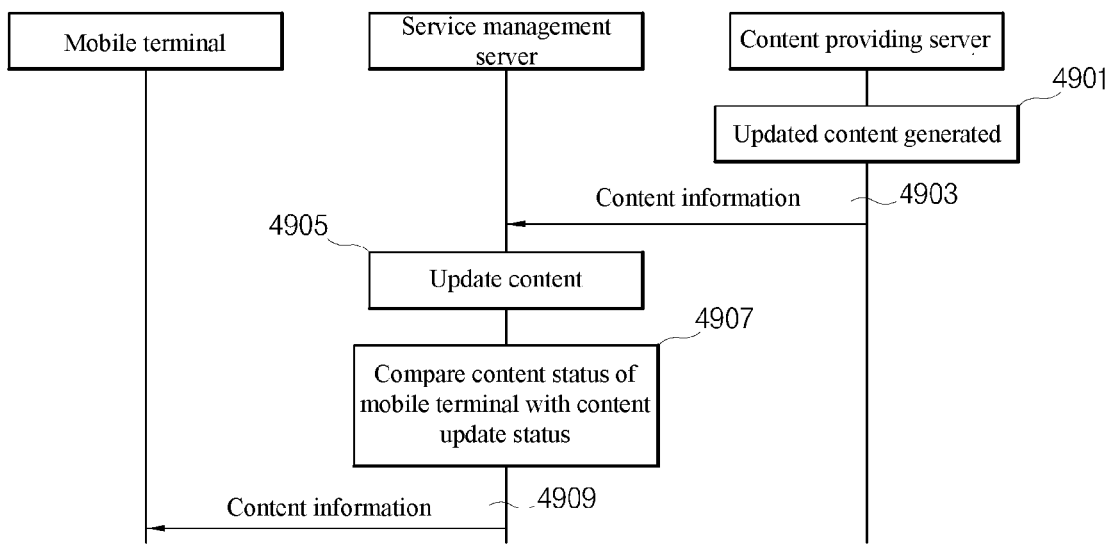
FIG. 49 is a signal flowchart illustrating a procedure of providing updated content to the mobile terminal in accordance with the third embodiment of the present invention.

FIG. 49 is a signal flowchart illustrating a procedure of providing updated content to a mobile terminal in accordance with the third embodiment of the present invention.

Referring to FIG. 49, if content is updated in a content providing server (step 4901), the content providing server transmits the updated content information to a service management server (step 4903). The service management server updates content, which is stored in a database, based on the received content information (step 4905).

The service management server then compares the content status of the mobile terminal, which is stored in a database, with content update status (step 4907). At this time, if the time when content was updated is later than the content status time of the mobile terminal, the service management server transmits updated content information to the mobile terminal (step 4909). In this case, the content information is processed into form that can be reproduced in the mobile terminal through a standby screen occupation representation type application, and is then transmitted to the mobile terminal.

Figure 50:
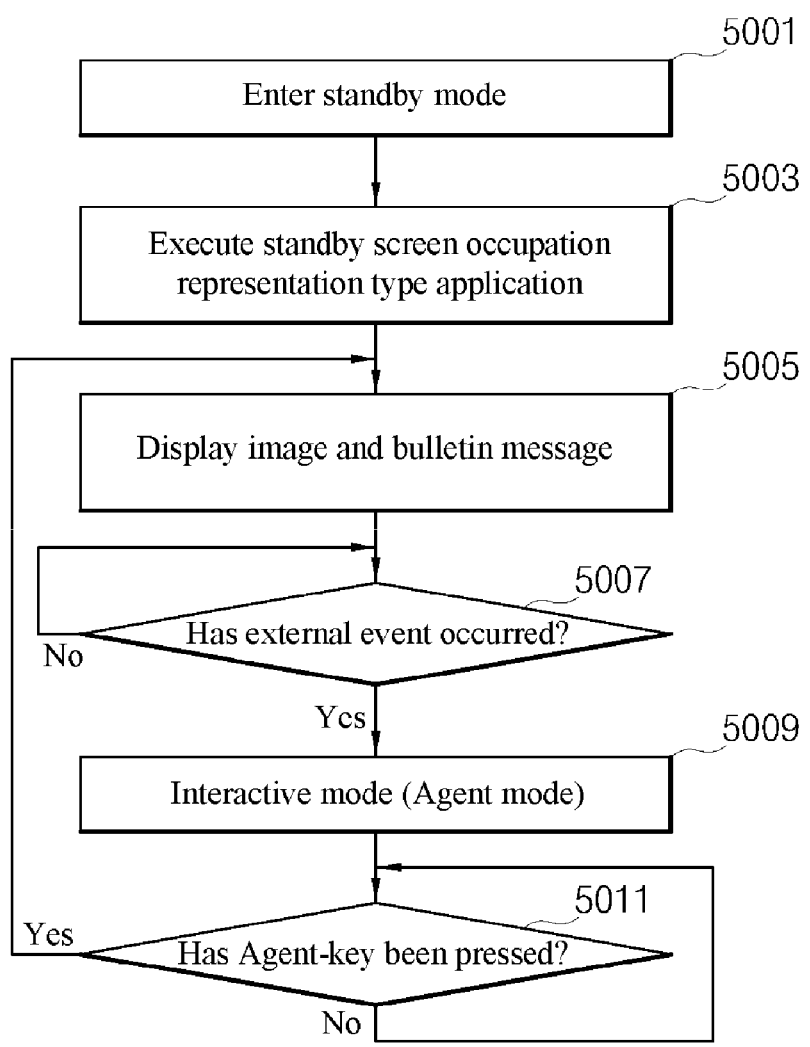
FIG. 50 is a flowchart illustrating a procedure of outputting a message for standby mode to the display unit in the mobile terminal in accordance with the third embodiment of the present invention.

FIG. 50 is a flowchart illustrating a procedure of outputting a message for standby mode to a display unit in the mobile terminal in accordance with the third embodiment of the present invention.

Referring to FIG. 50, if communication is terminated in a mobile terminal, the call end button of a key input unit is pressed or there has been no key input for a predetermined time, the mobile terminal enters standby mode (step 5001). In standby mode, the mobile terminal drives the standby screen occupation representation type application under the control of a control unit (step 5003). The standby screen occupation representation type application outputs a previously set standby screen image to a display unit, and outputs a message, which is received from a service management server, to the display unit in bulletin board form (step 5005). The process of outputting a message to the display unit in bulletin board form at step 5005 is described in detail with reference to FIG. 51. The process of outputting an image to the display unit is described in detail with reference to FIG. 52.

In standby mode, if the agent key is pressed (step 5007), the mobile terminal enters interactive mode where a standby screen occupation representation type application is activated (step 5009). The agent key is automatically generated when the standby screen occupation representation type application is installed. In standby mode, the functions of keys other than the agent key have the same functions as those in common standby mode. The process of driving the standby screen occupation representation type application in interactive mode at step 5009 is described in detail with reference to FIG. 53.

In interactive mode, if the agent key is pressed, the mobile terminal returns to standby mode and then performs step 5005.

Figure 51:
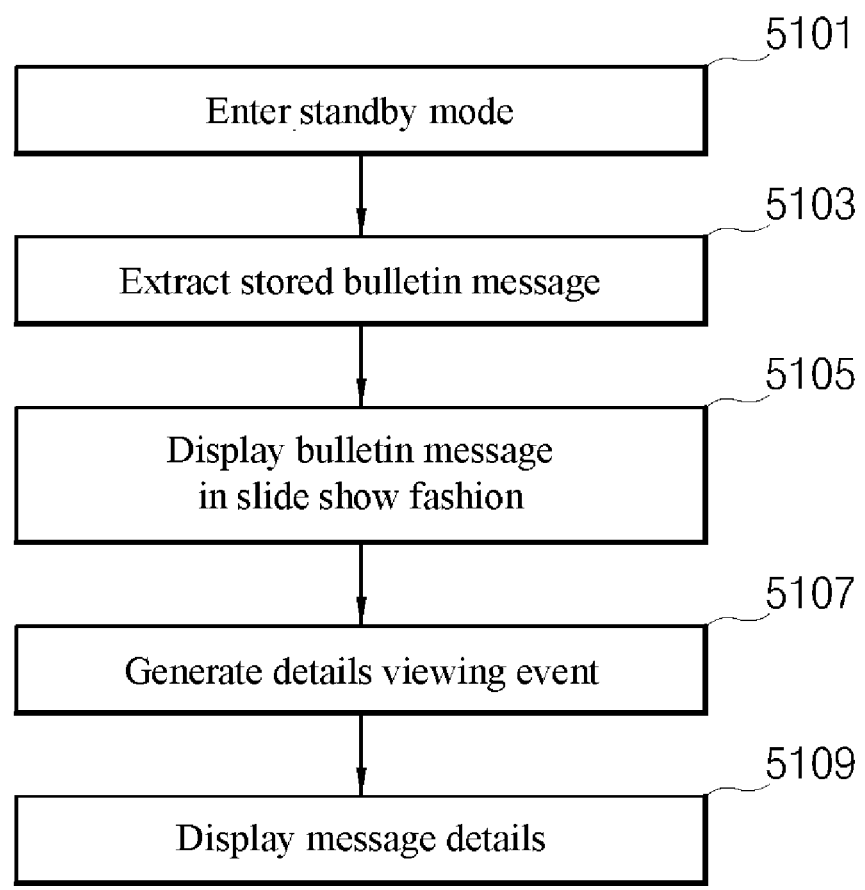
FIG. 51 is a flowchart illustrating a procedure of outputting a bulletin message to the display unit of the mobile terminal in accordance with the third embodiment of the present invention.

FIG. 51 is a flowchart illustrating a procedure of outputting a bulletin message to the display unit of the mobile terminal in accordance with the third embodiment of the present invention.

Referring to FIG. 51, if communication is terminated, the call end button of a key input unit is pressed or there has been no key input for a predetermined time, the mobile terminal enters standby mode (step 5101). In standby mode, the mobile terminal drives a standby screen occupation representation type application to extract a bulletin message, which is stored in memory, under the control of a control unit (step 5103). In this case, the bulletin message includes a message header, bulletin contents and message details. The mobile terminal displays the bulletin contents on the bulletin board region that is part of the display unit in a slide show fashion (step 5105). Thereafter, if the agent key of the key input unit of the mobile terminal is pressed to activate the standby screen occupation representation type application and at least one key of the mobile terminal is pressed to generate a detailed view event (step 5107), the mobile terminal outputs message details to the display unit (step 5109).

Figure 52:
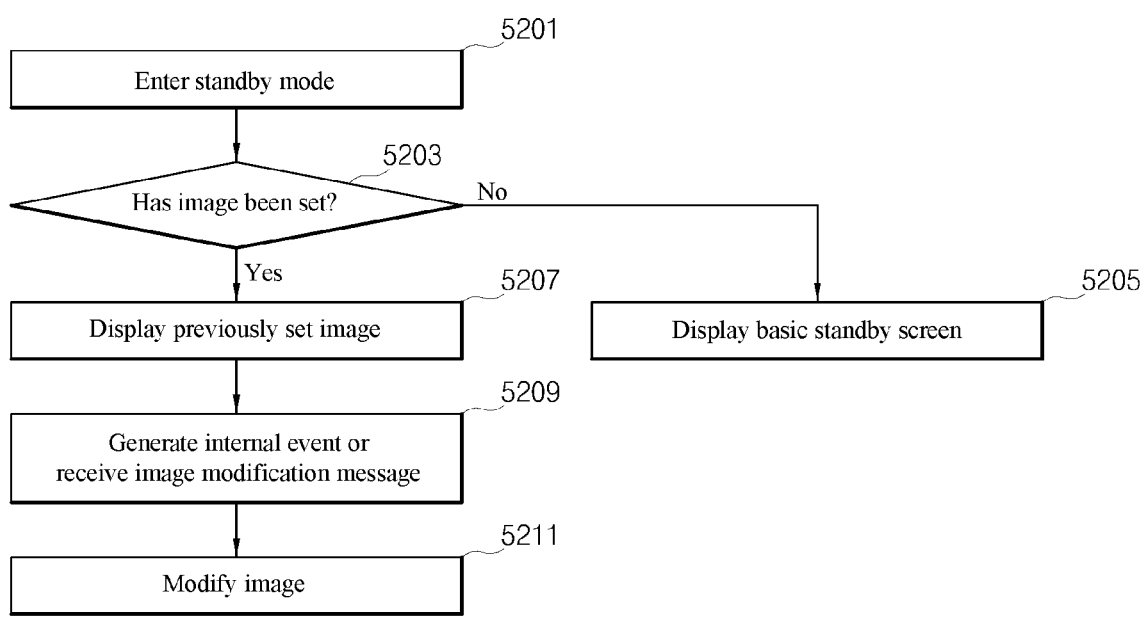
FIG. 52 is a flowchart illustrating a procedure of outputting a standby screen image to the display unit and changing the standby screen image in accordance with the third embodiment of the present invention.

FIG. 52 is a flowchart illustrating a procedure of outputting a standby screen image to the display unit and changing the standby screen image in accordance with the third embodiment of the present invention.

Referring to FIG. 52, if communication is terminated, the call end button of the key input unit is pressed or there has been no key input for a predetermined time, the mobile terminal enters standby mode (step 5201). In standby mode, the mobile terminal drives a standby screen occupation representation type application and determines whether a standby screen image has been set (step 5203). If the standby screen image is determined not to have been set, step 5205 is performed. If the standby screen image is determined to have been set, step 5207 is performed. At step 5205, the mobile terminal outputs a basic standby screen to a display unit.

At step 5207, the mobile terminal outputs a previously set image to a display unit. In this case, the image is received from the service management server or the content providing server according to the present invention, and is set and stored as an image of the standby screen occupation representation type application. If the lid of the terminal is opened, at least one key of the terminal is pressed or an internal event, such as an alarm or a timer, occurs at steps 5209 and 5211, the mobile terminal automatically modifies the image according to an internal scenario and outputs the modified image. Furthermore, the mobile terminal transmits an image modification request signal to the service management server according to the internal event. If an image modification message responding to the image modification request signal is received, the mobile terminal modifies and outputs the image.

Figure 53:
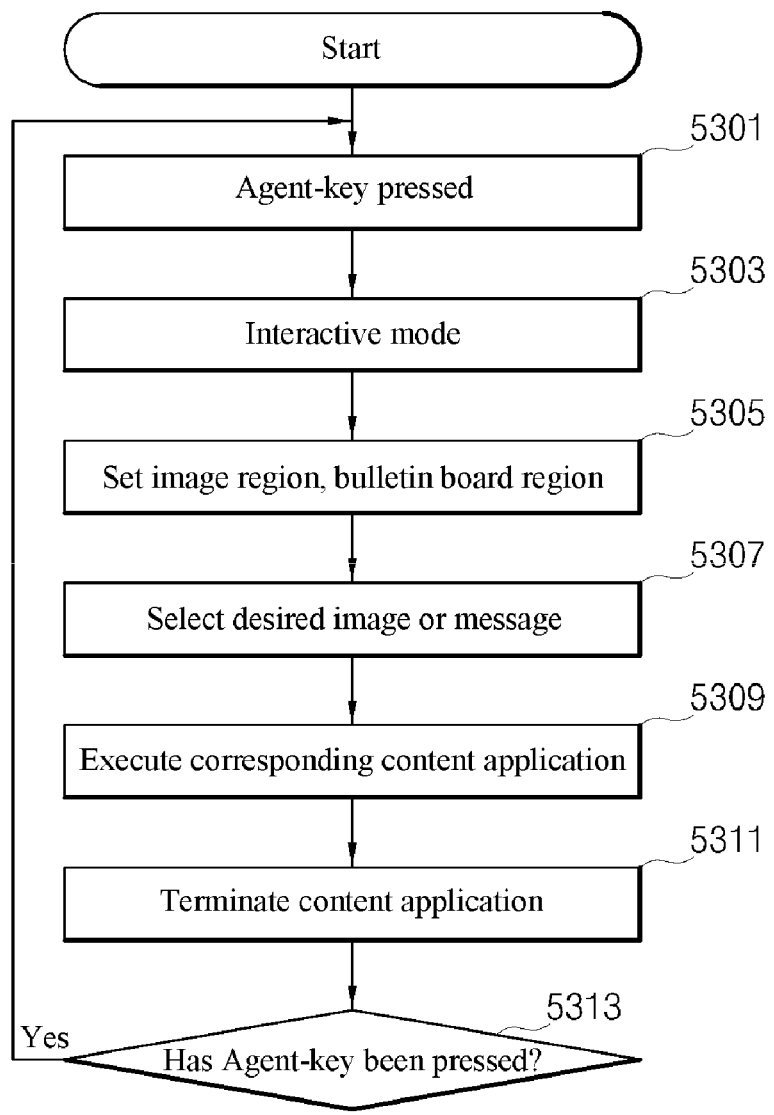
FIG. 53 is a flowchart illustrating a procedure of executing a standby screen occupation representation type application in interactive mode in accordance with the third embodiment of the present invention.

FIG. 53 is a flowchart illustrating a procedure of executing a standby screen occupation representation type application in interactive mode in accordance with the third embodiment of the present invention.

Referring to FIG. 53, if the standby screen occupation representation type application is installed in the mobile terminal, the mobile terminal generates the agent key in standby mode. If the agent key is pressed (step 5301), the mobile terminal activates the standby screen occupation representation type application and operates in interactive mode (step 5303). In interactive mode, the user of the mobile terminal can view a desired message in detail by selecting the message, and can directly execute a corresponding content application or automatically access a server that provides corresponding content.

In interactive mode, at least one key of the terminal is pressed and an image region or a bulletin board region is activated (step 5305). If the image region or the bulletin board region is activated and the confirmation button is then pressed (step 5307), the mobile terminal executes a corresponding content application (step 5309). For example, if an image is selected as a result of execution of content application, the mobile terminal automatically gains access to a content providing server that provides the image. If a message posted in the bulletin board region is selected, detailed information is displayed. If the confirmation button is pressed again, the mobile terminal automatically gains access to a server that provides corresponding content. If a corresponding content application is terminated (step 5311) and the agent key or call end button is pressed in interactive mode, the mobile terminal returns to standby mode (step 5313).

Figure 54:
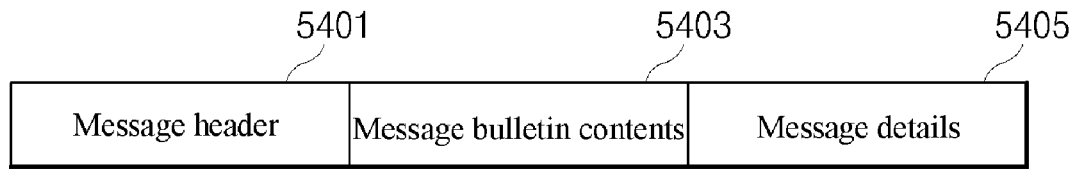
FIG. 54 is a diagram illustrating the format of a message according to the third embodiment of the present invention.

FIG. 54 is a diagram illustrating the format of a message according to the third embodiment of the present invention.

Referring to FIG. 54, a message in a mobile terminal, which is received from a service management server, includes a message header 5401, message bulletin contents 5403 and message details 5405. The message header 5401 includes various pieces of information related to the service according to the present invention. In this case, examples of the information are a Telesvc-id, storage time, a content type, a callback URL and the like. If a message is received, the mobile terminal determines whether the Telesvc-id exists in the message. If the Telesvc-id is determined to exist, the mobile terminal determines that the message to be a message according to the present invention. If Telesvc-id is not included in the message, the mobile terminal determines the message to be a common message. In this case, if the content type included in the message header 5401 is classified as a highly important one, the mobile terminal can output the message details 5405 directly to a display unit. If the message is an image modification message, the mobile terminal can automatically modify an image and can automatically execute a corresponding application.

The mobile terminal that receives the message according to the present invention does not output the message to the display unit, but stores the message in memory and then outputs the message bulletin contents 5403 to the bulletin board region of the display unit in standby mode. If a detailed view event occurs while the message bulletin contents 5403 are being output, the mobile terminal can output the message details 5405 to the display unit, or can gain access to a content providing server or a service management server based on the callback URL and then output detailed contents to the display unit. Meanwhile, the mobile terminal stores the message for a time period corresponding to the storage time, and then automatically deletes the message when the storage time elapses.

Figure 55:
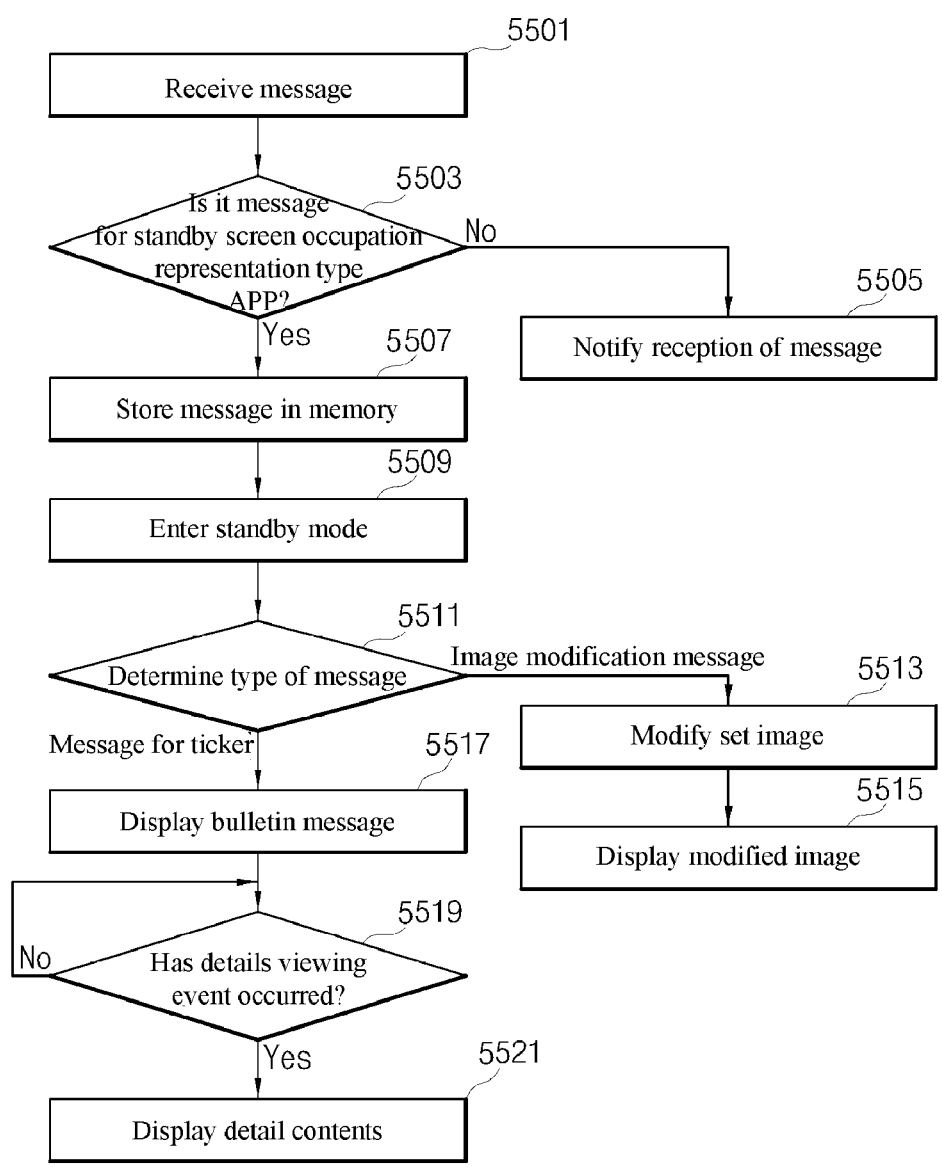
FIG. 55 is a flowchart illustrating a procedure of processing a received message in the mobile terminal in accordance with the third embodiment of the present invention.

FIG. 55 is a flowchart illustrating a procedure of processing received messages in a mobile terminal in accordance with the third embodiment of the present invention.

Referring to FIG. 55, if a message is received (step 5501), a mobile terminal determines whether the received message is a message for the standby screen occupation representation type application according to the present invention (step 5503). If, as a result of the determination, the message is the message for the standby screen occupation representation type application, step 5507 is performed. If the message is a common message, step 5505 is performed. At step 5505, the mobile terminal notifies the user of the reception of the message through an alarm or the display unit, and follows the common message reception processing procedure. At step 5507, the mobile terminal stores the message in the memory of the standby screen occupation representation type application. The mobile terminal executes the standby screen occupation representation type application in standby mode (step 5509), and then determines whether the message is a bulletin message or a message for image modification (step 5511). If, as a result of the determination, the message is a bulletin message, step 5517 is performed. If the message is an image modification message, step 5513 is performed. At step 5513, the mobile terminal modifies a set image based on the image modification message (step 5513) and outputs the modified image to a display unit (step 5515).

At step 5517, the mobile terminal outputs the message contents of the bulletin message onto a bulletin board region of the display unit. At this time, if a plurality of bulletin messages exists, the mobile terminal outputs bulletin messages in a slide show fashion. If a detailed view event occurs by pressing at least one key of the mobile terminal (S5519), the mobile terminal outputs the detailed contents of a message, which is being output to the bulletin board region, to the display unit (step 5521).

Figure 56:
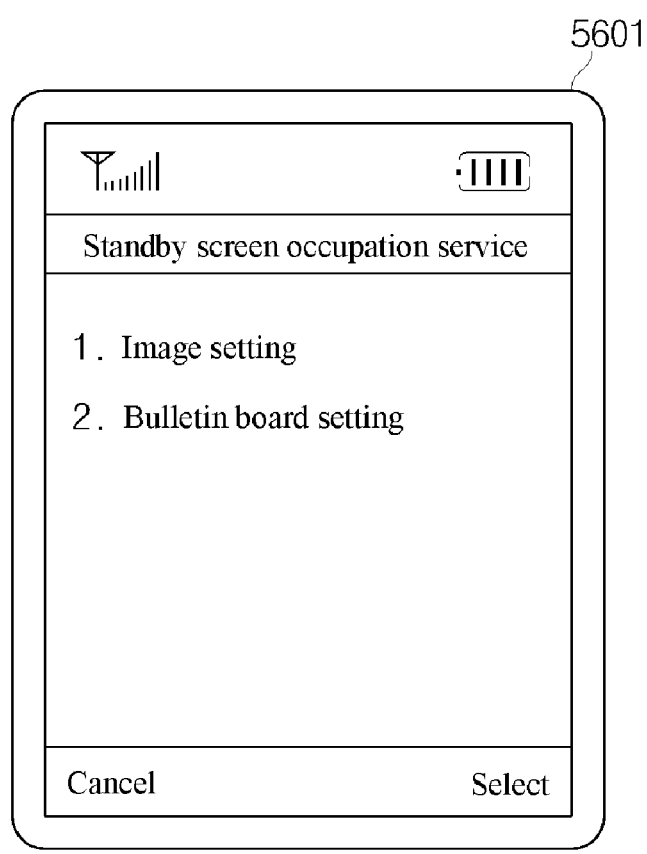
FIGS. 56 to 58 illustrate screens of the mobile terminal to explain a procedure of setting a standby screen occupation representation type application in accordance with the third embodiment of the present invention.
Figure 57:
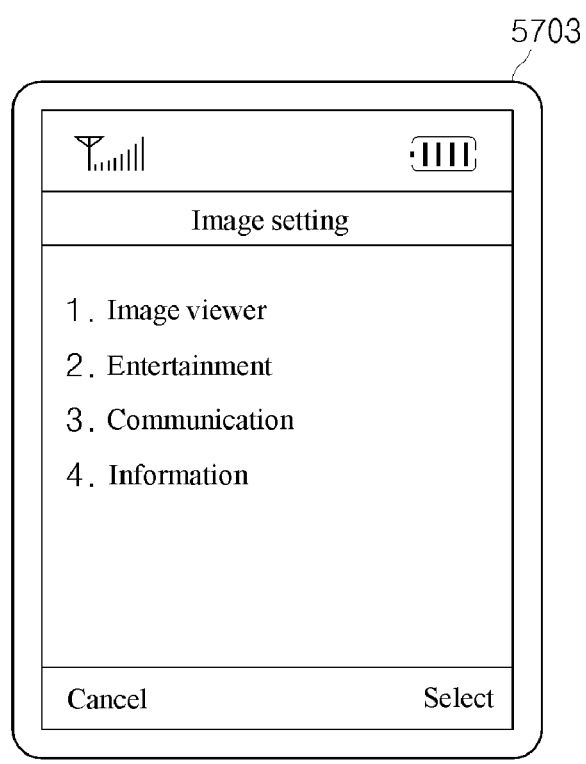
Figure 58:
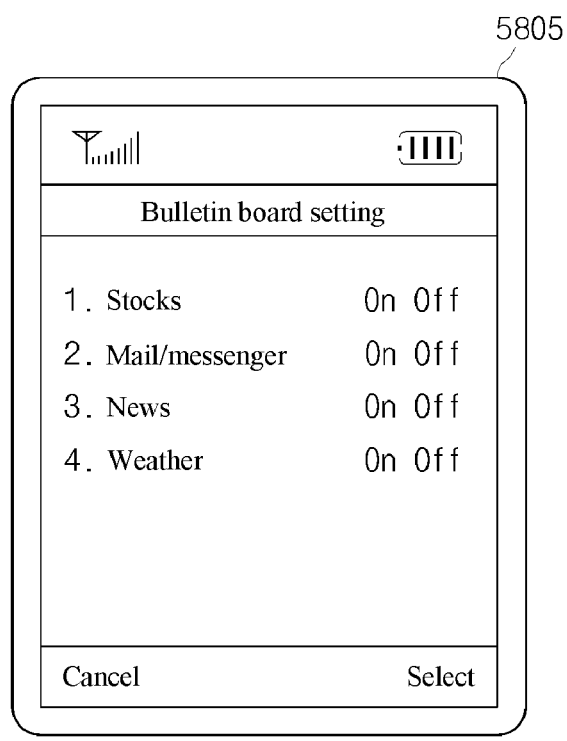

FIGS. 56 to 58 show the screens of the mobile terminal illustrating a procedure of setting a standby screen occupation representation type application in accordance with the third embodiment of the present invention.

Referring to FIGS. 56 to 58, if a mobile terminal downloads a standby screen occupation representation type application from a service management server and executes the standby screen occupation representation type application, an agent service setting screen 5601 is output to a display unit. The agent service setting screen 5601 includes an image setting item and a bulletin board (ticker) setting item. The image setting item is an item for setting an image to be output to a standby screen, and the bulletin board setting item is an item for setting the type of message to be output to a bulletin board region.

If the user of the mobile terminal selects the image setting item from the agent service setting screen 5601 and presses a confirmation button, the mobile terminal outputs an image setting screen 5603 to the display unit. The image setting screen 5603 can include an image viewer, entertainment, communication and information items. In this case, the image viewer item is used to view an image set by a user, the entertainment item is a game type service such as Damagochi, the communication item is an interactive type service such as messenger, e-mail and chatting, and the information item refers to information service such as stock reports and shopping malls.

If the bulletin board setting item is selected and the confirmation button is pressed in the agent service setting screen 5601, the mobile terminal outputs a bulletin board setting screen 5605 to the display unit. The user of the mobile terminal can set the type of message, which will be output to the bulletin board region in standby mode, in the bulletin board setting screen 5605.

An example of service according to the present invention is described with reference to FIGS. 59 to 61.

Figure 59:
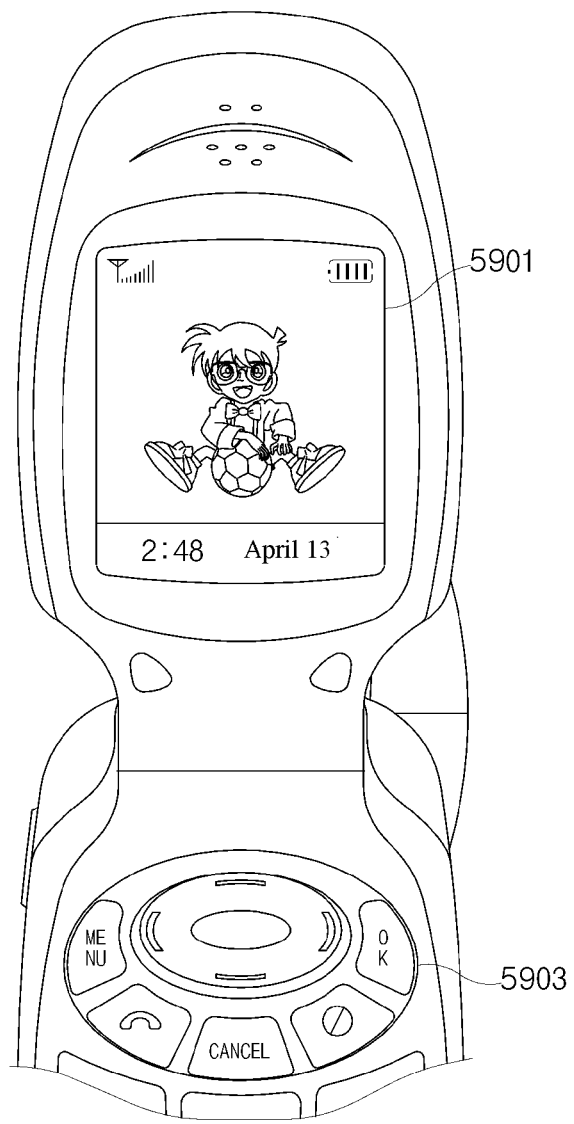
FIGS. 59 to 61 illustrate the screens of standby screen occupation service according to the third embodiment of the present invention.
Figure 60:
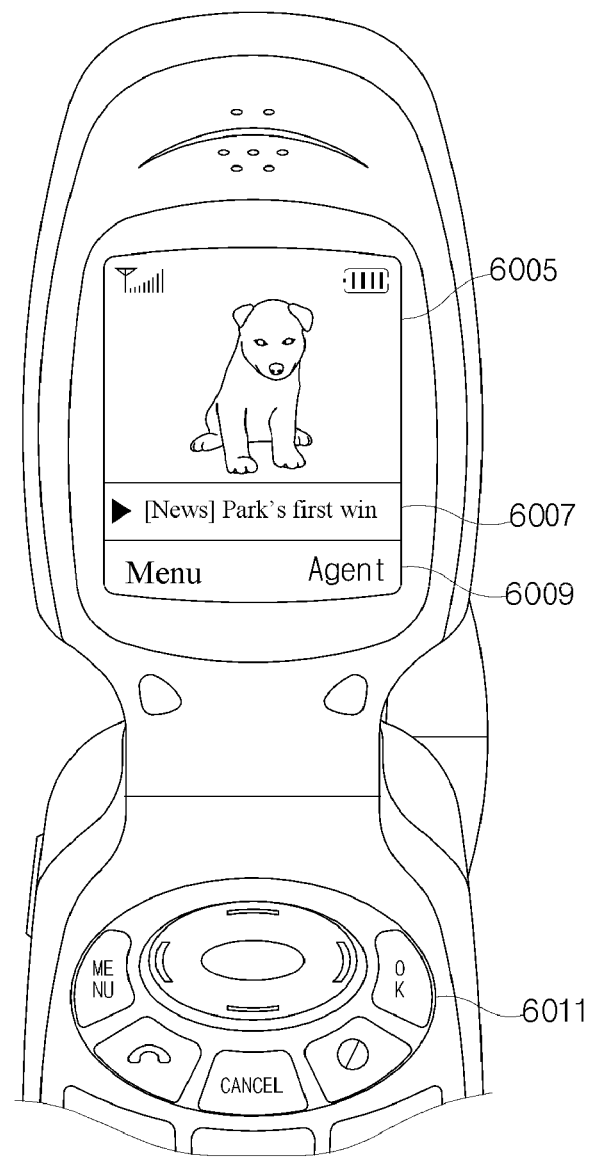
Figure 61:
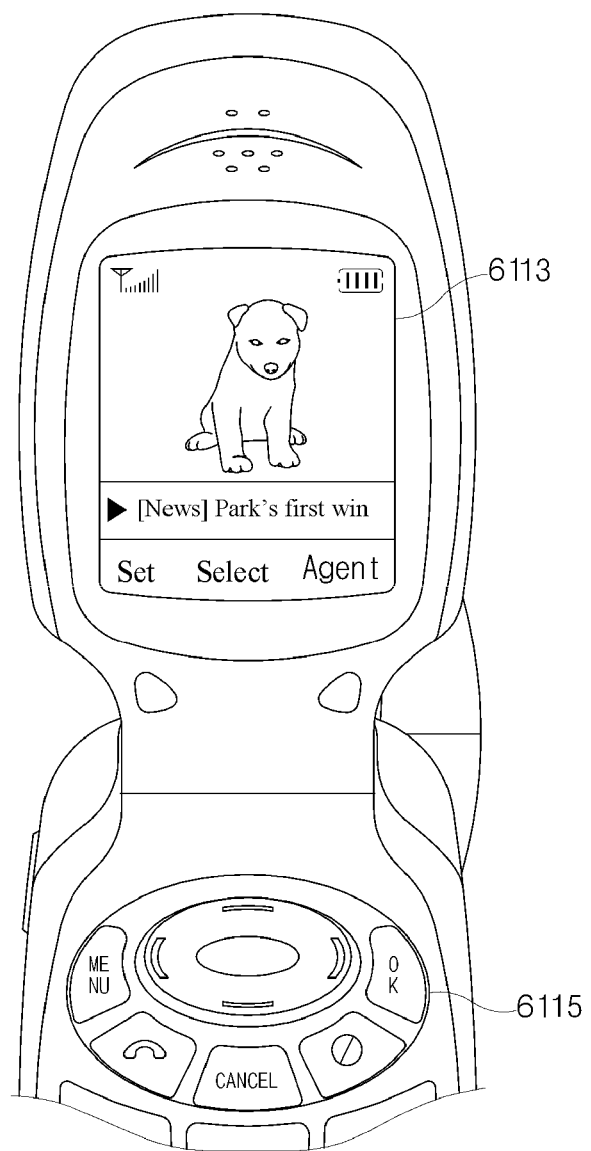

FIGS. 59 to 61 illustrate screens of standby screen occupation service according to the third embodiment of the present invention.

FIG. 59 is a diagram illustrating the display unit and key input unit of the mobile terminal in standby mode before a standby screen occupation representation type application is installed, in accordance with the third embodiment of the present invention.

Referring to FIG. 59, the mobile terminal in which the standby screen occupation representation type application is not installed outputs a standby screen 5901 set by a user to a display unit under the control of a basic standby screen control program in standby mode. Furthermore, in standby mode, the respective keys of the key input unit 5903 have the same functions as those in existing standby mode.

FIG. 60 is a diagram illustrating the display unit and key input unit of the mobile terminal in standby mode while the standby screen occupation representation type application remains installed, in accordance with the third embodiment of the present invention.

Referring to FIG. 60, if the mobile terminal downloads and installs the standby screen occupation representation type application, the mobile terminal outputs an image region 6005, a bulletin board region 6707 and an agent key region 6709, which are separated from each other, to the display unit in standby mode. The agent key region 6709 is generated when the standby screen occupation representation type application is installed. An image set to a standby screen image is output to the image region 6705. Bulletin messages, which are received and stored in memory, are output to the bulletin board region 6707 in a slide show fashion. In standby mode, in the key input unit 6711 of the mobile terminal, a confirmation button is an agent key that activates the standby screen occupation representation type application, and buttons other than the confirmation button have the same functions as those in an existing standby screen.

FIG. 61 is a diagram illustrating the display unit and key input unit of the mobile terminal in standby mode in interactive mode in accordance with the third embodiment of the present invention.

Referring to FIG. 61, if the agent key is pressed in standby mode, a mobile terminal outputs an agent service screen 1713 including an image region and a bulletin board region to the display unit in interactive mode where the standby screen occupation representation type application is activated. In the agent service screen 1713, one of the image region and the bulletin board region is activated. Furthermore, in order to change the region where the image region or the bulletin board region is located, at least one key (e.g., a menu button) is pressed. In interactive mode, the buttons of the key input unit 1715 perform respective functions that are defined to execute the standby screen occupation representation type application. Meanwhile, the confirmation button of the key input unit 1715 corresponds to an agent key. If the agent key is pressed, the mobile terminal returns to standby mode.

Figure 62:
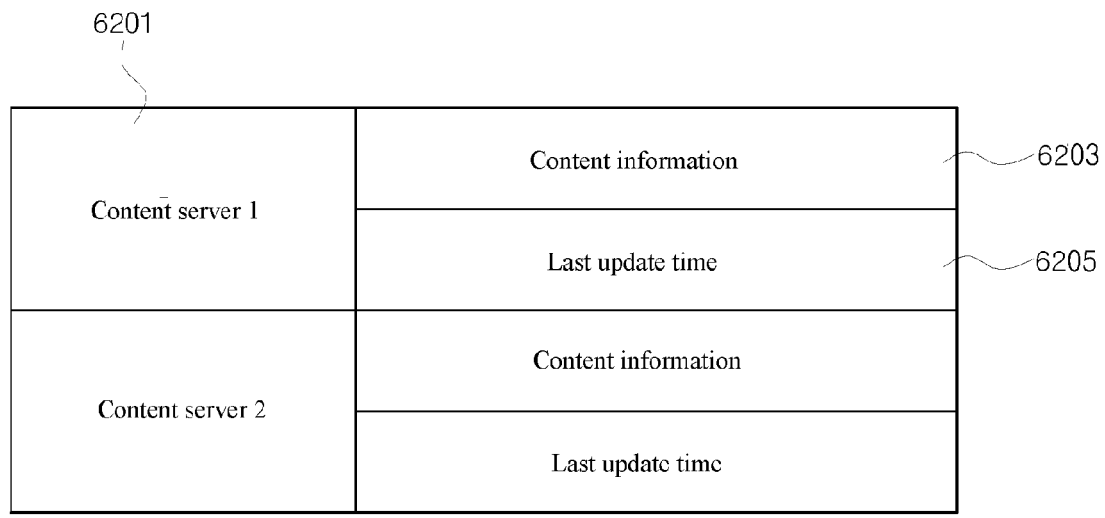
FIG. 62 is a diagram illustrating a content list database according to the third embodiment of the present invention.

FIG. 62 is a diagram illustrating a content list database according to the third embodiment of the present invention.

Referring to FIG. 62, the content list database stores content information to be provided from a service management server to a mobile terminal. The content list database includes content information 6203 and last update time 6205 for each content server 6201. In this case, the content server 6201 may refer to a content providing server, or each item of content when a content providing server provides two or more items of content. The content information 6203 contains the details of content to be transmitted to the mobile terminal. The time when each item of content was updated last is entered in the last update time 6205.

Figure 63:
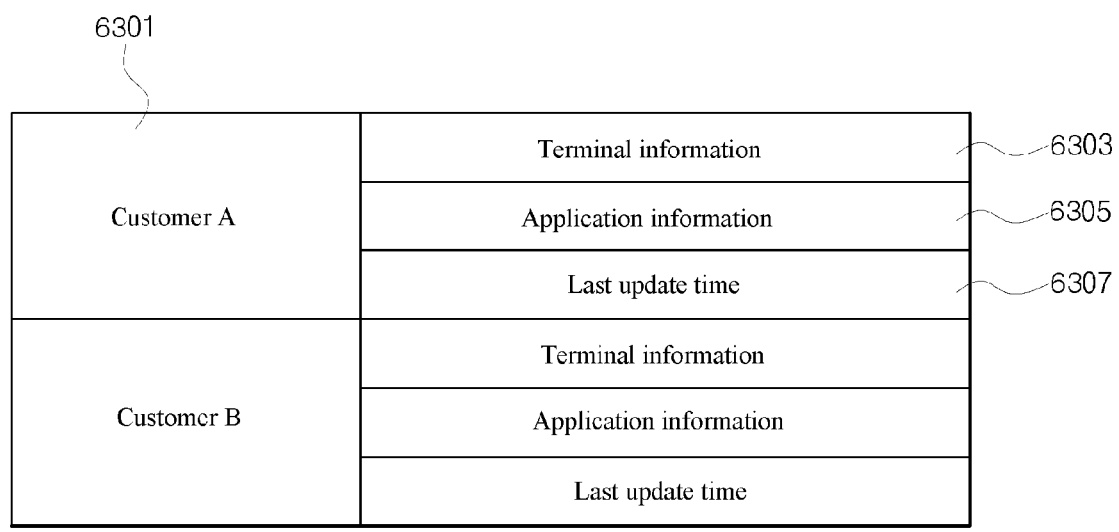
FIG. 63 is a diagram illustrating a user information database according to the third embodiment of the present invention.

FIG. 63 is a diagram illustrating a user information database according to the third embodiment of the present invention.

Referring to FIG. 63, a user information database includes terminal information 6303, application information 6305 and last update time 6307 for each customer 6301. In this case, the terminal information 6303 includes information such as a mobile terminal number and the activation of the service. The application information 6305 includes information such as the setting of the standby occupation of a standby screen occupation representation type application in a mobile terminal, a content type and a service setting environment. The last update time 6307 refers to the time when content information was last transmitted to a mobile terminal for each item of content. By comparing the last update time with the time when the content was updated last, which has been described in conjunction with FIG. 62, the service management server can transmit the latest updated content information to the mobile terminal whenever content is updated.

The present invention is not limited to the above-described embodiments, and various modifications can be made by those skilled in the art without departing from the spirit of the invention.

We claim:

1. A method of outputting a message to a display unit of a mobile terminal, which is connected to a service management server and a content providing server via a wired/wireless communication network, which includes memory, a control unit, a display unit and a key input unit, in which a standby screen occupation representation type application is installed, in standby mode, the method comprising the steps of:

receiving at least one message from the service management server, wherein the message is generated by the service management server on the basis of information provided by the content providing server that provides desired information previously set by a user of the mobile terminal for reception and the message includes a message header, bulletin contents and message details;

determining whether the message is a bulletin message;

if, as a result of the determination, the message is the bulletin, storing the message in the memory;

driving the standby screen occupation representation type application in standby mode under the control of the control unit;

extracting the message using the standby screen occupation representation type application; and outputting the extracted message to the display unit, wherein the message header includes a Telesvc-id, storage time, a content ID and a callback Uniform Resource Locator (URL) and if the content ID has a highly important grade, the message details are output to the display unit.

2. The method according to claim 1, wherein the standby screen occupation representation type application is transmitted from the service management server to the mobile terminal in a download manner.

3. The method according to claim 1, further including the steps of:

activating the standby screen occupation application by pressing at least one key of the display unit; and driving an application corresponding to the message by pressing at least one key of the display unit.

4. The method according to claim 1, wherein the message is transmitted from the service management server to the mobile terminal using one of Short Messaging Service (SMS) and Cell Broadcasting Service (CBS).

5. The method according to claim 1, wherein the bulletin contents of the message are output to the display unit in a slide show fashion.

6. The method according to claim 5, wherein, if at least one key input of the key input unit is input while the message bulletin contents are being output to the display unit in a slide show fashion, the message details are output to the display unit.

7. The method according to claim 5, wherein, if at least one key of the key input unit is input while the message bulletin contents are being output to the display unit in a slide show fashion, the mobile terminal gains access to the content providing server using the callback URL and outputs the message contents to the display unit of the mobile terminal.

8. A mobile terminal which is connected to a service management server and a content providing server via a wired/wireless communication network and outputs a message to a display unit in standby mode, which has memory, a control unit, the display unit and a key input unit, and in which a standby screen occupation representation type application is installed, the mobile terminal comprising:

means for receiving at least one image message from the service management server, wherein the message is generated by the service management server on the basis of information provided by the content providing server that provides desired information previously set by a user of the mobile terminal and the message includes a message header, bulletin contents and message details;

means for determining whether the message is a bulletin message;

means for storing the message in the memory if the message is a bulletin message as a result of the determination;

means for executing the standby screen occupation representation type application in standby mode under the control of the control unit;

means for extracting the message using the standby screen occupation representation type application; and means for outputting the extracted message to the display unit, wherein the message header includes a Telesvc-id, storage time, a content ID and a callback Uniform Resource Locator (URL) and if the content ID has a highly important grade, the message details are output to the display unit.

* * * * *